United States Patent
Milovac et al.

(10) Patent No.: US 8,482,903 B2
(45) Date of Patent: Jul. 9, 2013

(54) FRONT ACCESSIBLE SWITCHGEAR ASSEMBLY

(75) Inventors: Predrag Milovac, Fremont, CA (US); Ashok BabuRao Kulkarni, Fremont, CA (US); Edward Joseph Rossi, Scotls Valley, CA (US); Dennis Wayne Sapp, Manteca, CA (US)

(73) Assignee: ABD El and Larson Holdings LLC, Fremont, CA (US)

( * ) Notice: Subject to any disclaimer, the term of this patent is extended or adjusted under 35 U.S.C. 154(b) by 258 days.

(21) Appl. No.: 12/905,077

(22) Filed: Oct. 14, 2010

(65) Prior Publication Data

US 2011/0299226 A1 Dec. 8, 2011

Related U.S. Application Data

(60) Provisional application No. 61/352,022, filed on Jun. 7, 2010.

(51) Int. Cl.
H02B 11/00 (2006.01)

(52) U.S. Cl.
USPC ........... 361/605; 361/611; 361/623; 361/630; 361/637; 361/639

(58) Field of Classification Search
USPC .................................. 361/603, 605, 620, 623
See application file for complete search history.

(56) References Cited

U.S. PATENT DOCUMENTS

| | | | |
|---|---|---|---|
| 4,118,755 A | 10/1978 | Davies et al. | |
| 4,464,703 A | 8/1984 | Davies et al. | |
| 5,574,624 A | 11/1996 | Rennie et al. | |
| 5,710,402 A | 1/1998 | Karnbach et al. | |
| 6,040,976 A * | 3/2000 | Bruner et al. | 361/611 |
| 6,205,017 B1 * | 3/2001 | Wilkie et al. | 361/605 |
| 6,410,844 B1 | 6/2002 | Bruner et al. | |
| 7,440,260 B2 * | 10/2008 | Parker et al. | 361/620 |
| 7,450,368 B2 * | 11/2008 | Parker et al. | 361/611 |
| 7,616,431 B2 * | 11/2009 | Moore et al. | 361/611 |
| 2009/0200273 A1 | 8/2009 | Josten et al. | |

* cited by examiner

Primary Examiner — Gregory Thompson
(74) Attorney, Agent, or Firm — Ash Tankha; Lipton, Weinberger & Husick

(57) ABSTRACT

A front accessible metal clad switchgear assembly comprising multiple compartments defined within an electrical enclosure is provided. The compartments interchangeably accommodate electrical components, for example, current transformers, a circuit breaker, a control power transformer, an epoxy encapsulated potential transformer, etc., and bus bars in predetermined positions for allowing front access to the electrical components and bus bars. The front accessible switchgear assembly further comprises a plenum chamber rearwardly positioned in the electrical enclosure and in communication with the compartments to provide an exit path for releasing pressure and gases. A mounting block assembly is positioned in one or more of the compartments for mounting, enclosing, and providing front access to the electrical components. The mounting block assembly is configured to reduce temperature rise in the compartments. Fuse sleeve assemblies operably connected to the control power transformer and the potential transformer allow high voltage primary connections in the electrical enclosure.

30 Claims, 38 Drawing Sheets

FRONT ACCESSIBLE SWITCHGEAR ASSEMBLY

CROSS REFERENCE TO RELATED APPLICATIONS

This application claims the benefit of provisional patent application No. 61/352,022 titled "Multi-access Switchgear Assembly", filed on Jun. 7, 2010 in the United States Patent and Trademark Office.

The specification of the above referenced patent application is incorporated herein by reference in its entirety.

BACKGROUND

The apparatus disclosed herein, in general, relates to electrical enclosures. More particularly, the apparatus disclosed herein relates to electrical enclosures that provide front access to electrical bus members, multiple electrical components, and apparatuses housed within the electrical enclosures. Furthermore, the apparatus disclosed herein relates to electrical bus assemblies for electrical enclosures and arc resistant electrical enclosures.

Medium voltage electrical components and apparatuses, for example, circuit breakers, potential transformers, current transformers, control power transformers, etc., are often housed in an electrical enclosure called a switchgear cabinet. The medium voltage electrical components and apparatuses operate, for example, in a range of about 1000 volts to about 100,000 volts. The switchgear cabinet for medium voltage equipment typically occupies a large space and is difficult to access. As such, maintenance and space considerations are driving factors in the design of new electrical equipment. There is a need for constructing a switchgear assembly that makes efficient use of the available floor space and minimizes the time required for inspection, repair and maintenance of equipment accommodated within the switchgear assembly.

Furthermore, a certain amount of space is required between adjacent equipment and structures such as walls and the switchgear cabinet per the national electric code (NEC) and other local codes. An entire room is typically allocated for a medium voltage switchgear cabinet. Space is a critical factor in industrial applications, data center facilities and marine equipment, where space is limited. Allocation of a substantial amount of space, for example, an entire room for the medium voltage switchgear cabinet is an undesirable and inefficient use of valuable floor space.

Switchgear cabinets, particularly medium voltage metal clad switchgear cabinets are often damaged due to arcing. An explosion caused by arcing within a switchgear cabinet results in significant economic loss due to interruption of energy distribution, and damage of the switchgear cabinet and the components or equipment accommodated in the switchgear cabinet. Consequently, maintenance personnel inspecting and servicing the switchgear cabinets have to wear protective gear that is bulky and expensive. Typical arc resistant switchgear cabinets tend to be very large, for example, cabinets are 36 inches wide and 90 inches deep and often have heavy sheet metal enclosures. Such configurations require significant space. Some switchgear cabinets employ an external arcing chamber that limits the configuration of components, equipment, etc., within the switchgear cabinet.

Conventional switchgear cabinets available in markets, for example, in Europe and Asia are built in accordance with the International Electrotechnical Commission (IEC) standards. However, these switchgear cabinets have cable connection bus bars in the rear making it difficult to install and service electrical components and the bus bars accommodated within these switchgear cabinets. Furthermore, conventional switchgear cabinets utilize bar type current transformers that are mounted in the rear making it difficult to replace a transformer in the field if one of the transformers fail. Consequently, there is a need for positioning cable connection bus bars at the front of a switchgear cabinet for both safety and accessibility. Furthermore, there is a need for mounting transformers in the front of the switchgear cabinet for easier accessibility for maintenance and inspection.

Moreover, there are significant limitations with respect to the size of potential transformers and control power transformers that are available in conventional switchgear cabinets. For example, the maximum voltage for a potential transformer in a conventional metal clad switchgear cabinet is about 5000V and the maximum power for a control power transformer is about 5 kVA.

Conventional metal clad switchgear cabinets for the North American market need to meet stringent Institute of Electrical and Electronics Engineers (IEEE) requirements and American National Standards Institute (ANSI) requirements. These standards require a circuit breaker to be tested inside the switchgear cabinets that have limited cooling and therefore limiting the temperature rise within the switchgear cabinet becomes a major challenge. Furthermore, as per International Electrotechnical Commission (IEC) standards, barriers between compartments in the switchgear cabinets are not a requirement, therefore cooling the circuit breaker within the switchgear cabinet is much easier. IEC designed equipment, would have to be derated significantly if no changes are made.

Furthermore, conventional metal clad switchgear cabinets pose additional challenges to meet ANSI and Underwriters Laboratories (UL) requirements because of limited space and limited cooling. In addition, IEEE/ANSI designed equipment requires bus bars within the switchgear cabinet to be insulated, making it more difficult to cool the critical current carrying bus bars in certain compartments of the switchgear cabinet that accommodate the circuit breaker. Alternatively, expensive heat sinks have to be employed to limit temperature rise. The addition of heat sinks is a difficult task in the compact space available and poses significant challenges to pass the required lightning impulse test due to space limitations and the shape of the heat sink.

Hence, there is a long felt but unresolved need for an arc resistant front accessible metal clad switchgear assembly that has a compact footprint and provides front access to electrical components and equipment accommodated in the switchgear assembly for inspection, testing and maintenance with limited space requirements and without protective gear. Furthermore, there is a need for a compact front accessible switchgear assembly that allows successful testing of the electrical components, for example, circuit breakers that are accommodated in the switchgear assembly without additional heat sinks.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The front accessible metal clad switchgear assembly disclosed herein addresses the above stated need for a compact arc resistant front accessible metal clad switchgear assembly that has a compact footprint and provides front access to electrical components and equipment accommodated in the switchgear assembly for inspection, testing and maintenance with limited space requirements and without protective gear. Adjacent sections defined in an electrical enclosure of the front accessible metal clad switchgear assembly are separated by vertical metal barriers for compartmentalizing active electrical components in the electrical enclosure. The "front accessible metal clad switchgear assembly" is herein referred to as a "front accessible switchgear assembly". The front accessible switchgear assembly disclosed herein allows successful testing of the electrical components, for example, circuit breakers, that are accommodated in the front accessible switchgear assembly without additional heat sinks.

The front accessible switchgear assembly disclosed herein comprises multiple compartments defined within an electrical enclosure, a mounting block assembly, multiple electrical components, and bus bars. The electrical enclosure is divided into, for example, a first section and a second section. The compartments comprising, for example, upper compartments, middle compartments, lower compartments, a central compartment, rear compartments, etc., are defined in the first section and the second section of the electrical enclosure. The compartments are configured to interchangeably accommodate one or more electrical components and bus bars. The electrical components are electrically connected in predetermined positions in the compartments for allowing front access to the electrical components and the bus bars within the electrical enclosure. One or more of the electrical components are in electrical communication with the bus bars in the compartments.

The front accessible switchgear assembly disclosed herein further comprises a plenum chamber rearwardly positioned in the electrical enclosure. The plenum chamber is in communication with one or more of the compartments within the electrical enclosure, for example, via an exhaust chamber. The exhaust chamber is in adjacent communication with the plenum chamber. The plenum chamber provides an exit path for releasing pressure and gases generated by the electrical components accommodated in the compartments during an event of arcing within the electrical enclosure. The front accessible switchgear assembly disclosed herein further comprises flaps positioned between the compartments and the plenum chamber for preventing the gases and external particulate matter from escaping the plenum chamber and entering into the compartments via the plenum chamber. One of the compartments, for example, an upper compartment, is configured as a low voltage compartment for accommodating control equipment. In an embodiment, the low voltage compartment is isolated from the plenum chamber and other compartments, for example, the high voltage compartments in the front accessible switchgear assembly.

The mounting block assembly is positioned in one or more of the compartments for mounting one or more of the electrical components and for providing front access to the mounted electrical components for inspection and maintenance. Each mounting block assembly comprises a base mounting block, multiple mounting legs, and a mounting block cover. The mounting legs extend frontwardly from the base mounting block for mounting the electrical components and allowing front access to the mounted electrical components. The mounting block cover is removably attached to the base mounting block for enclosing the mounted electrical components on the mounting legs. The mounting block cover is removable for providing front access to the mounted electrical components for inspection and maintenance. The mounting block assembly is configured to reduce temperature rise in the compartments.

The electrical components are accommodated and electrically connected in predetermined positions in the compartments of the front accessible switchgear assembly for allowing front access to the electrical components, the bus bars within the electrical enclosure for cable connections, and current transformers mounted on the mounting legs of the mounting block assembly. The electrical components are arranged in interchangeable configurations in the compartments within the electrical enclosure. The electrical components interchangeably accommodated in the compartments with the electrical enclosure comprise, for example, a circuit breaker, a control power transformer, an epoxy encapsulated potential transformer, current transformers, input electrical cables and output electrical cables, etc. In an embodiment, the circuit breaker is accommodated and electrically connected in the middle compartment defined, for example, in the first section of the electrical enclosure. The control power transformer is accommodated and electrically connected in the middle compartment defined, for example, in the second section of the electrical enclosure and communicates with the other electrical components via the mounting block assembly and the bus bars. In another embodiment, the epoxy encapsulated potential transformer is accommodated and electrically connected in a middle compartment or a lower compartment defined, for example, in the second section of the electrical enclosure.

The front accessible switchgear assembly disclosed herein further comprises one or more fuse sleeve assemblies operably connected to the control power transformer and the epoxy encapsulated potential transformer. The fuse sleeve assemblies allow high voltage primary connections of the control power transformer and the epoxy encapsulated potential transformer in the electrical enclosure. The fuse sleeve assemblies operably connected to the control power transformer and the epoxy encapsulated potential transformer contact one or more of the bus bars in, for example, a rear compartment within the electrical enclosure via the mounting block assembly, thereby creating an ultra compact front accessible switchgear assembly. The fuse sleeve assemblies contact a cylindrical bus mounted in the mounting block assembly. The mounting block assembly is configured to accommodate each of the fuse sleeve assemblies and isolate phases of the control power transformer and the epoxy encapsulated potential transformer. The control power transformer and the epoxy encapsulated potential transformer comprise low voltage contacts configured to disengage from low voltage connections within the electrical enclosure for preventing an event of arcing.

In an embodiment, the current transformer is mounted on the mounting block assembly in, for example, a middle compartment within the electrical enclosure. In an embodiment, the current transformers are mounted on an input and an output of the circuit breaker via the mounting block assembly. In an embodiment, a cord is electrically connected to the circuit breaker for low voltage connection within the electrical enclosure.

The front accessible switchgear assembly disclosed herein further comprises input electrical cables and output electrical cables configured for entry into and/or exit from the electrical enclosure via an upper compartment or a lower compartment in the electrical enclosure. The input electrical cables and the output electrical cables are accessible from the front of the front accessible switchgear assembly. The bus bars allow electrical communication between the electrical components within the electrical enclosure. The bus bars are electrically connected in the rear compartments within the electrical enclosure. In an embodiment, the bus bars comprise horizontal bus bars electrically connected in the rear compartments within the electrical enclosure. The horizontal bus bars allow connection to adjacent sections defined in the electrical enclosure, connection between the electrical components in the adjacent sections defined in the electrical enclosure, and connection to other switchgear assemblies.

The front accessible switchgear assembly disclosed herein further comprises one or more infrared windows positioned at predetermined locations on a front side of the front accessible switchgear assembly for front scanning the electrical components and the bus bars in the compartments for inspection and maintenance. In an embodiment, support brackets are connected to the infrared windows for protecting the infrared windows from rupture. The front accessible switchgear assembly disclosed herein further comprises one or more inspection windows, for example, windows made of Lexan® of Saudi Basic Industries Corp, positioned at predetermined locations on the front side of the front accessible switchgear assembly for providing a front visual indication of the electrical components and the bus bars for inspection and maintenance and for critical electrical high voltage connections.

The front accessible switchgear assembly disclosed herein further comprises surge arresters positioned in the rear compartments within the electrical enclosure. The surge arresters protect the electrical components, the bus bars, the mounting block assembly, the inspection windows, the infrared windows, the input electrical cables, the output electrical cables, and the compartments defined with the electrical enclosure in an event of a lightning surge. The surge arresters are electrically connected to the bus bars in the electrical enclosure via short high voltage electrical cables. The surge arresters are compact and represent a unique way to mount and connect them to make the front accessible switchgear assembly compact.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1A:
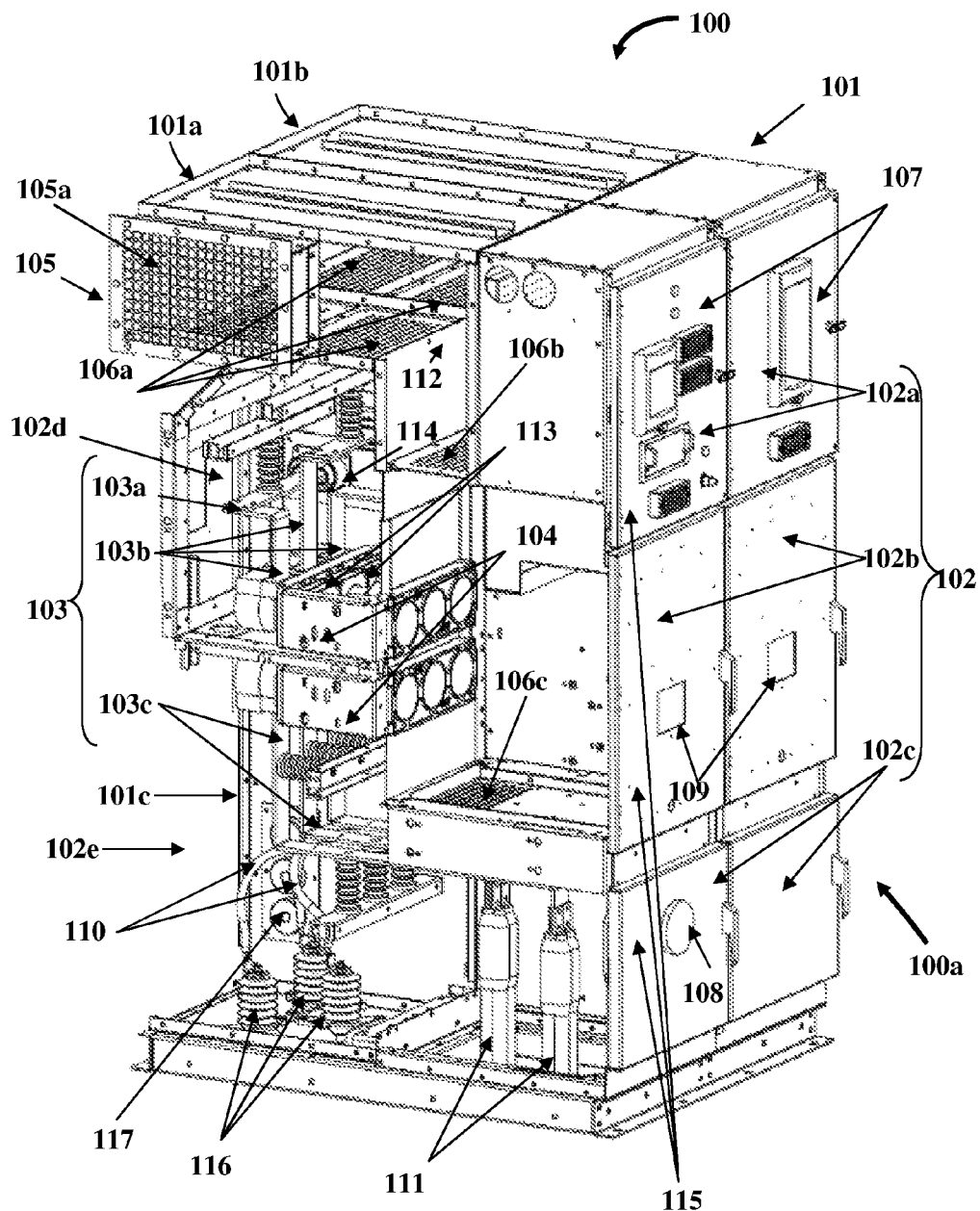
FIG. 1A exemplarily illustrates a cut-away left perspective view of a front accessible switchgear assembly.
Figure 1B:
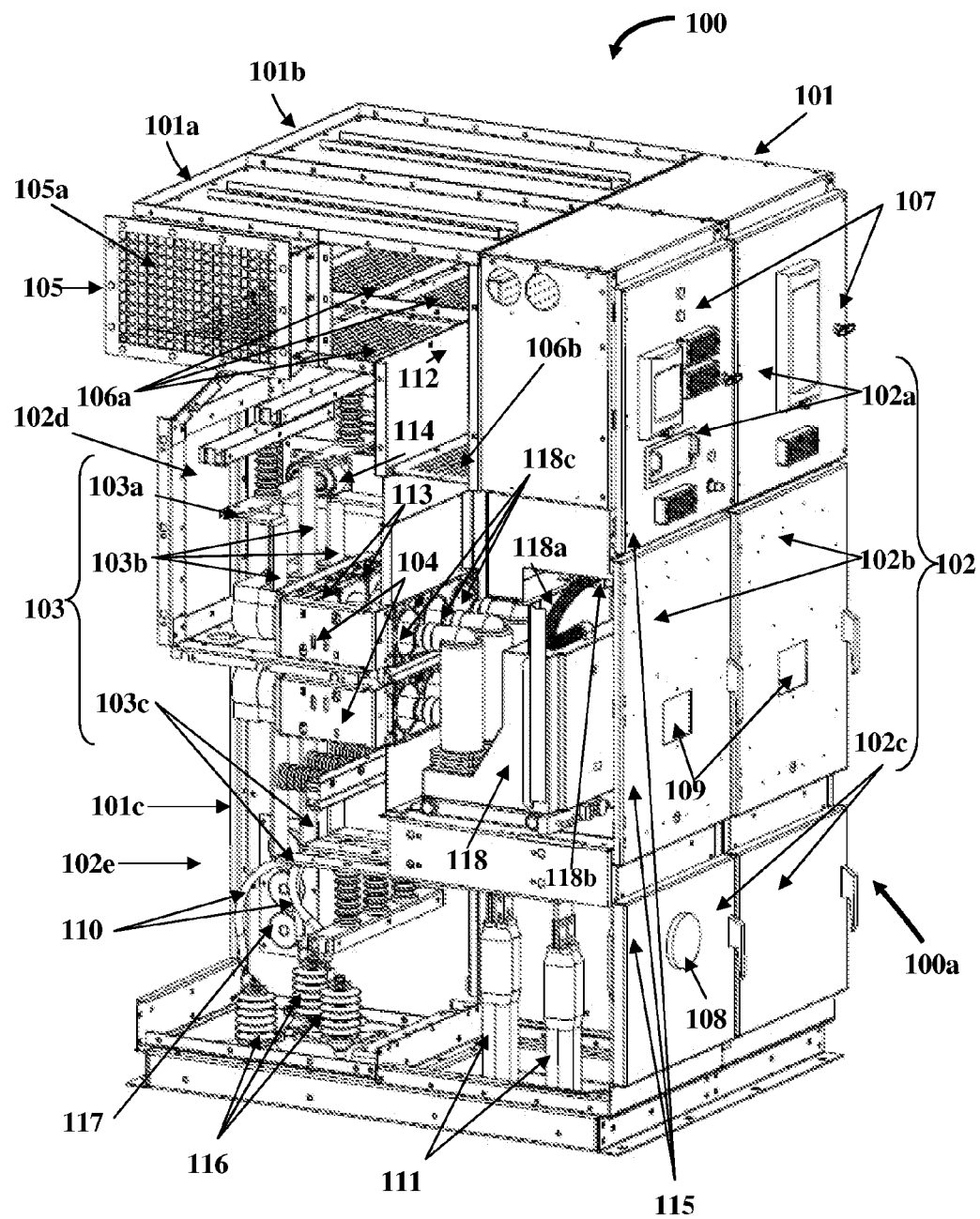
FIG. 1B exemplarily illustrates a cut-away left perspective view of the front accessible switchgear assembly, showing a circuit breaker electrically connected in a middle compartment of the front accessible switchgear assembly.

FIGS. 1A-1B exemplarily illustrate cut-away left perspective views of a front accessible switchgear assembly 100. The front accessible switchgear assembly 100 disclosed herein comprises a compact and arc resistant electrical enclosure 101, multiple compartments 102 defined within the electrical enclosure 101, one or more mounting block assemblies 104, a plenum chamber 105, electrical components 111, 113, 118, 119, 120, etc., and bus bars 103. The front accessible switchgear assembly 100 disclosed herein is a metal clad switchgear assembly. Adjacent sections 101a and 101b defined in the electrical enclosure 101 of the front accessible metal clad switchgear assembly 100 are separated by vertical metal barriers 101c for compartmentalizing active electrical components 118, 119, 120, etc., in the electrical enclosure 101. The front accessible metal clad switchgear assembly 100 has a higher duty cycle and a greater number of load operations, for example, about 10 to about 1000 times greater number of load operations than that of a metal enclosed switch gear assembly. The "front accessible metal clad switchgear assembly" is herein referred to as a "front accessible switchgear assembly".

The size of the front accessible switchgear assembly 100 disclosed herein is configured to ensure space savings and easy access from the front side 100a of the front accessible switchgear assembly 100. The front accessible switchgear assembly 100 disclosed herein refers to a 15000 volts (V) switchgear assembly and can be extended to higher and lower voltages. The front accessible switchgear assembly 100 disclosed herein accommodates 15 kilovolt (kV) class equipment and provides solutions for 95 kV lightning impulse voltage and 1200 ampere (A) rating with a control power transformer 119 rated up to 15 kVA. The front accessible switchgear assembly 100 disclosed herein can be extended to higher ratings and can be used for low voltage switchgear assemblies rated 600V and below.

The compartments 102 are configured to interchangeably accommodate one or more electrical components, for example, a control power transformer 119, one or more current transformers 113, a circuit breaker 118, a potential transformer 120, input and output electrical cables 111 herein referred to as "electrical cables", etc., and bus bars 103, for example, upper horizontal bus bars 103a, lower horizontal bus bars 103d, cable connection bus bars 103c, etc.

The electrical enclosure 101 of the front accessible switchgear assembly 100 exemplarily illustrated in FIGS. 1A-1B, FIGS. 2-6, and FIGS. 8-9 is divided into two sections, for example, a first section 101a and a second section 101b. The front accessible switchgear assembly 100 disclosed herein is a compact basic two section switchgear assembly 100. Each of the sections 101a and 101b of the electrical enclosure 101 is, for example, 23.62 inches wide, 60 inches deep, and 96 inches high to provide all basic functions and components needed in the front accessible switchgear assembly 100. The compartments 102 comprising, for example, upper compartments 102a, middle compartments 102b, lower compartments 102c, a central compartment 102d, rear compartments 102e, etc., are defined in the first section 101a and the second section 101b of the electrical enclosure 101. For example, the first section 101a of the electrical enclosure 101 defines one of the upper low voltage compartments 107, one of the middle compartments 102b, one of the lower compartments 102c, the central compartment 102d, and one of the rear compartments 102e.

The first section 101a of the electrical enclosure 101 also defines the plenum chamber 105 rearwardly positioned in the electrical enclosure 101. The plenum chamber 105 is an open space for hot gases to escape from the electrical enclosure 101 to the outside environment, for example, via a venting duct system of a building. The plenum chamber 105 comprises a flange 105a that provides an exit path for the gases to escape. The flange 105a is connected to the venting duct system for exhausting the gases. The flange 105a is configured as a perforated plate, a thin sheet metal plate, or an aluminum plate with flaps, which prevents the entry of gases, external particulate matter, etc., into the electrical enclosure 101 from the venting duct system of the building. The plenum chamber 105 provides a large space for hot gases to expand and allows safe exhaust of, for example, arcs, in an event of arcing. The safe exhaust of hot gases and arcs ensure safety of personnel working around the electrical enclosure 101 of the front accessible switchgear assembly 100. The plenum chamber 105 is made of the same material, for example, sheet metal, as the compartments 102. The plenum chamber 105 is in communication with one or more of the compartments 102 and provides an exit path for releasing pressure and gases generated by the electrical components 111, 113, 118, 119, 120, etc., accommodated in the compartments 102 during an event of arcing within the electrical enclosure 101. The plenum chamber 105 communicates with one or more of the compartments 102 via an exhaust chamber 112 in adjacent communication with the plenum chamber 105. The exhaust chamber 112 extends from the first section 101a through to the second section 101b of the electrical enclosure 101. The plenum chamber 105 is rearwardly positioned to connect to venting ducts of a building to exhaust the gases to the outside environment safely during an arcing event. The plenum chamber 105 may be positioned to the left or the right of the front accessible switchgear assembly 100 and may be connected to the venting ducts that go in an upward direction or a downward direction based on typical design practices.

The front accessible switchgear assembly 100 efficiently exhausts the gases and the pressure from the compartments 102 to the plenum chamber 105 during an arcing event without creating excessive pressure in the compartments 102. The compartments 102 of the front accessible switchgear assembly 100 are configured to minimize the pressure of gases during an arcing event. The front accessible switchgear assembly 100 disclosed herein further comprises flaps 106a, 106b, and 106c between the compartments 102 and the plenum chamber 105 for preventing the gases, external particulate matter, and other external elements from entering the compartments 102 via the plenum chamber 105. The flaps 106a, 106b, and 106c are configured as perforated plates for allowing gases to exit into the plenum chamber 105. For example, the flaps 106a are positioned at the top of the central compartment 102d defined in the first section 101a of the electrical enclosure 101, and at the top of the rear compartment 102e defined in the second section 101b of the electrical enclosure 101. Furthermore, the flaps 106b and 106c are provided for the exhaust chamber 112 and the middle compartment 102b respectively as exemplarily illustrated in FIG. 1A. The flaps 106a and 106b delineate the exhaust chamber 112 within the electrical enclosure 101.

The flaps 106a, 106b, and 106c of the plenum chamber 105 are made of a thin metal or aluminum and if there is an arcing event and the pressure of gases in the compartments 102b, 102c, and 102d becomes high, the flaps 106a, 106b, and 106c open to allow the gases to exhaust to the plenum chamber 105. For example, if there is an arcing event in the central compartment 102d, the gases exit to the plenum chamber 105 through one of the flaps 106a. In the event of arcing in the lower compartment 102c defined in the first section 101a of the electrical enclosure 101 that accommodates the electrical cables 111, gases from the lower compartment 102c exit through the rear compartment 102e and into the plenum chamber 105 via one of the flaps 106a. If an electrical component, for example, a potential transformer 120 is positioned in the lower compartment 102c defined in the second section 101b of the electrical enclosure 101, the gases exit through the flap 106c exemplarily illustrated in FIG. 1A and FIG. 15B and into the plenum chamber 105 via the flap 106b of the exhaust chamber 112. In the event of arcing in the middle compartment 102b, the gases exit from the middle compartment 102b to the exhaust chamber 112 via the flap 106b and thereafter to the plenum chamber 105.

One or more of the compartments 102, for example, the upper compartments 102a are configured as low voltage compartments 107 for accommodating control equipment (not shown). In an embodiment, the middle compartments 102b and the lower compartments 102c are configured as low voltage compartments 107. The control equipment in the low voltage compartment 107 is employed for relay and protection and comprises relay equipment, for example, overcurrent relays, differential relays, under voltage relays, ground fault relays, protection relays, under frequency relays, integrated digital relays such as Schweitzer relays and Bassler relays, etc. The control equipment in the low voltage compartment 107 further comprises programmable logic controllers for performing control functions, human machine interfaces for performing display functions, metering equipment for measurement and display of voltage, current, frequency, etc., and other control equipment for motor control, etc. The control equipment provides protection against current and voltage fluctuations, for example, over current, undercurrent, differential voltages, ground fault, etc. The control equipment provides protection against changes in frequency, for example, under frequency, etc. Control switches and push buttons are also provided on the low voltage compartment 107. In an embodiment, control functions of the circuit breaker 118 can be incorporated in the low voltage compartment 107. The outputs of electrical components, for example, the current transformer 113, the potential transformer 120, and the control power transformer 119 can also be integrated in the low voltage compartment 107 for control, protection and display functions. The control equipment in the low voltage compartment 107 communicates with other control equipment in the front accessible switchgear assembly 100 or other external control equipment by communication protocols, for example, Ethernet, Modbus, serial link, etc.

The low voltage compartment 107 is isolated from the plenum chamber 105 and the other compartments 102. In an embodiment, the low voltage compartment 107 can be configured in the upper compartment 102a and isolated from the middle compartment 102b, the lower compartment 102c, and the rear compartment 102e. In another embodiment, the low voltage compartment 107 can be configured as a complete section comprising the upper compartment 102a, the middle compartment 102b, and the lower compartment 102c defined in the first section 101a of the electrical enclosure 101 and is isolated from the high voltage rear compartments 102e, for example, by sheet metal barriers. In this embodiment, the low voltage compartment 107 is a full section extending from the upper compartment 102a to the lower compartment 102c and encompassing the middle compartment 102b. If the low voltage compartment 107 is configured as a complete section and used for control, the electrical components 111, 113, 118, 119, 120, etc., and the bus bars 103 are separated by metal barriers. High voltage electrical components positioned in the central compartment 102d and the rear compartment 102e are isolated from the low voltage compartment 107, for example, by sheet metal barriers.

The upper low voltage compartment 107 is isolated from the plenum chamber 105 and there is no communication between the upper low voltage compartment 107 and the plenum chamber 105. By sealing the upper low voltage compartment 107 from the other high voltage compartments 102b, 102c, 102d, and 102e and the plenum chamber 105, arc rating can be obtained for the front accessible switchgear assembly 100, where it is possible to open the upper low voltage compartment 107 when the front accessible switchgear assembly 100 is energized, without protective clothing for maintenance of low voltage control circuits. This is applied in, for example, data center, health care, and other critical facilities. Significant arcing does not happen in the upper low voltage compartment 107 since the available power is very low.

The electrical components 111, 113, 118, 119, 120, etc., are electrically connected in predetermined positions in the compartments 102 for allowing front access to the electrical components, 111, 113, 118, 119, 120, etc., and the bus bars 103 within the electrical enclosure 101. One or more of the electrical components, 111, 113, 118, 119, 120, etc., are in electrical communication with the bus bars 103 in the compartments 102. The bus bars 103 are electrically connected in the rear compartments 102e defined in the first section 101a and the second section 101b of the electrical enclosure 101.

The mounting block assembly 104 is positioned in one or more of the compartments 102, for example, the middle compartments 102b. The mounting block assembly 104 for mounting one or more of the electrical components, for example, the current transformers 113, is disclosed in the detailed description of FIGS. 16A-16C. The mounting block assembly 104 allows front access to the mounted electrical components 113, 118, 119, 120, etc., for inspection and maintenance. In an embodiment, the mounting block assembly 104 is configured as a two-part assembly to increase creepage distance resulting in a compact front accessible switchgear assembly 100.

One of the electrical components, for example, the circuit breaker 118 is electrically connected in the middle compartment 102b defined in the first section 101a of the electrical enclosure 101. The construction of the circuit breaker 118 is disclosed in the detailed description of FIGS. 17A-17B. The circuit breaker 118 comprises tulip contacts 118f provided on arms 118c extending outwardly from the circuit breaker 118 as exemplarily illustrated in FIGS. 17A-17B. The tulip contacts 118f of the circuit breaker 118 connect to a cylindrical bus 104c made of, for example, copper, that runs inside the mounting block assembly 104 in the middle compartment 102b defined in the first section 101a of the electrical enclosure 101.

As exemplarily illustrated in FIGS. 1A-1B, FIGS. 3-4, FIGS. 9-10, and FIG. 12, the electrical cables 111 are configured for entry into the electrical enclosure 101 via the lower compartment 102c defined in the first section 101a of the electrical enclosure 101. In an embodiment, the electrical cables 111 are accommodated in the lower compartment 102c defined in the second section 101b of the electrical enclosure 101. The front accessible switchgear assembly 100 enables the accommodation and electrical connection of the electrical cables 111 in a single compartment, for example, the lower compartment 102c defined in the first section 101a of the electrical enclosure 101. The ability to accommodate three phases of the electrical cables 111 in a single compartment, for example, the lower compartment 102c provides an ultra compact set up for the circuit breaker 118 as part of the front accessible switchgear assembly 100, thereby minimizing the requirement of additional sections or compartments 102.

The front accessible switchgear assembly 100 disclosed herein further comprises multiple surge arresters 116, for example, typically one for each phase of the circuit of the front accessible switchgear assembly 100. The surge arresters 116 are positioned, for example, in the rear compartments 102e of the electrical enclosure 101 for protecting the electrical components 111, 113, 118, 119, 120, etc., the bus bars 103, inspection windows 109, infrared windows 108, the electrical cables 111, the mounting block assembly 104, the compartments 102 defined within the electrical enclosure 101, etc., in an event of a lightning surge. As exemplarily illustrated in FIGS. 1A-1B, FIGS. 3-5, and FIG. 10, the surge arresters 116 are positioned in a lower rear compartment 102e defined in the first section 101a of the electrical enclosure 101. The surge arresters 116 protect the electrical components 111, 113, 118, 119, 120, etc., the bus bars 103, the mounting block assembly 104, the compartments 102, etc., from damaging voltages generated during a lightning surge. The surge arresters 116 are electrically connected to the bus bars 103, for example, the cable connection bus bars 103c in the electrical enclosure 101 via short high voltage electrical cables 110. The short high voltage electrical cables 110 provide, for example, a lower electrical inductance that limits clamping voltage of the surge arresters 116 more effectively within the electrical enclosure 101, thereby increasing the effectiveness of the surge arresters 116. The clamping voltage is the maximum amount of voltage that a surge arrester 116 allows through it before the surge arrester 116 suppresses a power surge. The surge arresters 116 suppress the power surge by diverting the power to ground or by absorbing the excess energy. In an embodiment, the base of the surge arresters 116 is grounded to the electrical enclosure 101 by creating metal to metal contact by making the mounting surface free of paint. In another embodiment, a cable (not shown) can be used to make the grounding connection to the surge arresters 116. The surge arresters 116 are compact and are mounted and connected within the electrical enclosure 101 to make the front accessible switchgear assembly 100 disclosed herein compact.

The bus bars 103 comprising, for example, upper horizontal bus bars 103a are electrically connected in the rear compartment 102e defined in the first section 101a of the electrical enclosure 101. The bus bars 103 are strips of conducting materials, for example, copper, aluminum, etc., that conduct electricity within the front accessible switchgear assembly 100. One or more of the horizontal bus bars 103a and 103d allow connection to adjacent sections 101a and 101b defined in the electrical enclosure 101, connection between the electrical components, 111, 119, 120, etc., in the adjacent sections 101a and 101b defined in the electrical enclosure 101, and connection to one or more other switchgear assemblies 100. The second section 101b of the electrical enclosure 101 is exemplarily illustrated in FIG. 2. The control power transformer 119 and the potential transformer 120 are electrically connected to the cylindrical bus 104c that runs inside the mounting block assembly 104, for example, via the fuse sleeve assemblies 119a and 120a of the control power transformer 119 and the potential transformer 120 respectively. The fuse sleeve assemblies 119a and 120a of the control power transformer 119 and the potential transformer 120 respectively contact the bus bars 103 in the rear compartment 102e within the electrical enclosure 101 via the cylindrical bus 104c in the mounting block assembly 104 and high voltage electrical cables (not shown). The mounting block assembly 104 is configured to accommodate each of the fuse sleeve assemblies 119a and 120a of the control power transformer 119 and the potential transformer 120 respectively and isolate phases of the control power transformer 119 and the potential transformer 120 respectively.

The front accessible switchgear assembly 100 disclosed herein further comprises one or more infrared windows 108 and inspection windows 109 positioned at predetermined locations on the front side 100a of the front accessible switchgear assembly 100 for inspection and maintenance. The infrared windows 108 and the inspection windows 109 are disclosed in the detailed description of FIG. 8. The front accessible switchgear assembly 100 disclosed herein further comprises cable bushings 117 positioned in the rear compartment 102e and defined on the barrier 101c between the adjacent sections 101a and 101b of the electrical enclosure 101. The cable bushings 117 are provided for receiving cables that connect the electrical components 119, 120, etc., positioned in one of the adjacent sections 101b of the electrical enclosure 101 to the bus bars 103 positioned in the other adjacent section 101a of the electrical enclosure 101. For example, the cable bushings 117 receive cables that connect the control power transformer 119 and the potential transformer 120 in the second section 101b of the electrical enclosure 101 to the horizontal bus bars 103a or the cable connection bus bars 103c in the first section 101a of the electrical enclosure 101.

The front accessible switchgear assembly 100 is compact and is configured with a depth of, for example, 60 inches. The width and height of each of sections 101a and 101b of the electrical enclosure 101 of the front accessible switchgear assembly 100 are, for example, 23.62 inches and 96 inches respectively. The front accessible switchgear assembly 100 can be mounted against a wall, a very short distance away from the wall, at about 18 inches to the wall if desired to facilitate infrared (IR) scanning. Electrical working clearance in the rear of the front accessible switchgear assembly 100 is not required. Working clearance of about 5 feet or more is provided in the front of the front accessible switchgear assembly 100. The electrical cables 111 may be connected in the lower compartment 102c. The circuit breaker 118 and the control power transformer 119 are mounted in the middle compartment 102b in adjacent sections 101a and 101b respectively. The potential transformer 120 may be mounted in the lower compartment 102c or in the middle compartment 102b. In an embodiment, the electrical cables 111 are connected in the lower compartment 102c of the first section 101a, while the potential transformer 120 is mounted in the lower compartment 102c of the second section 101b of the electrical enclosure 101.

The different compartments 102 that accommodate, for example, the potential transformer 120, the control power transformer 119, the circuit breaker 118, the electrical cables 111, etc., can be interlocked using mechanical Kirk® keys of the Kirk Key Interlock Company or may be interlocked electrically so that the front accessible switchgear assembly 100 is safe from a maintenance and user standpoint using standard schemes.

Figure 2:
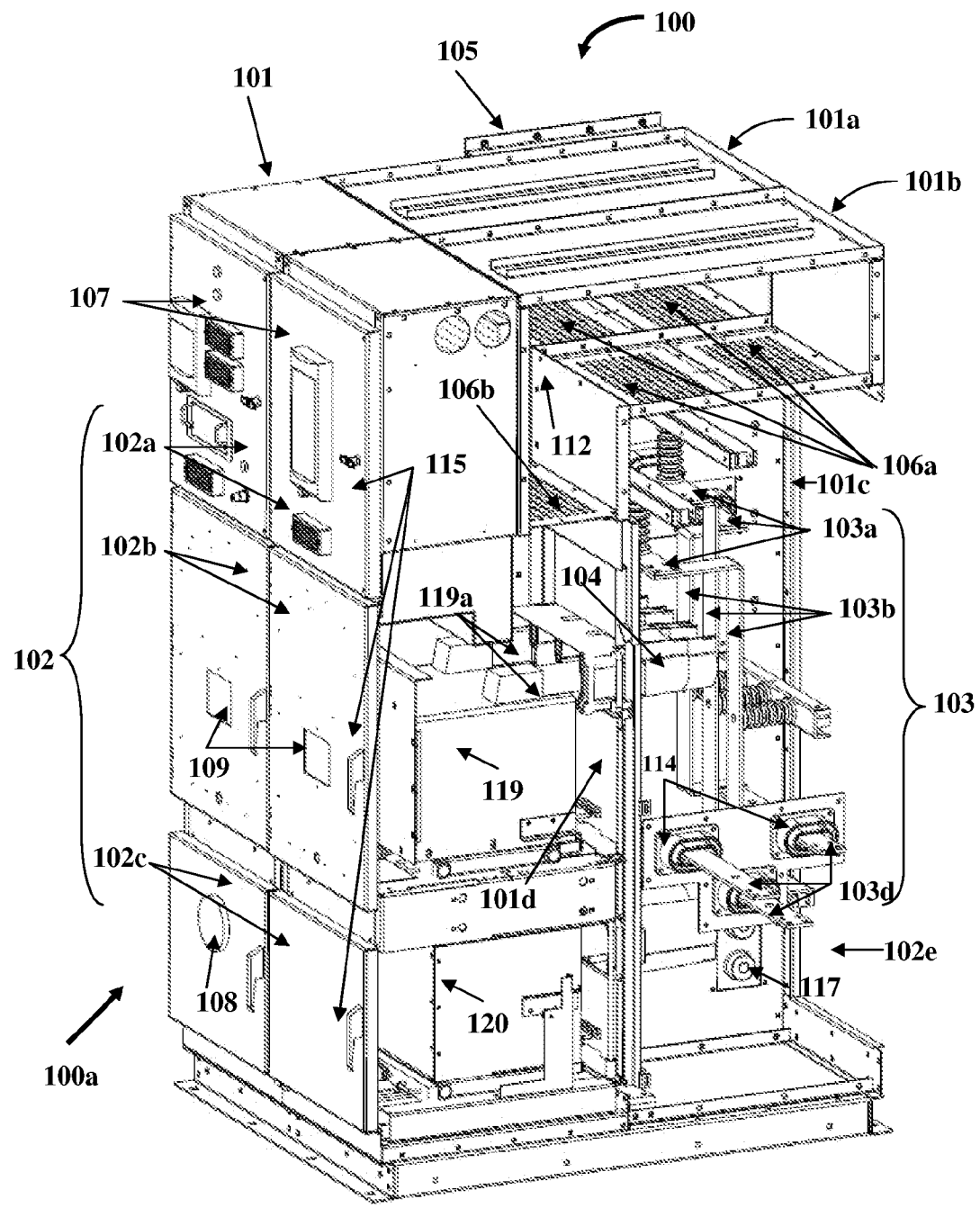
FIG. 2 exemplarily illustrates a cut-away right perspective view of the front accessible switchgear assembly.

FIG. 2 exemplarily illustrates a cut-away right perspective view of the front accessible switchgear assembly 100. FIG. 2 illustrates the second section 101b of the electrical enclosure 101. The second section 101b of the electrical enclosure 101 defines, for example, one of the upper low voltage compartments 107, one of the middle compartments 102b, one of the lower compartments 102c, and the exhaust chamber 112 extending from the rear side of the first section 101a through to the rear side of the second section 101b. The upper low voltage compartment 107 accommodates the control equipment and is isolated from the middle compartments 102b, the lower compartments 102c, the central compartment 102d, and the rear compartments 102e.

The compartments 102 interchangeably accommodate one or more of the electrical components 111, 118, 119, 120, etc. For example, the middle compartment 102b in the second section 101b of the electrical enclosure 101 accommodates the control power transformer 119. The control power transformer 119 is electrically connected in the middle compartment 102b as exemplarily illustrated in FIG. 2. The construction of the control power transformer 119 is disclosed in the detailed description of FIGS. 18A-18C. The lower compartment 102c defined in the second section 101b of the electrical enclosure 101 accommodates the epoxy encapsulated potential transformer 120. The epoxy encapsulated potential transformer 120 is electrically connected in the lower compartment 102c as exemplarily illustrated in FIG. 2. In an embodiment, the epoxy encapsulated potential transformer 120 is electrically connected in the middle compartment 102b defined in the second section 101b of the electrical enclosure 101. The construction of the potential transformer 120 is disclosed in the detailed description of FIGS. 19A-19C. Mounting and electrically connecting the potential transformer 120 in either the lower compartment 102c or the middle compartment 102b defined in the second section 101b of the electrical enclosure 101 enables creation of an ultra low footprint front accessible switchgear assembly 100.

The bus bars 103 comprising, for example, the upper horizontal bus bars 103a and lower horizontal bus bars 103d are electrically connected in the rear compartment 102e defined in the second section 101b of the electrical enclosure 101. The lower horizontal bus bars 103d allow connection to one or more other switchgear assemblies 100. The upper horizontal bus bars 103a are electrically connected to the lower horizontal bus bars 103d via transitional bus bars 103b disposed in the second section 101b of the electrical enclosure 101.

Figure 3:
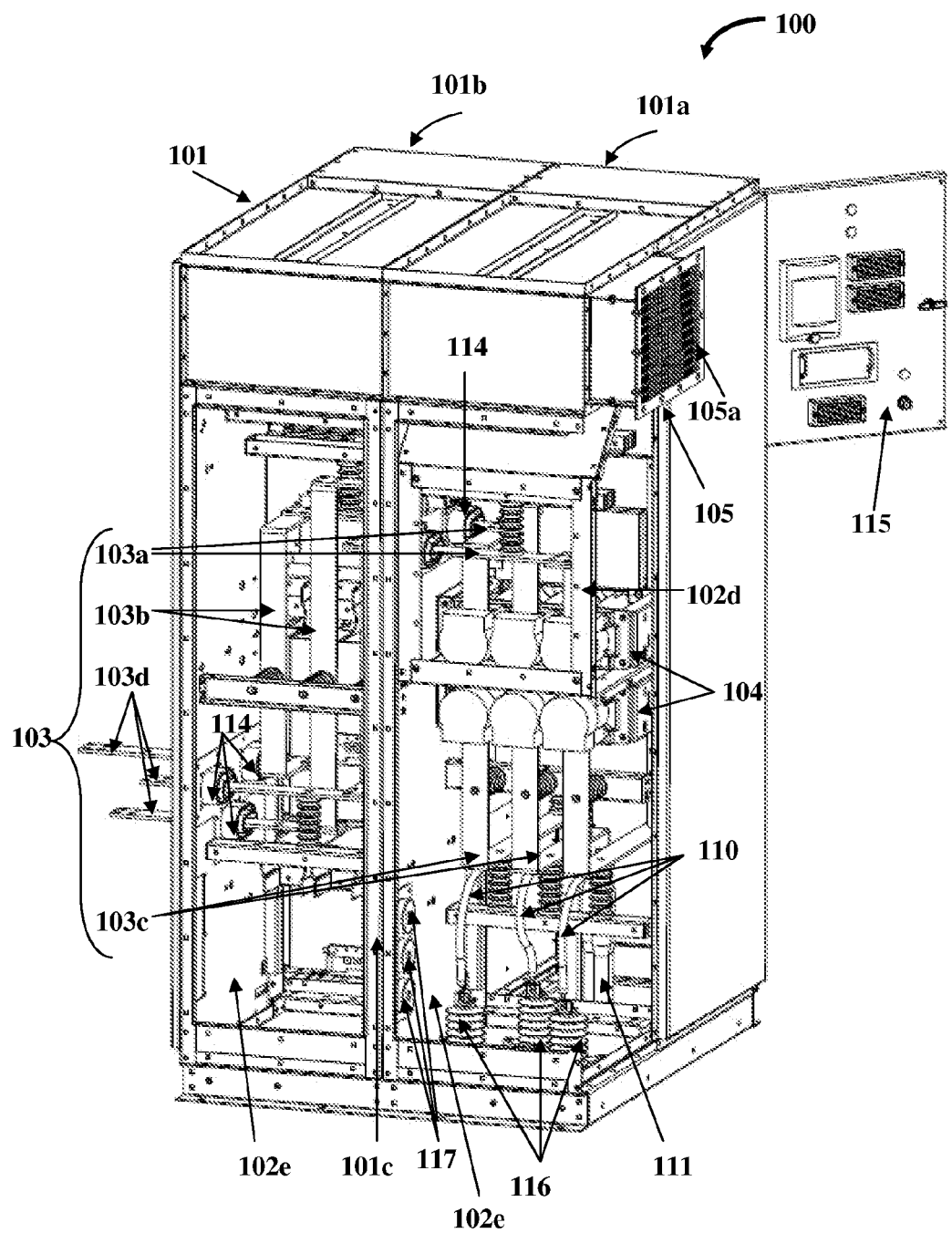
FIG. 3 exemplarily illustrates a cut-away rear perspective view of the front accessible switchgear assembly.

FIG. 3 exemplarily illustrates a cut-away rear perspective view of the front accessible switchgear assembly 100. FIG. 3 illustrates the connection of the cable connection bus bars 103c from the mounting block assembly 104 to the electrical cables 111 accommodated in the lower compartment 102c defined in the first section 101a of the electrical enclosure 101. The cable connection bus bars 103c are staggered for ease of electrical connection to the electrical cables 111 accommodated in the lower compartment 102c defined in the first section 101a of the electrical enclosure 101. FIG. 3 also illustrates the bus bars 103 electrically connected in the second section 101b of the electrical enclosure 101. The lower horizontal bus bars 103d extend outwardly from the rear compartment 102e in the second section 101b of the electrical enclosure 101 for allowing connection to one or more other switchgear assemblies.

The compartments 102 defined in the first section 101a and the second section 101b of the electrical enclosure 101 are separated by barriers 101c made of, for example, sheet metal. The components of the basic two section front accessible switchgear assembly 100 may be combined to form a long switchgear assembly line up. For example, the bus bars 103, for example, the upper horizontal bus bars 103a and the lower horizontal bus bars 103d allow connection of multiple switchgear assemblies to form a long switchgear assembly line up as the horizontal bus bars 103a and 103d line up either at the upper part or the lower part of the rear compartments 102e defined in the first section 101a and the second section 101b of the electrical enclosure 101. The two section front accessible switchgear assembly 100 is flexibly configured to adapt to any switchgear assembly line up in multiple applications. The upper horizontal bus bars 103a and the lower horizontal bus bars 103d go through window bushings 114 and the horizontal bus bars 103a and 103d rest on the window bushings 114 so that it is easy to make connections since the weight of the horizontal bus bars 103a and 103d is carried by the window bushings 114. Small sections of, for example, epoxy coated bus bars, insulated bus bars with Raychem, or any other suitable insulation, etc., can easily join the horizontal bus bars 103a and 103d from two adjacent sections of the switchgear assemblies. The bus bars 103, for example, ground bus bars, in the lower compartment 102c may also be connected on the front side 100a of the front accessible switchgear assembly 100 using, for example, small copper bus bars.

Figure 4:
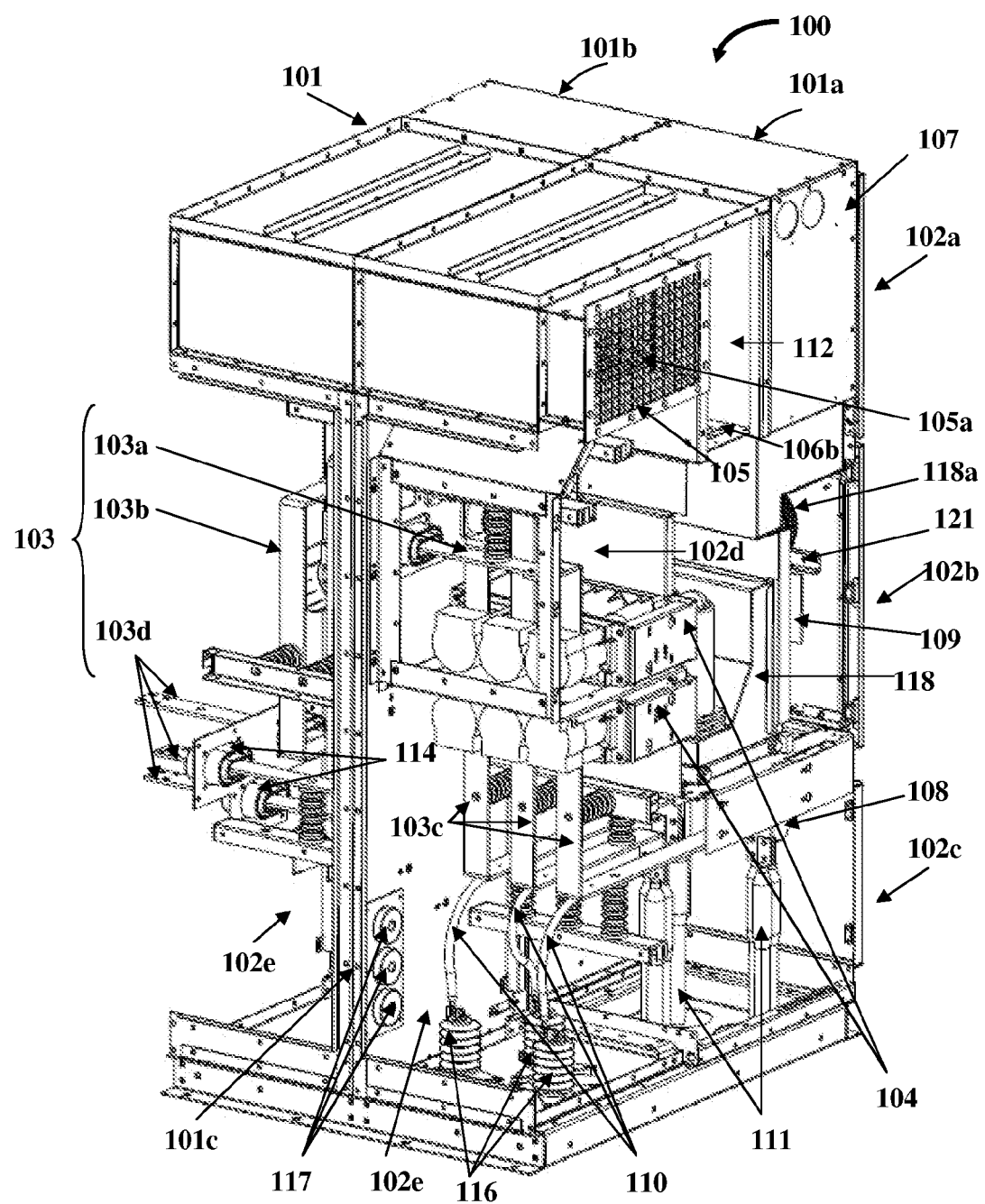
FIG. 4 exemplarily illustrates a cut-away left perspective view of the front accessible switchgear assembly, showing surge arresters positioned in a rear compartment defined in a first section of an electrical enclosure of the front accessible switchgear assembly.

FIG. 4 exemplarily illustrates a cut-away left perspective view of the front accessible switchgear assembly 100, showing surge arresters 116 positioned in a rear compartment 102e defined in the first section 101a of the electrical enclosure 101 of the front accessible switchgear assembly 100. The surge arresters 116 are electrically connected to the bus bars 103, for example, the cable connection bus bars 103c in the electrical enclosure 101 via short high voltage electrical cables 110. The circuit breaker 118 is electrically connected in the middle compartment 102b defined in the first section 101a of the electrical enclosure 101. A cord 118a is electrically connected to the circuit breaker 118 for low voltage connection within the electrical enclosure 101. For example, the cord 118a electrically connects the circuit breaker 118 to the control equipment in the upper low voltage compartment 107 defined in the first section 101a of the electrical enclosure 101. The low voltage connection comprises electrical connection of a controller to the circuit breaker 118 for communicating open/close command signals to the circuit breaker 118, connection of auxiliary contacts that indicate open/close status of the circuit breaker 118, breaker interlocks that prevent closing of the circuit breaker 118 if the circuit breaker 118 is not fully racked into the middle compartment 102b, connections to breaker under voltage relays, and other associated breaker auxiliary components. FIG. 4 also illustrates the lower horizontal bus bars 103d extending outwardly from the rear compartment 102e defined in the second section 101b of the electrical enclosure 101 for allowing connection to one or more other switchgear assemblies.

Figure 5:
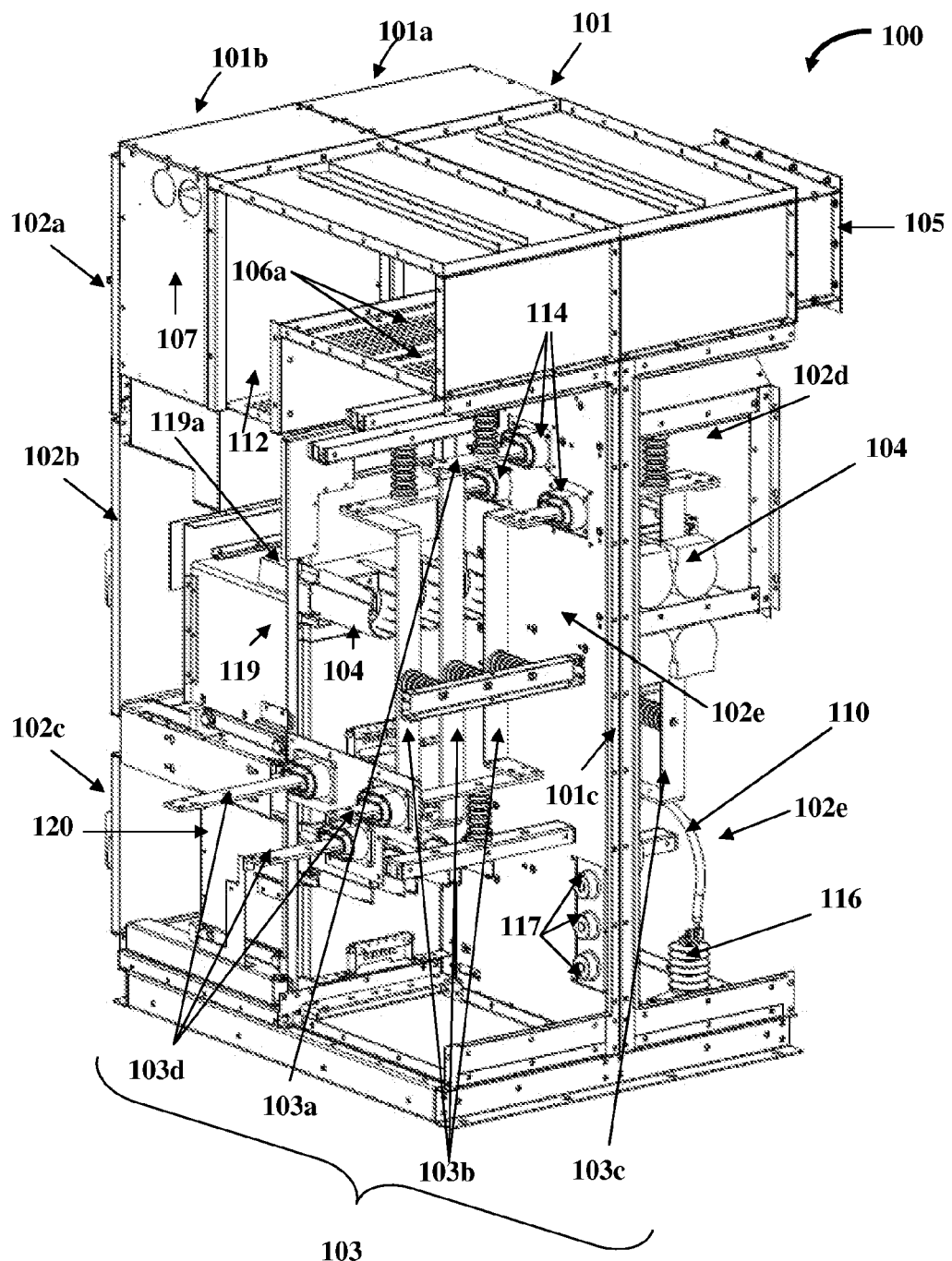
FIG. 5 exemplarily illustrates a cut-away right perspective view of the front accessible switchgear assembly, showing a control power transformer electrically connected in a middle compartment and a potential transformer electrically connected in a lower compartment of the front accessible switchgear assembly.

FIG. 5 exemplarily illustrates a cut-away right perspective view of the front accessible switchgear assembly 100, showing a control power transformer 119 electrically connected in a middle compartment 102b and a potential transformer 120 electrically connected in a lower compartment 102c of the front accessible switchgear assembly 100. FIG. 5 also illustrates the electrical connection of the upper horizontal bus bars 103a to the lower horizontal bus bars 103d via the transitional bus bars 103b disposed in the second section 101b of the electrical enclosure 101.

Figure 6:
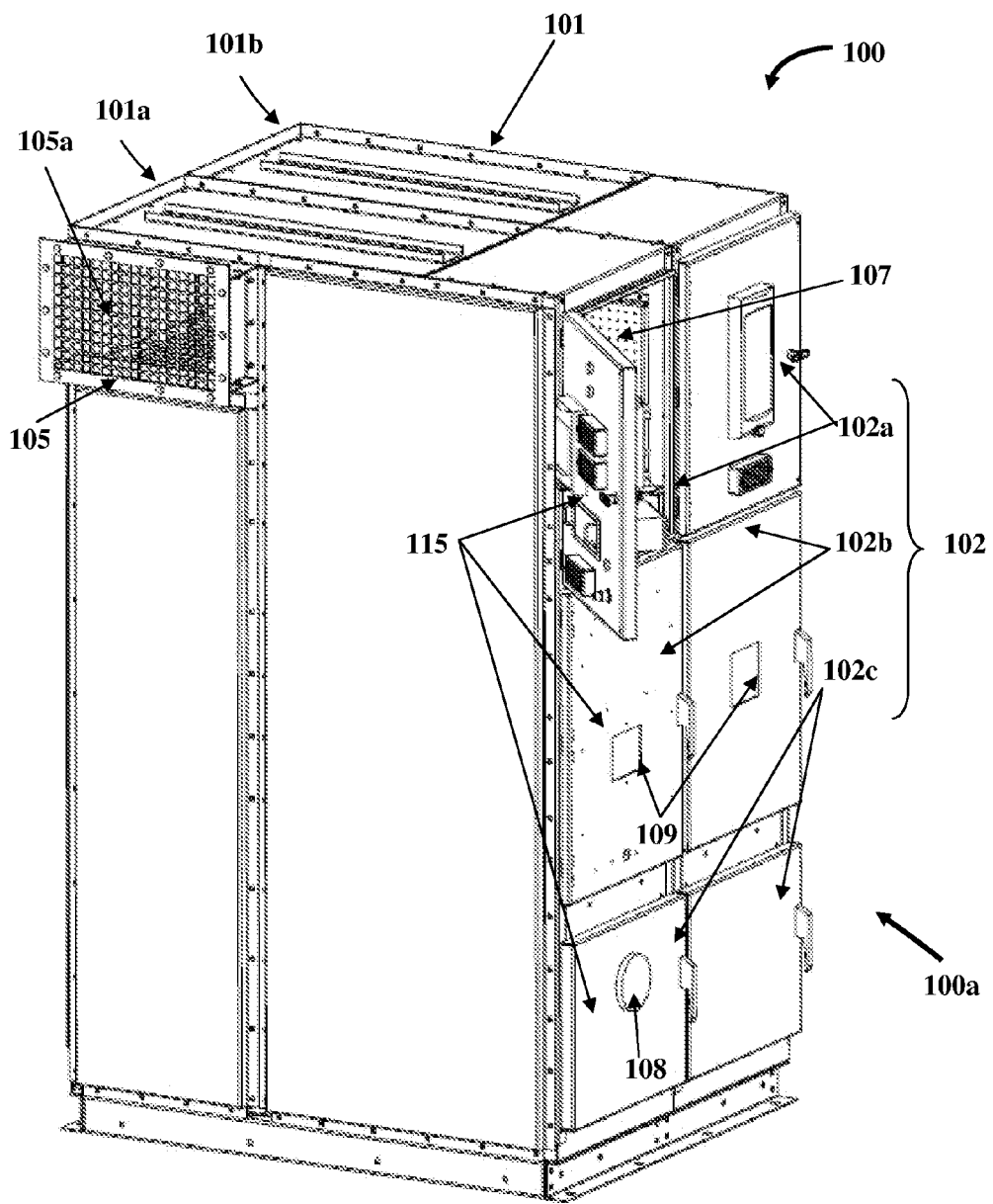
FIG. 6 exemplarily illustrates a left perspective view of the front accessible switchgear assembly.
Figure 7:
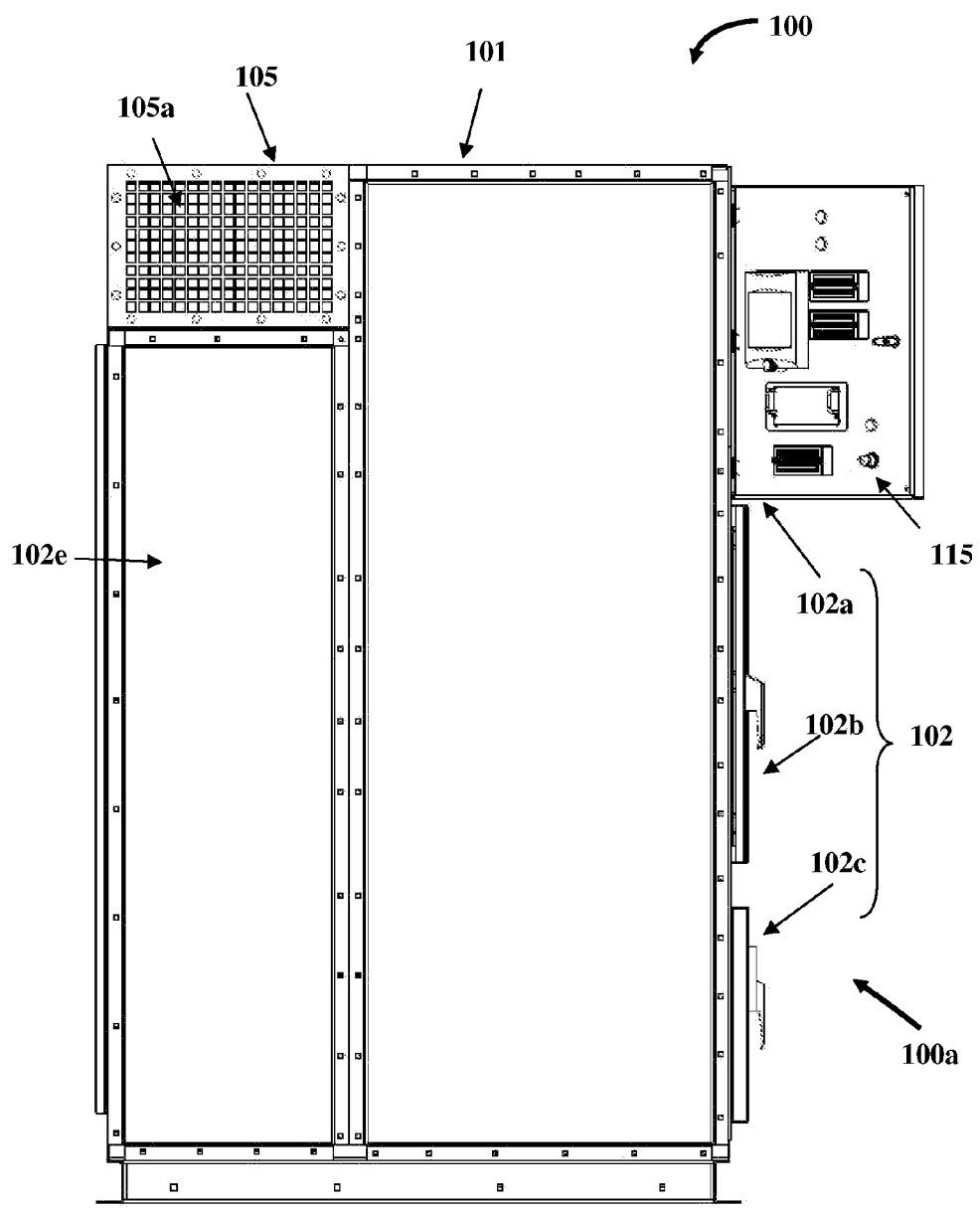
FIG. 7 exemplarily illustrates a left orthogonal view of the front accessible switchgear assembly.

FIG. 6 and FIG. 7 exemplarily illustrate a left perspective view and a left orthogonal view of the front accessible switchgear assembly 100 respectively. Each of the compartments 102 accessible from the front side 100a of the front accessible switchgear assembly 100 are provided with doors 115 that can be opened for allowing front access to the electrical components 111, 113, 118, 119, 120, etc., and the bus bars 103 for inspection and maintenance. The plenum chamber 105 is rearwardly positioned in the first section 101a of the electrical enclosure 101 as disclosed in the detailed description of FIG. 1.

Figure 8:
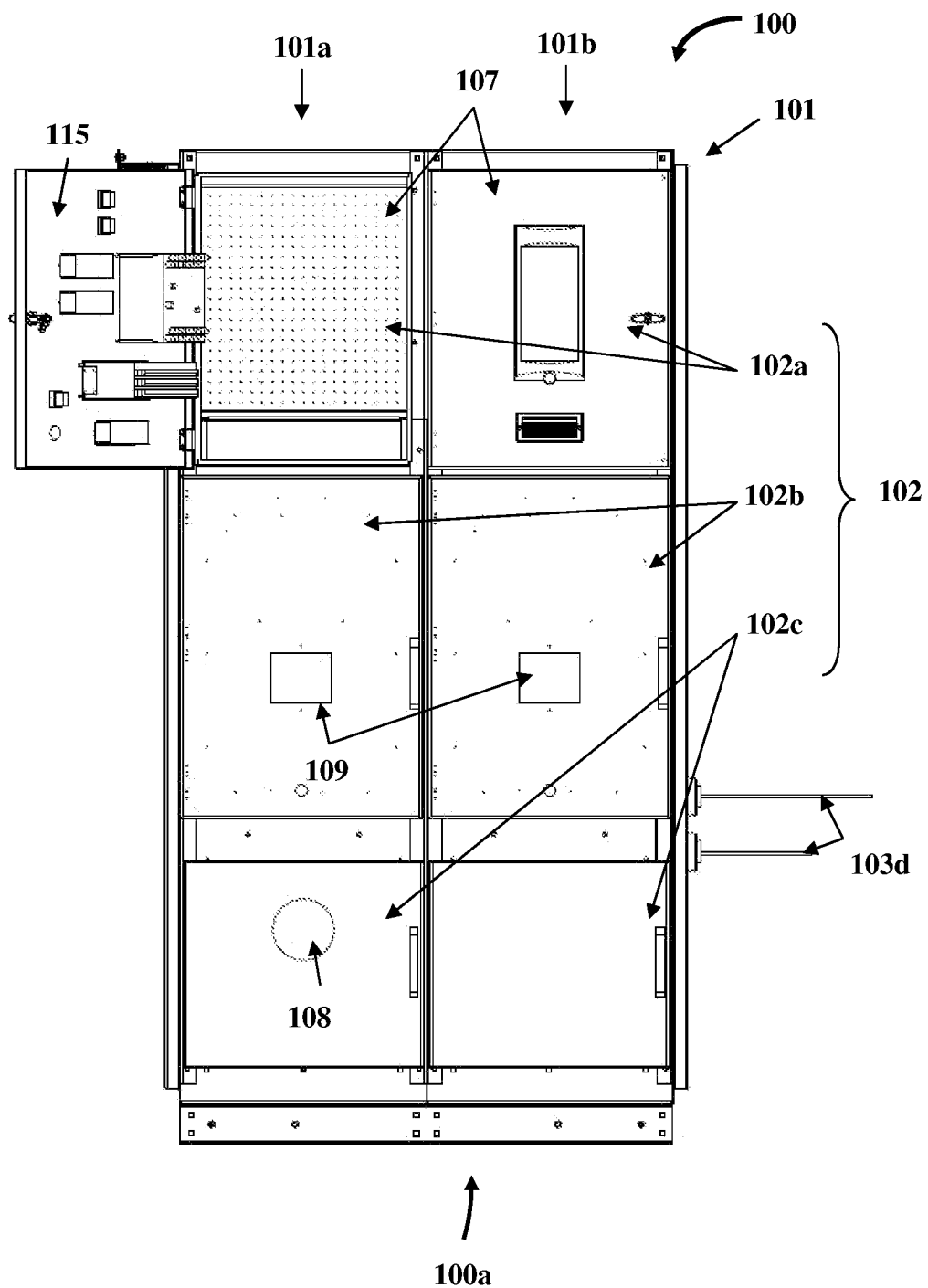
FIG. 8 exemplarily illustrates a front orthogonal view of the front accessible switchgear assembly, showing infrared windows and inspection windows positioned at predetermined locations on the front side of the front accessible switchgear assembly.

FIG. 8 exemplarily illustrates a front orthogonal view of the front accessible switchgear assembly 100, showing infrared windows 108 and inspection windows 109 positioned at predetermined locations on the front side 100a of the front accessible switchgear assembly 100. Doors 115 are provided for accessing the compartments 102 defined in the first section 101a and the second section 101b of the electrical enclosure 101. The infrared windows 108 and the inspection windows 109 are operably positioned on the doors 115 of each of the compartments 102 on the front side 100a of the front accessible switchgear assembly 100. The infrared windows 108 allow front scanning of the electrical components 111, 113, etc., and the bus bars 103 in the compartments 102 for inspection and maintenance. The infrared windows 108 allow an infrared scan for any signs of overheating of the electrical components, for example, the circuit breaker 118, the electrical cables 111, and the bus bars 103, without the requirement of protective gear or clothing. The infrared windows 108 disclosed herein do not rupture during arc testing. The inspection windows 109, for example, windows made of Lexan® of Saudi Basic Industries Corp, provide a front visual indication of the electrical components 111, 113, 118, 119, 120, etc., and the bus bars 103 in the compartments 102 for signs of heating of the electrical components 111, 113, 118, 119, 120, etc., and the bus bars 103 or any other abnormal conditions. Lexan® is a polycarbonate resin thermoplastic material manufactured by Saudi Basic Industries Corp used to construct the inspection windows 109 for the front accessible switchgear assembly 100. The inspection windows 109 provide indication of a malfunction of any of the electrical components 111, 113, 118, 119, 120, etc. For example, the inspection windows 109 provide indications of the circuit breaker 118 from the front side 100a of the front accessible switchgear assembly 100. In an embodiment, the central compartment 102d is, for example, covered with an inspection window 109 made of Lexan®. The infrared windows 108 and the inspection windows 109 are protected from rupture by support brackets 121. A support bracket 121 protecting an inspection window 109 and an infrared window 108 is exemplarily illustrated in FIG. 4, FIG. 15B, and FIG. 15D.

Figure 9:
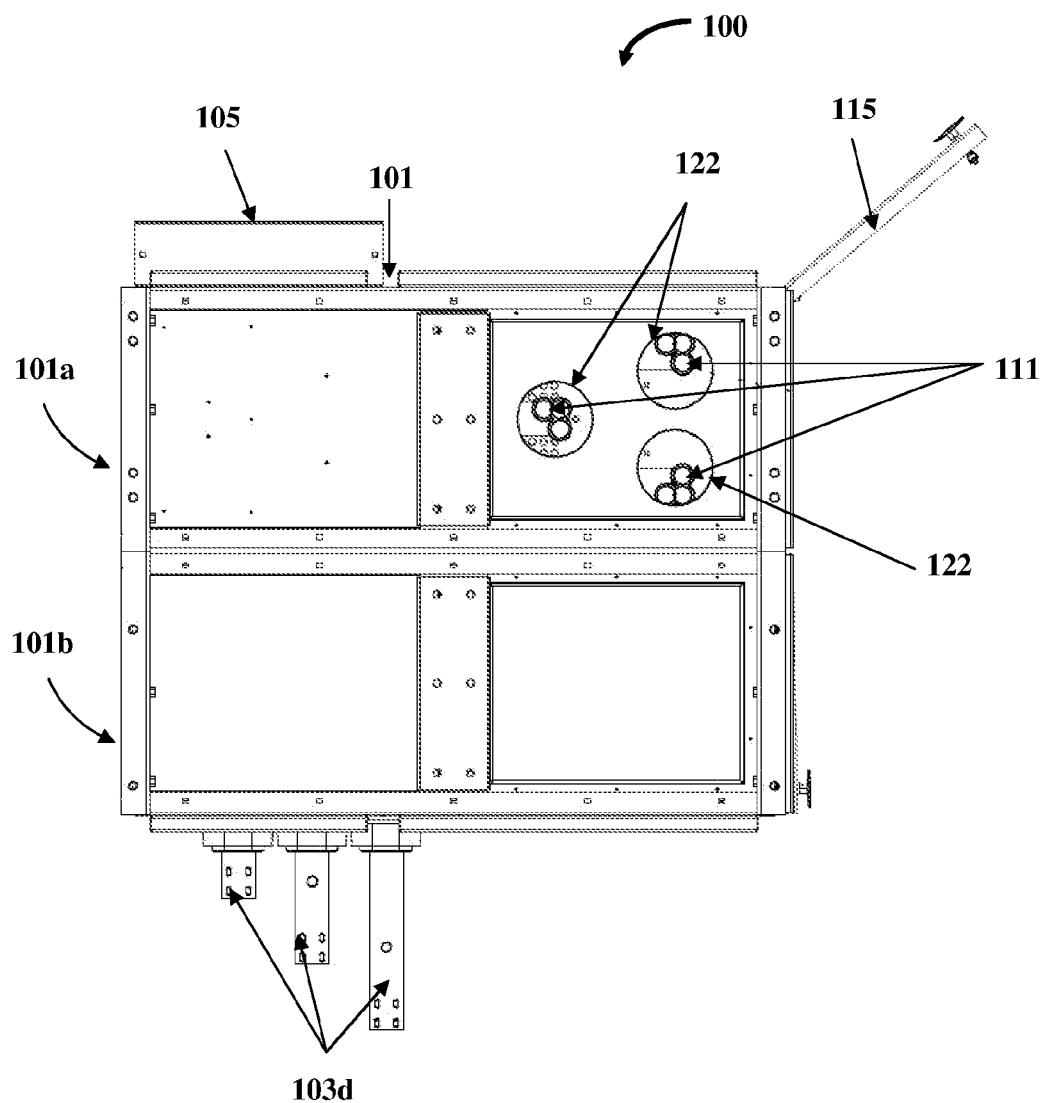
FIG. 9 exemplarily illustrates a bottom orthogonal view of the front accessible switchgear assembly, showing input electrical cables and output electrical cables configured for entry via a lower compartment of the front accessible switchgear assembly.

FIG. 9 exemplarily illustrates a bottom orthogonal view of the front accessible switchgear assembly 100, showing electrical cables 111 configured for entry via a lower compartment 102c of the front accessible switchgear assembly 100. The bottom of the lower compartment 102c defined in the first section 101a of the electrical enclosure 101 comprises cable entry and exit windows 122 that allow the electrical cables 111 to enter into and/or exit from the lower compartment 102c of the front accessible switchgear assembly 100.

Figure 10:
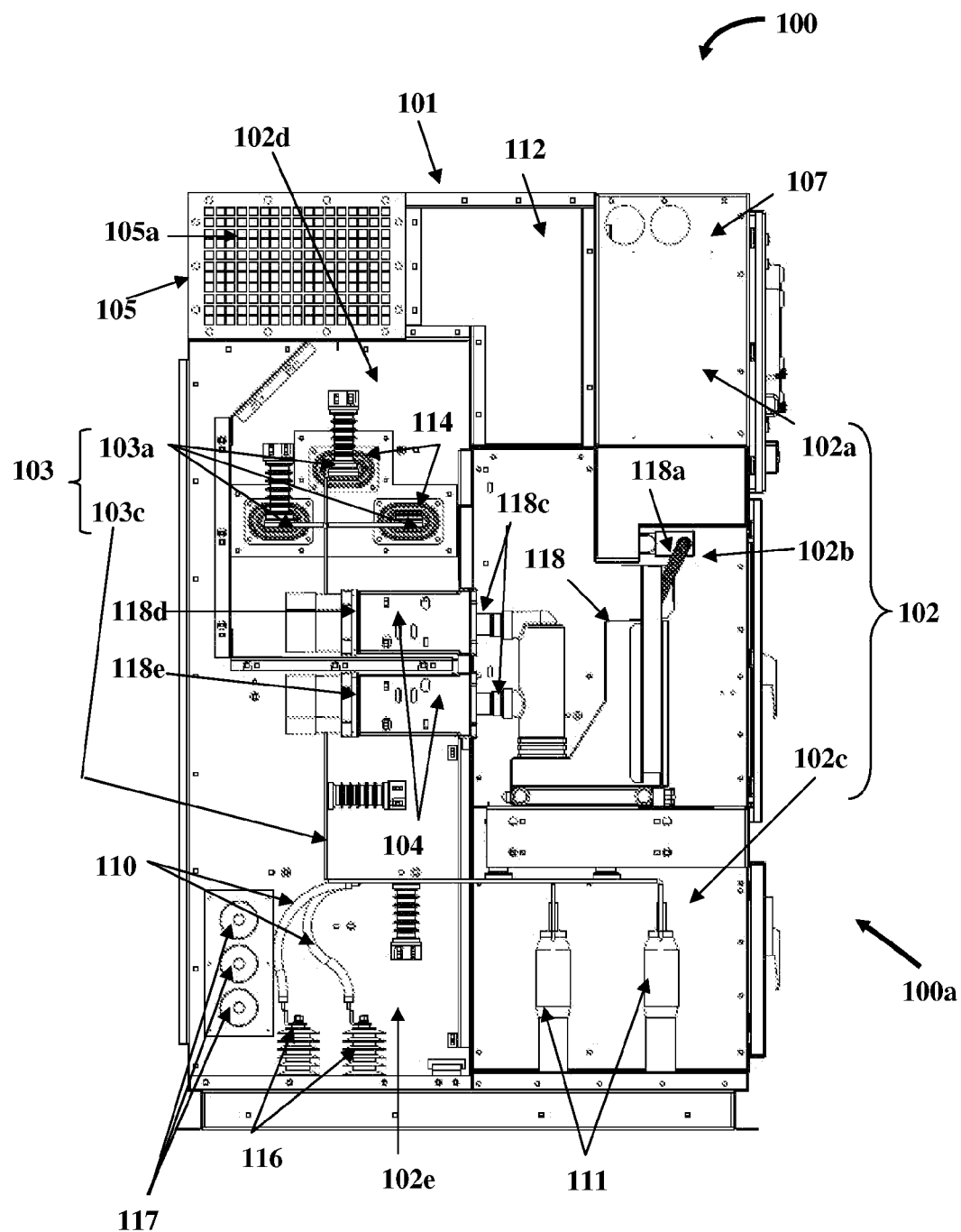
FIG. 10 exemplarily illustrates a cut-away left orthogonal view of the front accessible switchgear assembly, showing a circuit breaker electrically connected in a middle compartment of the front accessible switchgear assembly.

FIG. 10 exemplarily illustrates a cut-away left orthogonal view of the front accessible switchgear assembly 100, showing a circuit breaker 118 electrically connected in a middle compartment 102b of the front accessible switchgear assembly 100. FIG. 10 also illustrates the upper horizontal bus bars 103a electrically connected in the central compartment 102d defined in the first section 101a of the electrical enclosure 101. Tulip contacts 118f connected to the arms 118c of the circuit breaker 118 are mounted in the mounting block assembly 104, when the circuit breaker 118 is racked in the middle compartment 102b. The tulip contacts 118f of the circuit breaker 118 contact a cylindrical bus 104c running inside the mounting block assembly 104. As exemplarily illustrated in FIG. 10, the front accessible switchgear assembly 100 comprises two mounting block assemblies 104 for accommodating incoming circuit breaker connections 118e and outgoing circuit breaker connections 118d. The current transformers 113 are mounted on both the mounting block assemblies 104 that accommodate the incoming circuit breaker connections 118e and the outgoing circuit breaker connections 118d.

As exemplarily illustrated in FIG. 10, the cable connection bus bars 103c extend from the mounting block assembly 104 to the electrical cables 111 electrically connected in the lower compartment 102c defined in the first section 101a of the electrical enclosure 101. When the electrical cables 111 are electrically connected in the lower compartment 102c, the lower compartment 102c and the rear compartment 102e defined in the first section 101a of the electrical enclosure 101 are essentially a single compartment with no sheet metal barriers 101e. In an embodiment, where an electrical component, for example, the potential transformer 120, is mounted in the lower compartment 102c, the lower compartment 102c and the rear compartment 102e defined in the second section 101b of the electrical enclosure 101 are separated by barriers 101e as exemplarily illustrated in FIG. 11.

Figure 11:
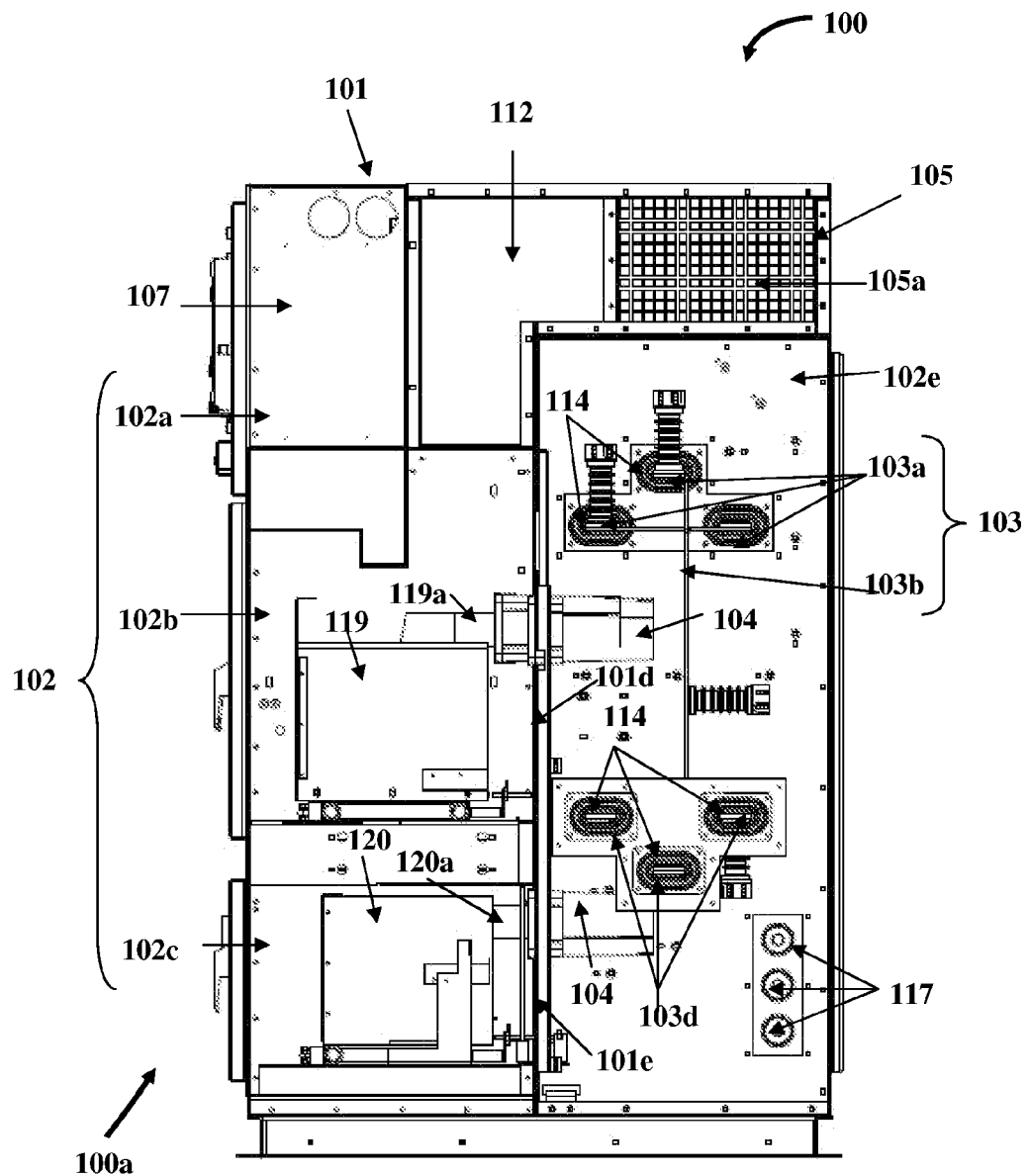
FIG. 11 exemplarily illustrates a cut-away right orthogonal view of the front accessible switchgear assembly, showing a control power transformer electrically connected in a middle compartment and a potential transformer electrically connected in a lower compartment of the front accessible switchgear assembly.

FIG. 11 exemplarily illustrates a cut-away right orthogonal view of the front accessible switchgear assembly 100, showing a control power transformer 119 electrically connected in a middle compartment 102b and a potential transformer 120 electrically connected in a lower compartment 102c of the front accessible switchgear assembly 100. The upper horizontal bus bars 103a disposed in the rear compartment 102e defined in the second section 101b of the electrical enclosure 101 are connected to the lower horizontal bus bars 103d via the transitional bus bars 103b. FIG. 11 also illustrates the upper low voltage compartment 107, the exhaust chamber 112, and the plenum chamber 105 as disclosed in the detailed description of FIG. 1. When an electrical component, for example, the control power transformer 119, is mounted in the middle compartment 102b defined in the second section 101b of the electrical enclosure 101, the middle compartment 102b and the rear compartment 102e defined in the second section 101b of the electrical enclosure 101 are separated by a barrier 101d. When an electrical component, for example, the potential transformer 120, is mounted in the lower compartment 102c defined in the second section 101b of the electrical enclosure 101, the lower compartment 102c and the rear compartment 102e defined in the second section 101b of the electrical enclosure 101 are separated by a barrier 101e.

In an embodiment, the front accessible switchgear assembly 100 disclosed herein further comprises one or more fuse sleeve assemblies 120a operably connected to the potential transformer 120 as disclosed in the detailed description of FIGS. 19A-19E. If the potential transformer 120 is mounted in the middle compartment 102b defined in the second section 101b of the electrical enclosure 101 and if there is an arcing event in the potential transformer 120, the gases are directed to the exhaust chamber 112 via the flaps 106b and 106c into the plenum chamber 105.

The fuse sleeve assemblies 120a operably connected to the potential transformer 120 contact, for example, the cylindrical bus 104c that runs inside the mounting block assembly 104 within the electrical enclosure 101, thereby creating an ultra compact front accessible switchgear assembly 100. In an embodiment, the front accessible switchgear assembly 100 disclosed herein further comprises one or more fuse sleeve assemblies 119a operably connected to the control power transformer 119 as disclosed in the detailed description of FIGS. 18A-18E. The fuse sleeve assemblies 119a operably connected to the control power transformer 119 contact, for example, the cylindrical bus 104c that runs inside the mounting block assembly 104 within the electrical enclosure 101, thereby creating an ultra compact front accessible switchgear assembly 100. The fuse sleeve assemblies 119a and 120a of the control power transformer 119 and the potential transformer 120 respectively contact one or more of the bus bars 103 in, for example, a rear compartment 102e within the electrical enclosure 101 via the mounting block assembly 104.

Figure 12:
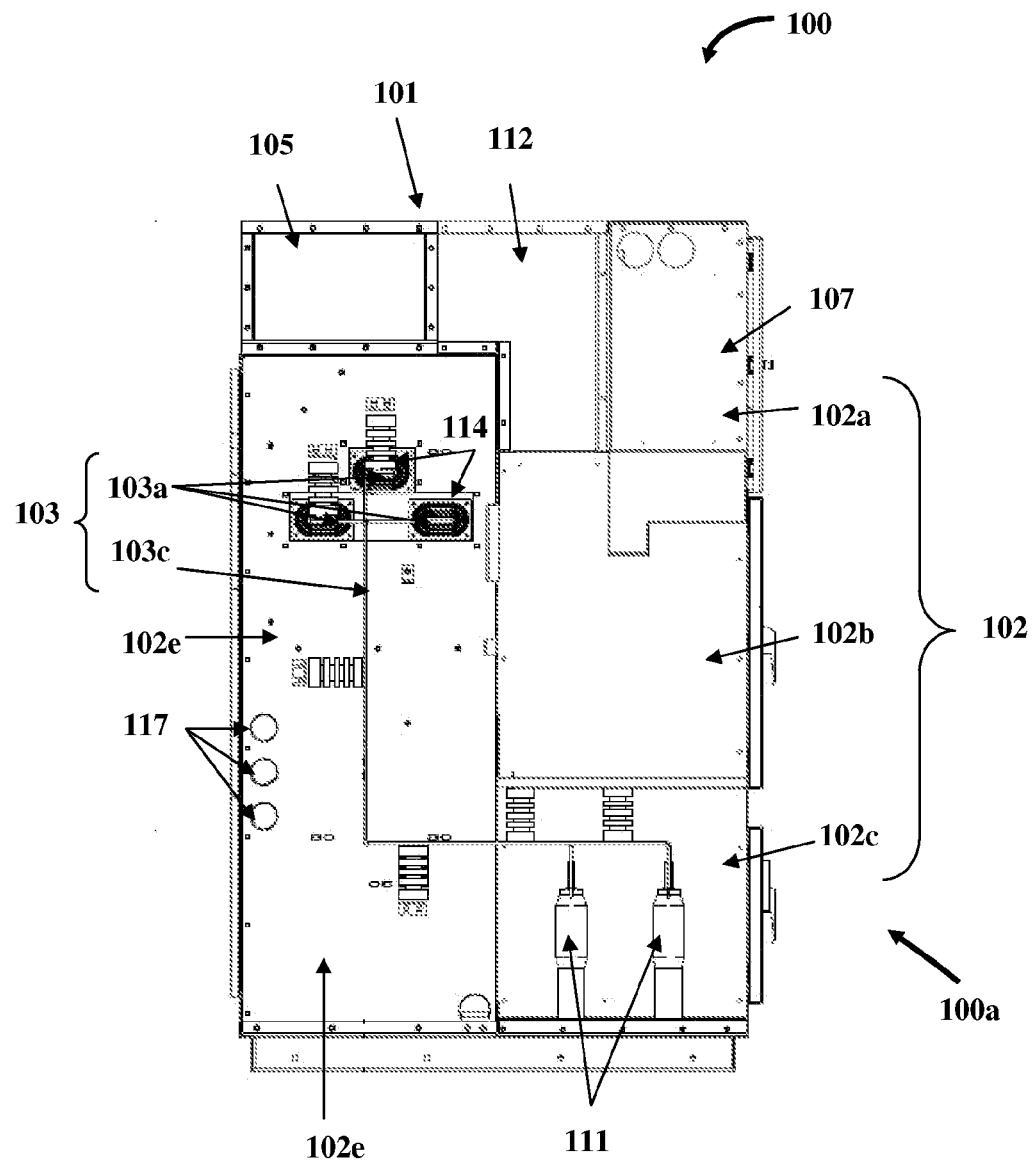
FIG. 12 exemplarily illustrates a cut-away left orthogonal view of the front accessible switchgear assembly, showing input electrical cables and output electrical cables electrically connected to upper horizontal bus bars via cable connection bus bars.

FIG. 12 exemplarily illustrates a cut-away left orthogonal view of the front accessible switchgear assembly 100, showing electrical cables 111 electrically connected to the upper horizontal bus bars 103a via the cable connection bus bars 103c. The upper low voltage compartment 107 is isolated from the plenum chamber 105 via the exhaust chamber 112. The exhaust chamber 112 isolates the gases from the plenum chamber 105 from entering the upper low voltage compartment 107, for example, by using a sheet metal barrier. In the front accessible switchgear assembly 100 exemplarily illustrated in FIG. 12, the middle compartment 102b can accommodate the control power transformer 119 or the epoxy encapsulated potential transformer 120. The middle compartment 102b can also be configured as a low voltage compartment 107.

Figure 13A:
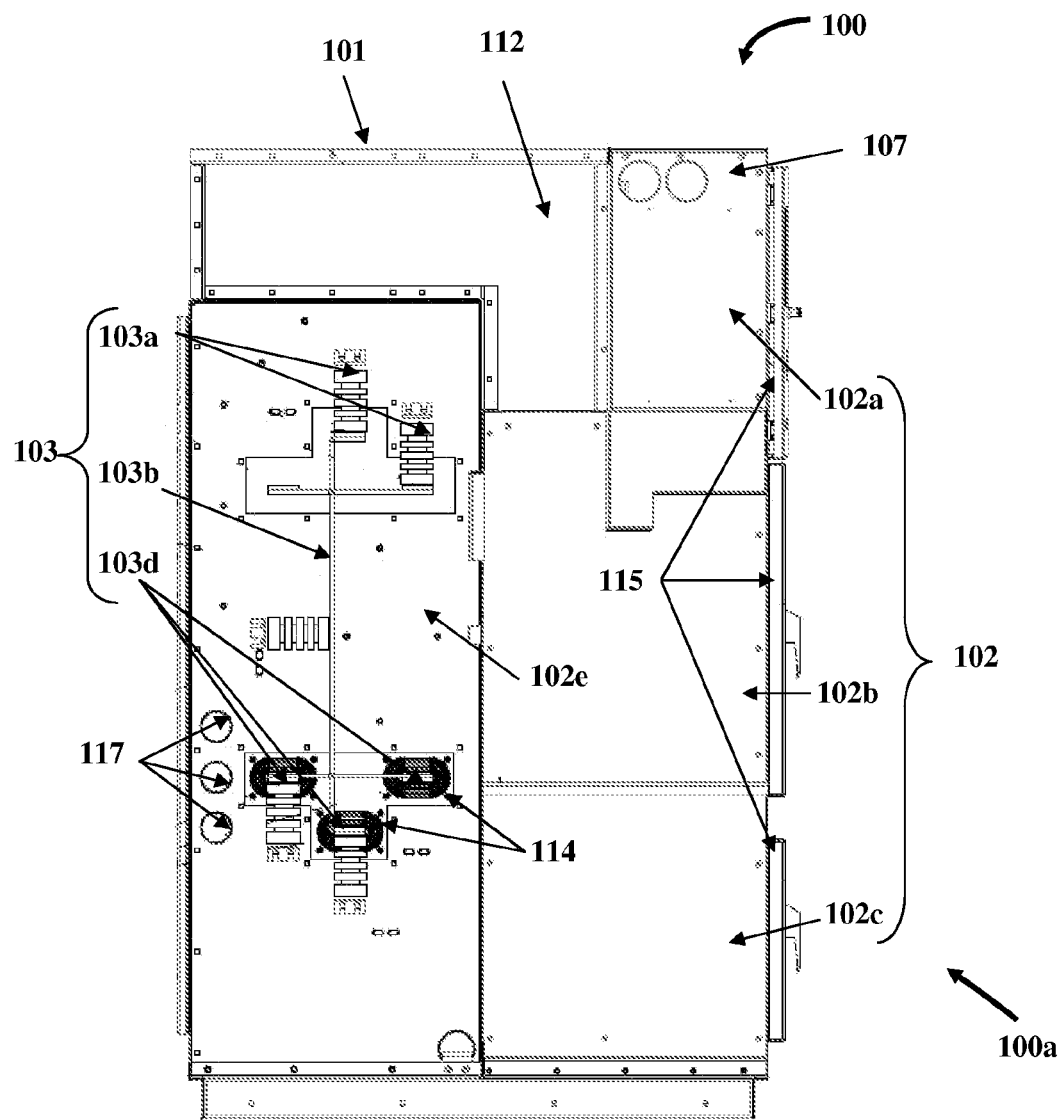
FIGS. 13A-13B exemplarily illustrate cut-away left orthogonal views of a second section of the front accessible switchgear assembly, showing electrical connection of the upper horizontal bus bars from a first section of the electrical enclosure to the lower horizontal bus bars in the second section of the electrical enclosure via transitional bus bars.
Figure 13B:
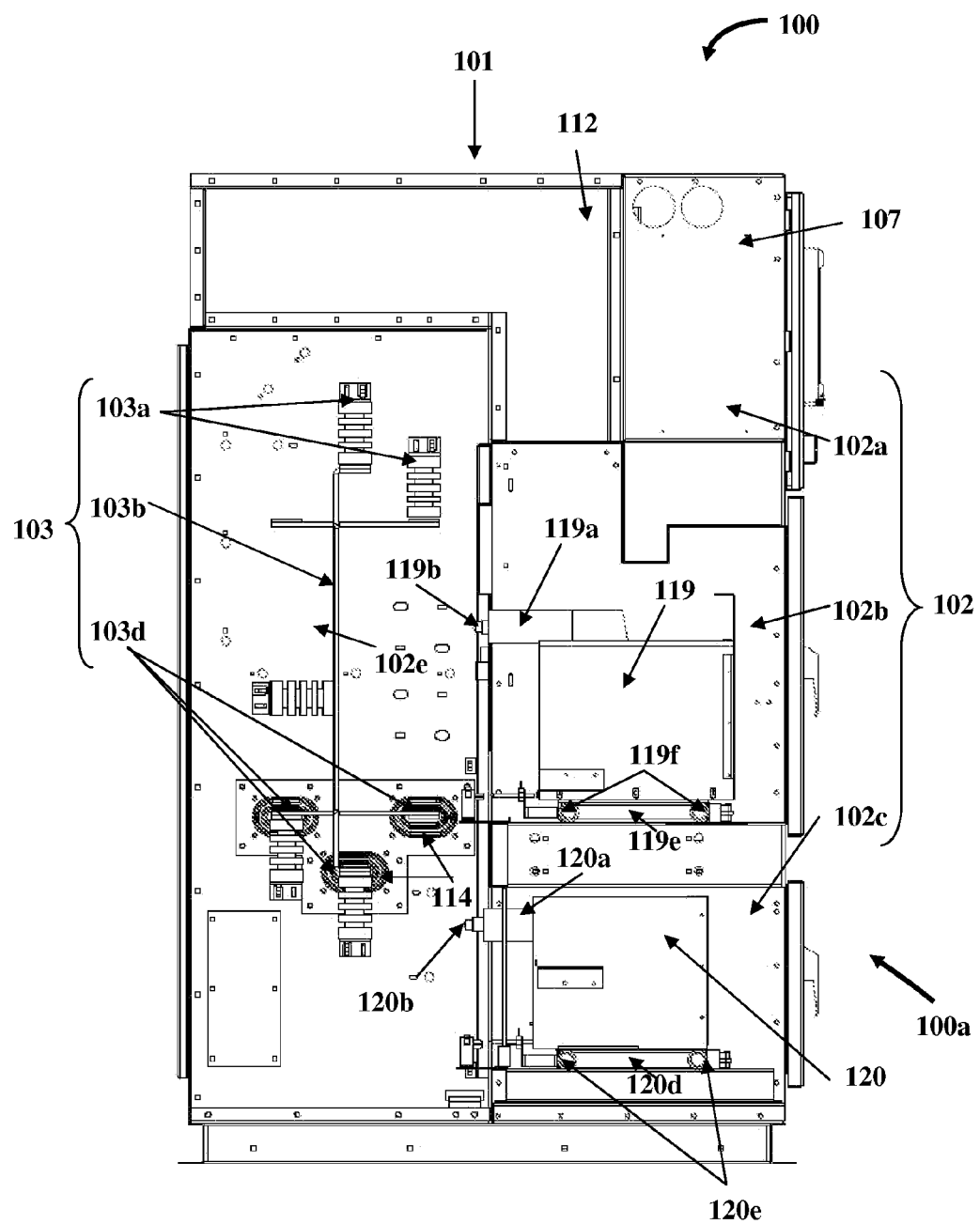

FIGS. 13A-13B exemplarily illustrate cut-away left orthogonal views of a second section 101b of the front accessible switchgear assembly 100, showing electrical connection of the upper horizontal bus bars 103a from a first section 101a of the electrical enclosure 101 to the lower horizontal bus bars 103d in the second section 101b of the electrical enclosure 101 via the transitional bus bars 103b.

The upper horizontal bus bars 103a and the lower horizontal bus bars 103d can be configured to connect adjacent sections 101a and 101b of a single front accessible switchgear assembly 100 and/or adjacent switchgear assemblies. In an embodiment, the upper horizontal bus bars 103a are electrically connected to the lower horizontal bus bars 103d via, for example, the circuit breaker 118 as exemplarily illustrated in FIG. 14. In an embodiment, the upper horizontal bus bars 103a run between the first section 101a and the second section 101b defined in the electrical enclosure 101 of the front accessible switchgear assembly 100 to electrically connect the upper horizontal bus bars 103a to the output of the circuit breaker 118. In another embodiment, the upper horizontal bus bars 103a are configured to electrically connect to the electrical cables 111 in the lower compartment 102c defined in the first section 101a of the electrical enclosure 101. The front accessible switchgear assembly 100 disclosed herein allows flexibility in configuring the bus bars 103 for any electrical connections required in the electrical enclosure 101. Also illustrated in FIG. 13B is the control power transformer 119 electrically connected in the middle compartment 102b defined in the second section 101b of the electrical enclosure 101, and the potential transformer 120 electrically connected in the lower compartment 102c defined in the second section 101b of the electrical enclosure 101.

Figure 14:
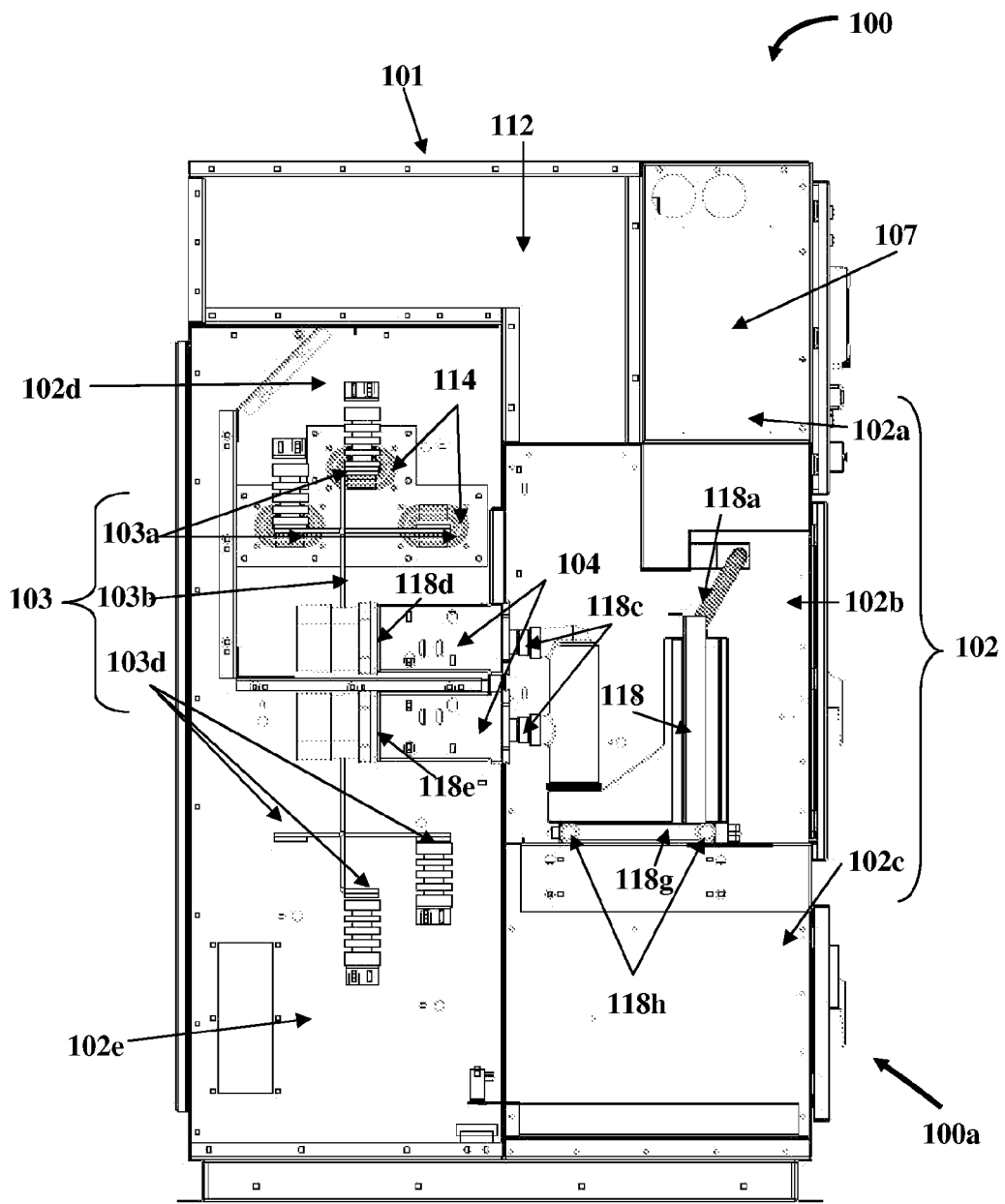
FIG. 14 exemplarily illustrates a cut-away left orthogonal view of the first section of the front accessible switchgear assembly, showing the upper horizontal bus bars accommodated in a central compartment of the front accessible switchgear assembly and electrically connected to the lower horizontal bus bars that extend into the second section of the front accessible switchgear assembly via a circuit breaker.

FIG. 14 exemplarily illustrates a cut-away left orthogonal view of the first section 101a of the front accessible switchgear assembly 100, showing the upper horizontal bus bars 103a accommodated in a central compartment 102d of the front accessible switchgear assembly 100 and electrically connected to the lower horizontal bus bars 103d that extend into the second section 101b of the front accessible switchgear assembly 100 via a circuit breaker 118. In this embodiment, the upper horizontal bus bars 103a are connected to the lower horizontal bus bars 103d in the rear compartment 102e of the electrical enclosure 101 via the circuit breaker 118. The circuit breaker 118 is electrically connected in the middle compartment 102b defined in the first section 101a of the electrical enclosure 101. The tulip contacts 118f on the arms 118c of the circuit breaker 118 contact the cylindrical bus 104c that runs inside each of the mounting block assemblies 104 which extend into the central compartment 102d and the rear compartment 102e defined in the first section 101a of the electrical enclosure 101.

Figure 15A:
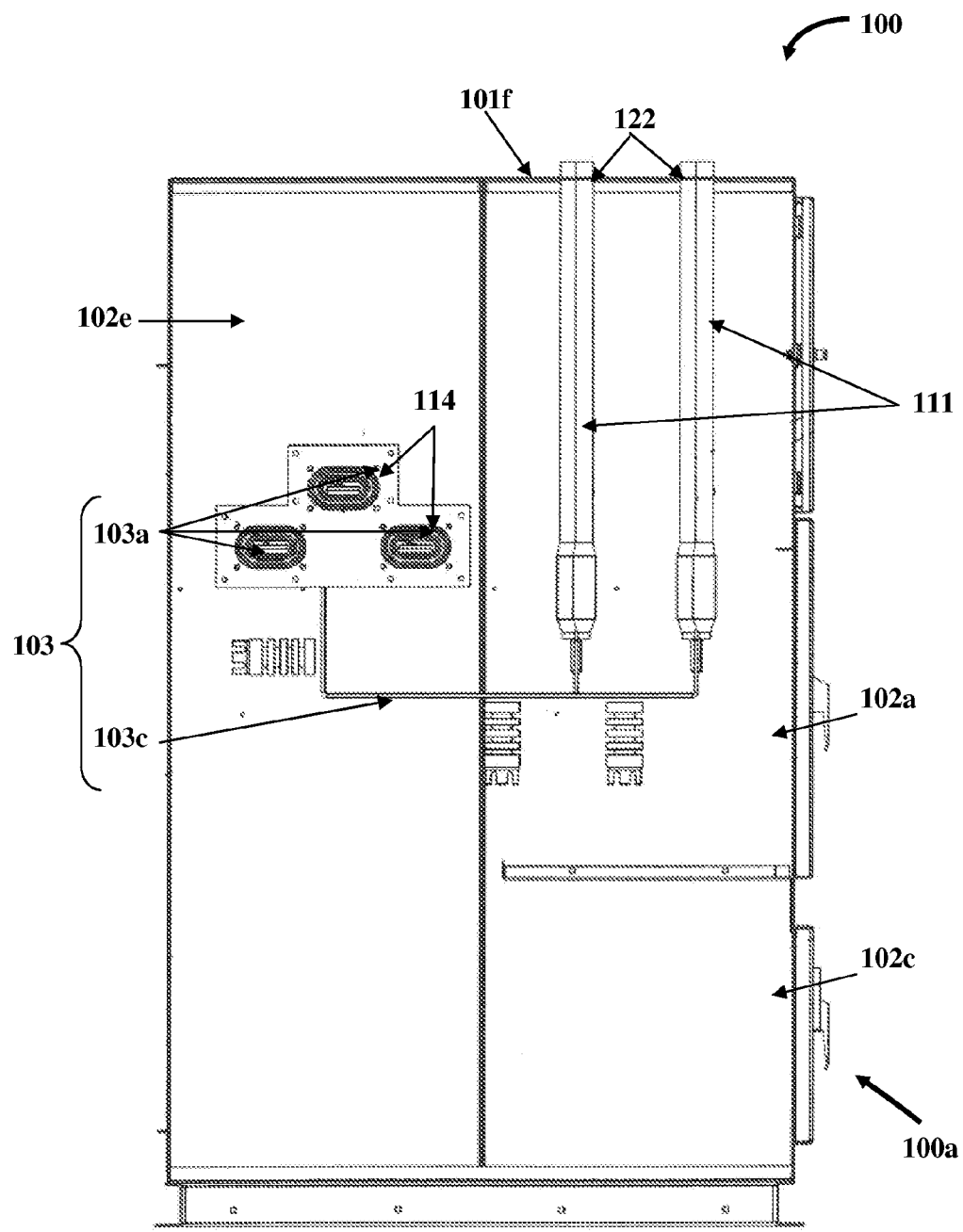
FIG. 15A exemplarily illustrates a cut-away left orthogonal view of the front accessible switchgear assembly, showing input electrical cables and output electrical cables configured for entry via an upper compartment of the front accessible switchgear assembly, and electrically connected to upper horizontal bus bars via cable connection bus bars.

FIG. 15A exemplarily illustrates a cut-away left orthogonal view of the front accessible switchgear assembly 100, showing the electrical cables 111 configured for entry via an upper compartment 102a of the front accessible switchgear assembly 100. The electrical cables 111 are electrically connected to the upper horizontal bus bars 103a via the cable connection bus bars 103c. In this embodiment, the front accessible switchgear assembly 100 further comprises cable entry and exit windows 122 defined on the upper end 101f of the electrical enclosure 101. The electrical cables 111 enter the upper compartment 102a defined in the first section 101a of the electrical enclosure 101 via the cable entry and exit windows 122. In this embodiment, the electrical cables 111 extend from the upper compartment 102a into the middle compartment 102b and electrically connect to the upper horizontal bus bars 103a in the rear compartment 102e defined in the first section 101a of the electrical enclosure 101 via the cable connection bus bars 103c. In an embodiment, the electrical cables 111 are directly connected to the upper horizontal bus bars 103a. The compartment that accommodates the electrical cables 111 cannot be configured as a low voltage compartment 107. In the front accessible switchgear assembly 100 exemplarily illustrated in FIG. 15A, the lower compartment 102c can accommodate the epoxy encapsulated potential transformer 120. The lower compartment 102c can also be configured as a low voltage compartment 107.

Figure 15B:
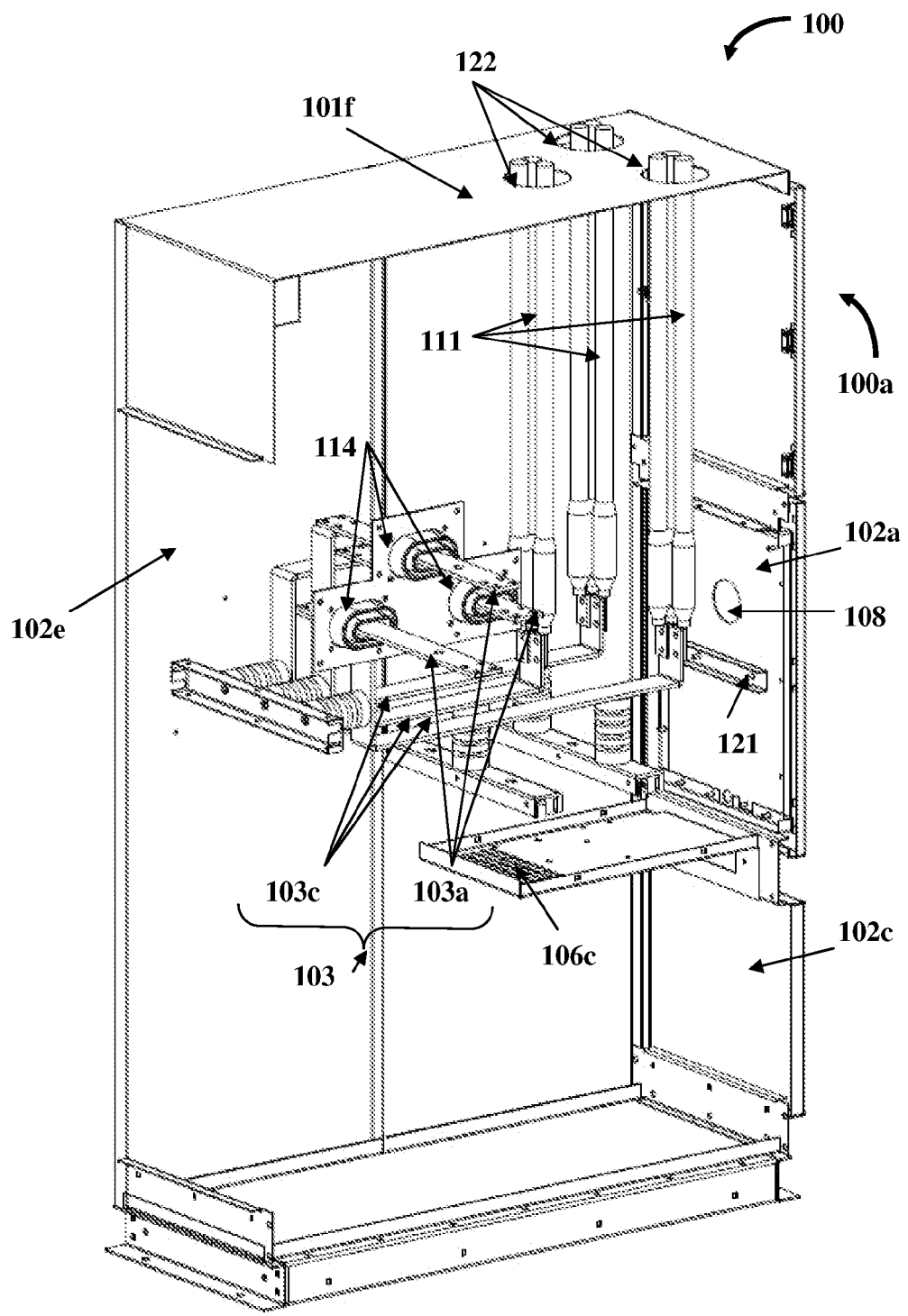
FIG. 15B exemplarily illustrates a cut-away left perspective view of the front accessible switchgear assembly, showing input electrical cables and output electrical cables configured for entry via an upper compartment, and a support bracket for protecting an infrared window positioned on a front side of the front accessible switchgear assembly.

FIG. 15B exemplarily illustrates a cut-away left perspective view of the front accessible switchgear assembly 100, showing the electrical cables 111 configured for entry via an upper compartment 102a. FIG. 15B also illustrates a support bracket 121 that protects an infrared window 108 positioned on the front side 100a of the front accessible switchgear assembly 100. The support bracket 121 is connected below the infrared window 108 for protecting the infrared window 108 from rupture due to the pressure of gases during an event of arcing. In the event of arcing in the lower compartment 102c, the gases exit through the flap 106c of the middle compartment 102b through the exhaust chamber 112 and into the plenum chamber 105.

Figure 15C:
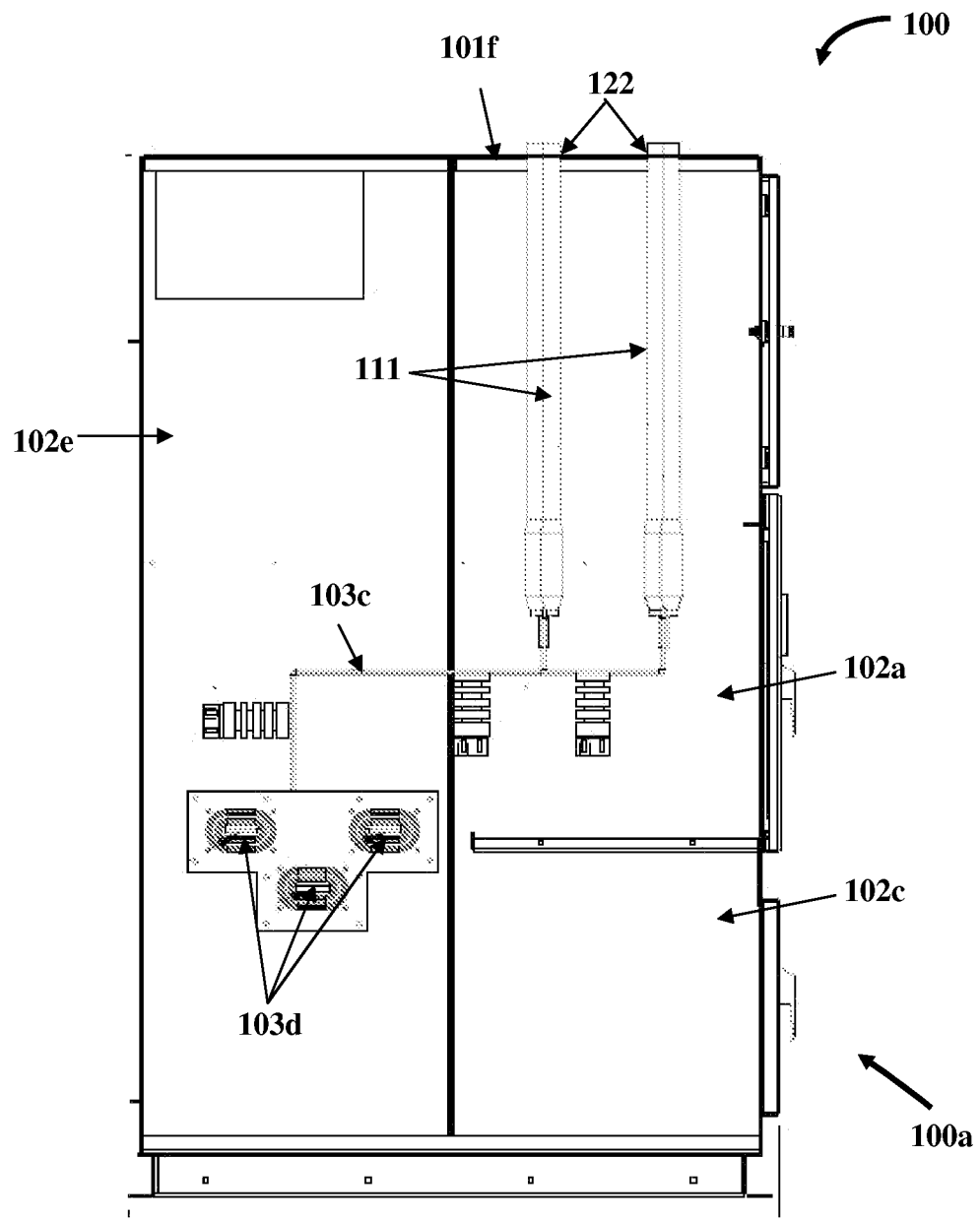
FIG. 15C exemplarily illustrates a cut-away left orthogonal view of the front accessible switchgear assembly, showing input electrical cables and output electrical cables configured for entry via an upper compartment of the front accessible switchgear assembly, and electrically connected to lower horizontal bus bars via cable connection bus bars.
Figure 15D:
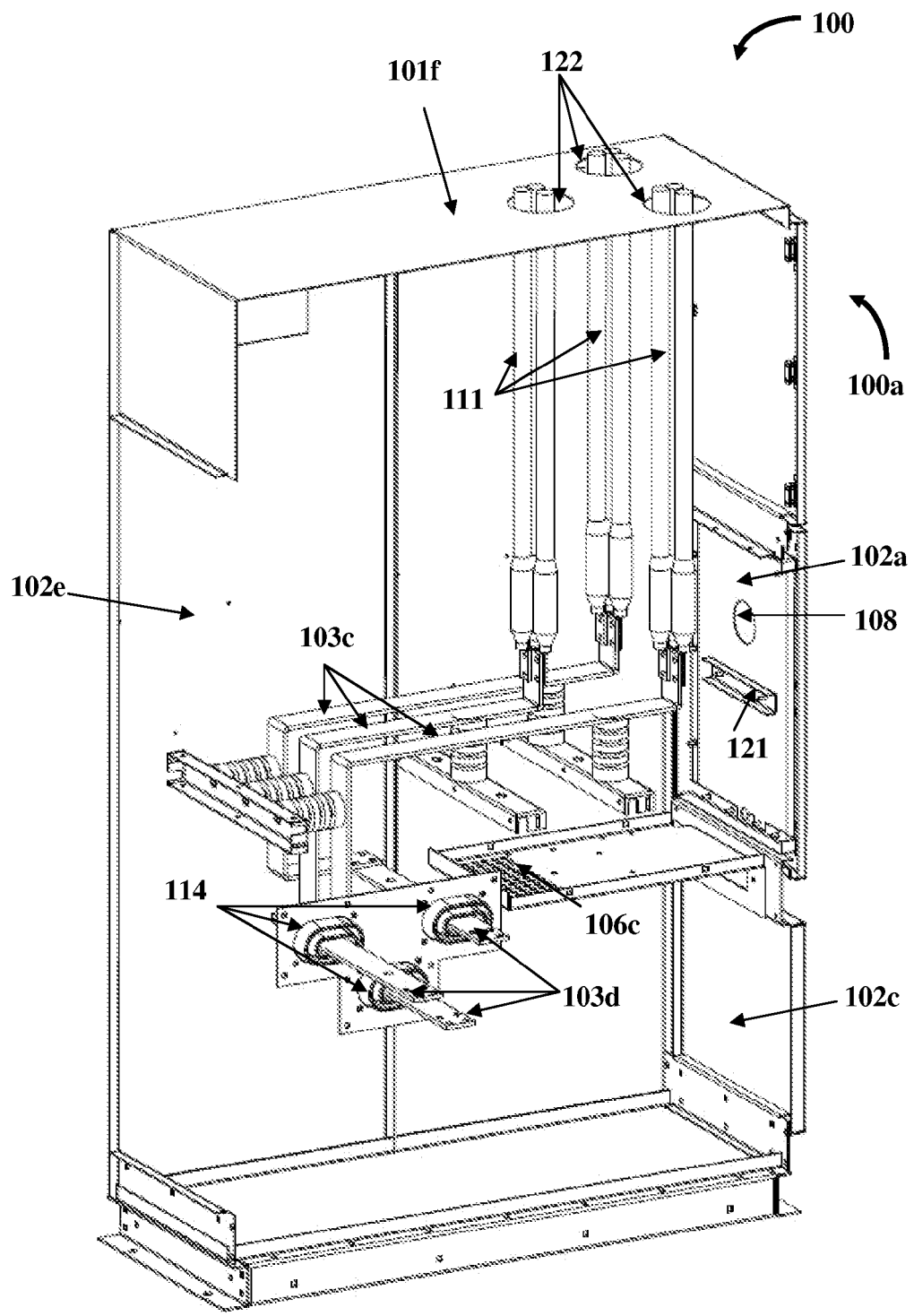
FIG. 15D exemplarily illustrates a cut-away left perspective view of the front accessible switchgear assembly, showing input electrical cables and output electrical cables configured for entry via an upper compartment, and a support bracket for protecting an infrared window positioned on a front side of the front accessible switchgear assembly.

FIG. 15C exemplarily illustrates a cut-away left orthogonal view of the front accessible switchgear assembly 100, showing the electrical cables 111 configured for entry via an upper compartment 102a of the front accessible switchgear assembly 100. The electrical cables 111 are electrically connected to the lower horizontal bus bars 103d via the cable connection bus bars 103c. FIG. 15D exemplarily illustrates a cut-away left perspective view of the front accessible switchgear assembly 100, showing the electrical cables 111 configured for entry via the upper compartment 102a. FIG. 15D also illustrates a support bracket 121 that protects an infrared window 108 positioned on the front side 100a of the front accessible switchgear assembly 100. The support bracket 121 below the infrared window 108 protects the infrared window 108 from rupture due to the pressure of gases during an event of arcing.

Figure 16A:
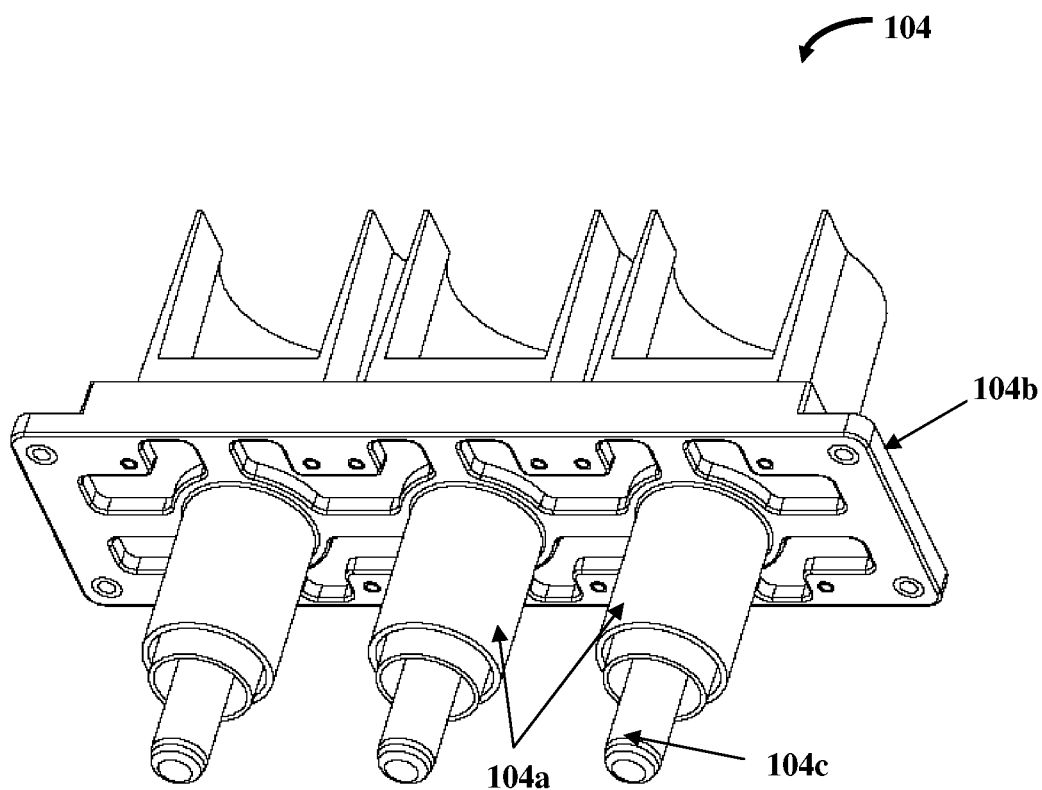
FIGS. 16A-16C exemplarily illustrate perspective views of a mounting block assembly of the front accessible switchgear assembly.
Figure 16B:
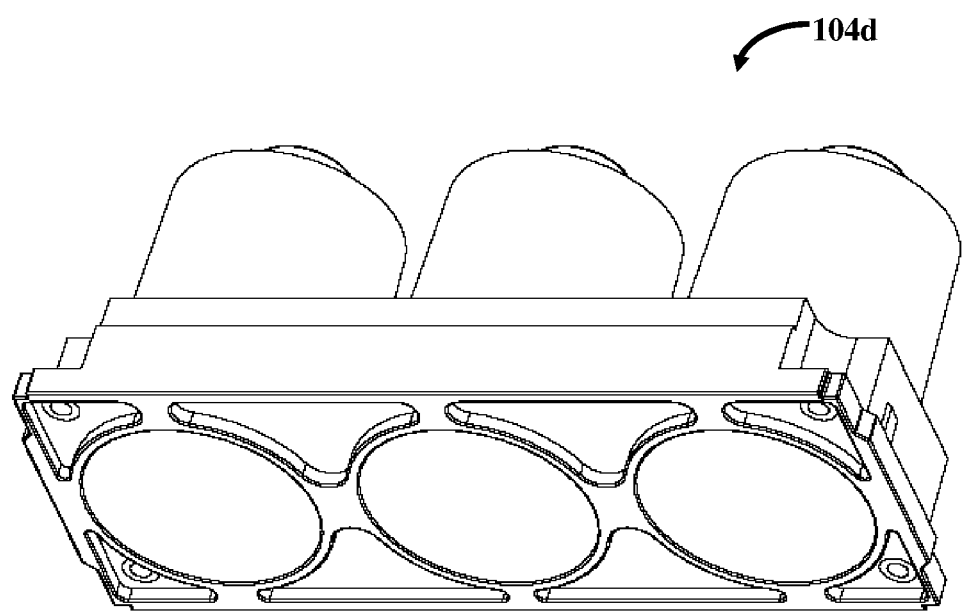
Figure 16C:
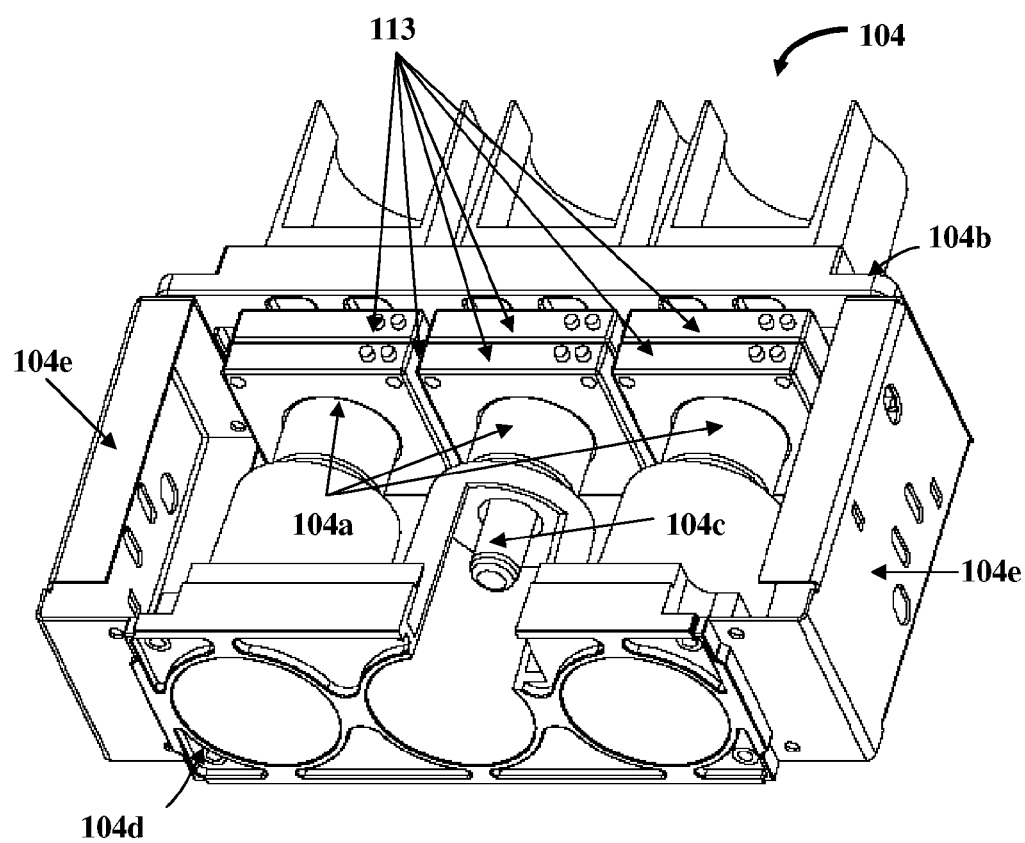

FIGS. 16A-16C exemplarily illustrate perspective views of a mounting block assembly 104 of the front accessible switchgear assembly 100. The mounting block assembly 104 of the front accessible switchgear assembly 100 is configured as a monoblock for mounting the electrical components 113, 118, 119, 120, etc., in the front accessible switchgear assembly 100. As used herein, the term "monoblock" refers to a block configuration that accommodates all three phases in the electrical enclosure 101. The monoblock configuration of the mounting block assembly 104 allows compact arrangement of the electrical components 113, 118, 119, 120, etc., in the electrical enclosure 101, thereby providing a compact front accessible switchgear assembly 100. The monoblock configuration requires a large compression mold and is configured to meet Underwriters Laboratories (UL) flame and tracking tests for a 15 kV front accessible switchgear assembly 100.

The mounting block assembly 104 comprises a base mounting block 104b, mounting legs 104a, and a mounting block cover 104d. The mounting block assembly 104 is positioned in one of the compartments 102, for example, the middle compartment 102b defined in the first section 101a and the second section 101b of the electrical enclosure 101, as exemplarily illustrated in FIGS. 1A-1B, FIGS. 2-5, FIGS. 10-11, and FIG. 14, for mounting one or more of the electrical components, for example, one or more current transformers 113. The current transformers 113 are used for metering or relaying in the front accessible switchgear assembly 100. The mounting legs 104a extend frontwardly from the base mounting block 104b, as exemplarily illustrated in FIG. 16A, for mounting the electrical components 113, 118, etc., and allowing front access to the mounted electrical components 113, 118, etc., for inspection and maintenance. A cylindrical bus 104c, for example, made of copper runs inside the mounting legs 104a of the mounting block assembly 104. The cylindrical bus 104c is configured, for example, as a copper pin. The cylindrical bus 104c extends frontwardly to contact the electrical components, for example, the circuit breaker 118 mounted in the mounting block assembly 104. For example, the cylindrical bus 104c of the mounting block assembly 104 contacts each of the tulip contacts 118f of the circuit breaker 118 when the circuit breaker 118 is racked in the middle compartment 102b defined in the first section 101a of the electrical enclosure 101 as exemplarily illustrated in FIGS. 17C-17D. In another example, the cylindrical bus 104c of the mounting block assembly 104 contacts each of the fuse sleeve assemblies 119a of the control power transformer 119, when the control power transformer 119 is racked in the middle compartment 102b defined in the second section 101b of the electrical enclosure 101 as exemplarily illustrated in FIGS. 18D-18E. In another example, the cylindrical bus 104c of the mounting block assembly 104 contacts each of the fuse sleeve assemblies 120a of the epoxy encapsulated potential transformer 120, when the epoxy encapsulated potential transformer 120 is racked in the lower compartment 102c defined in the second section 101b of the electrical enclosure 101 as exemplarily illustrated in FIGS. 19D-19E.

The mounting block cover 104d as exemplarily illustrated in FIG. 16B is removably attached to the base mounting block 104b for enclosing the mounted current transformers 113 on the mounting legs 104a as exemplarily illustrated in FIG. 16C. Brackets 104e are provided on both sides of the mounting block assembly 104 for enclosing the mounting block cover 104d and the mounted current transformers 113 on the mounting legs 104a and for providing support to the mounting block assembly 104. The mounting block cover 104d is removable for providing front access to the mounted current transformers 113 for inspection, maintenance, and service. For example, the mounting block cover 104d can be removed from the front by operating personnel for inspecting the current transformers 113 mounted on the mounting block assembly 104.

The mounting block assembly 104 with a pair of current transformers 113 mounted on each of the mounting legs 104a on the base mounting block 104b, where the pair of the current transformers 113 is enclosed by the mounting block cover 104d and the brackets 104e is exemplarily illustrated in FIG. 16C. The current transformer 113 is, for example, a ring type current transformer with a voltage rating of, for example, 600V. The compact design of the mounting block assembly 104 allows usage of current transformers 113 of lower voltage rating, for example, 600V, in the front accessible switchgear assembly 100 of a medium voltage, for example, 15,000V. Each mounting block assembly 104 has rear bus connections. The cylindrical bus 104c made of, for example, copper, runs inside the mounting legs 104a of the mounting block assembly 104. When the circuit breaker 118 is mounted in the mounting block assembly 104 accommodated in the middle compartment 102b defined in the first section 101a of the electrical enclosure 101, the tulip contacts 118f on the arms 118c of the circuit breaker 118 make a solid electrical connection with the cylindrical bus 104c inside the mounting block assembly 104 as exemplarily illustrated in FIGS. 17C-17D. The cylindrical bus 104c is in electrical communication with each of the tulip contacts 118f of the circuit breaker 118 inside the mounting block assembly 104.

The mounting block assembly 104 is configured to reduce temperature rise in the compartments 102. For example, the material of the mounting block assembly 104 is pigmented with a black colored material to limit the temperature rise in the middle compartment 102b that accommodates the circuit breaker 118 to meet standards of Underwriters Laboratories® and other agency standards. The black colored material of the mounting block assembly 104 keeps the temperature rise in the compartments 102 to allowable agency limits. The mounting block assembly 104 pigmented with the black colored material acts as a black body and absorbs heat, thereby limiting the temperature rise of the electrical components 111, 118, etc., for example, conductors of the circuit breaker 118 and the bus bars 103 in the middle compartment 102b. The use of black colored material eliminates the need for expensive and bulky heat sinks required to limit the temperature rise of the electrical components 111, 118, etc., and the bus bars 103. The use of the black colored material for the mounting block assemblies 104, painting inside the compartments 102 in black color, and use of larger cross section bus bars 103 in the front accessible switchgear assembly 100 disclosed herein achieves a compact footprint.

The mounting block assembly 104 is, for example, made of a glass polyester composition, plastics such as a polyethylene material, or any other suitable material. Glass polyester requires a compression mold, while the polyethylene material uses a silicon mold for quick production of the mounting block assembly 104. Other insulating materials and other molding techniques can be employed for the manufacture of the mounting block assembly 104.

The front accessible switchgear assembly 100 is configured to mount one or more low voltage current transformers 113, for example, 600 volts current transformers in a high voltage circuit, for example, 15000 volts circuit. Mounting of the low voltage current transformers 113, for example, a 600V current transformers in high voltage and medium voltage circuits provides for space and cost savings. The front accessible switchgear assembly 100 disclosed herein enables mounting of multiple current transformers 113 on each phase input and output. More than one current transformer 113 can be installed on each mounting leg 104a of the mounting block assembly 104. The current transformers 113 are configured, for example, for control, for protection, etc. Furthermore, the current transformers 113 can be installed both on the input side and the output side of the circuit breaker 118 via the mounting block assembly 104. In an embodiment, multiple mounting legs 104a may be provided for mounting a number of current transformers 113 on the mounting block assembly 104 based on the requirements of the front accessible switchgear assembly 100. In another embodiment, the mounting legs 104a can be elongated to accommodate multiple current transformers 113. Therefore, each mounting block assembly 104 can accommodate multiple current transformers 113. The current transformers 113 are, for example, metering type current transformers, and protection type current transformers, for example, relay class current transformers, etc. The current transformers 113 are adapted for multiple voltage connections and for saving space in the electrical enclosure 101.

The current transformers 113 are, for example, ring type toroidal transformers that are mounted on the mounting block assembly 104. The cylindrical bus 104c that runs inside the mounting legs 104a of the mounting block assembly 104 passes through each of the windows of the ring type current transformers. The current transformer 113 comprises primary turns and secondary turns. The turn ratio of the primary turns to the secondary turns varies in accordance with the electrical rating of the front accessible switchgear assembly 100. The electrical rating of the secondary turns of the current transformer 113 is, for example, 5 A. In an embodiment, the electrical rating of the secondary turns of the current transformer 113 is, for example, 1 A. In an embodiment, the turn ratio of the primary turns to the secondary turns is, for example, 1200:5. That is, the ratio of the primary turns to the secondary turns can be interpreted as 1200 A to 5 A on a 1200:5 current transformer 113 comprising 1200 primary turns and 5 secondary turns. Current transformers 113 of turn ratios, for example, 2000:5, 600:5, 300:5, etc., may also be utilized in the front accessible switchgear assembly 100 disclosed herein. In an embodiment, the primary turns in the current transformer 113 are, for example, electromagnetically coupled to the cylindrical bus 104c, for example, by induction. The front accessible switchgear assembly 100 can therefore be configured for current transformers 113 with lower electrical rating, for example, 600V, in a medium voltage circuit with a rating of, for example, 15,000V.

The mounting block assembly 104 provides sufficient creepage distance such that low voltage current transformers 113 are not exposed to higher voltages. Higher voltage current transformers are bulky and expensive. Using higher voltage current transformers in a small enclosure gives rise to space constrictions and heating of the other electrical components 118, 119, 120, etc., of the front accessible switchgear assembly 100 due to the high voltages present on the higher voltage current transformers. Hence, the design of the base mounting block 104b, the mounting legs 104a, and the mounting block cover 104d provides the creepage required for 95000V so that the low voltage current transformers 113 are protected and hence the low voltage current transformers 113, for example, 600V current transformers can be used to optimize space and save cost. Furthermore, the low voltage current transformers 113 are lightweight, easier to install and replace, and are less costly compared to the higher voltage current transformers. The low voltage current transformers 113 are mounted, for example, with plastic screws to the mounting block assembly 104 as exemplarily illustrated in FIG. 16C. In an embodiment, high voltage current transformers may also be mounted in a compact front accessible switchgear assembly 100.

In the front accessible switchgear assembly 100 disclosed herein, low voltage current transformers 113, for example, 600V can be used for medium voltage applications at, for example, 15000V. This results in substantial savings and makes a compact design of the front accessible switchgear assembly 100 possible. More than one current transformer 113 can be installed on each mounting leg 104a of the mounting block assembly 104. For example, one metering current transformer and one protection current transformer are mounted on each mounting leg 104a of the mounting block assembly 104 for a three phase front accessible switchgear assembly 100.

Figure 17A:
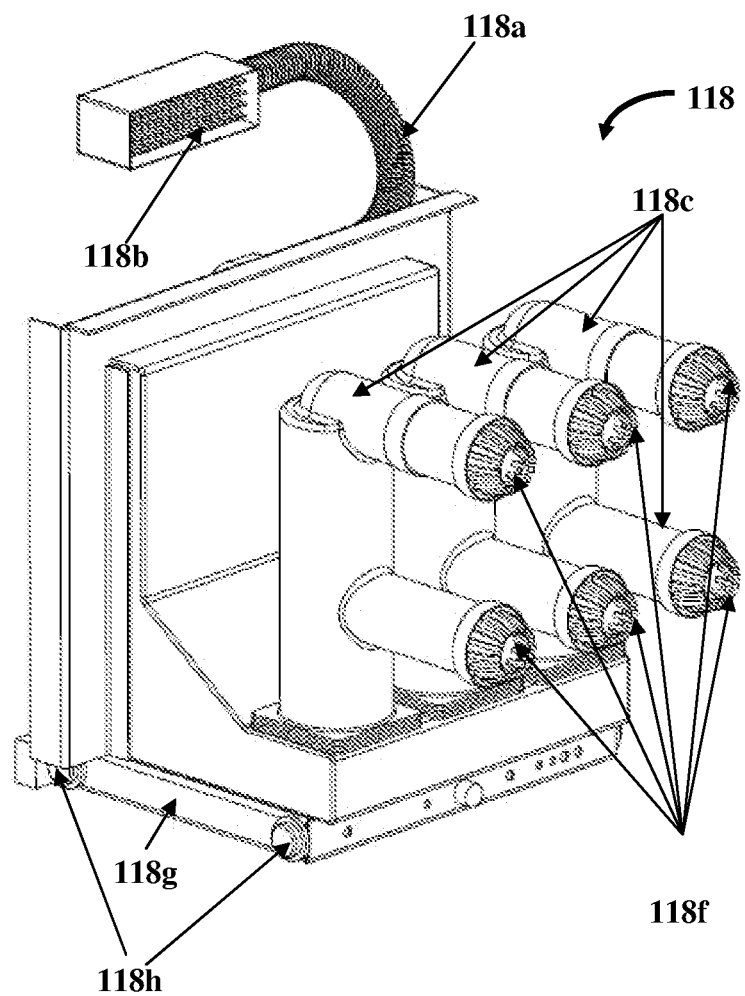
FIGS. 17A-17B exemplarily illustrate perspective views of a circuit breaker, showing tulip contacts of the circuit breaker.
Figure 17B:
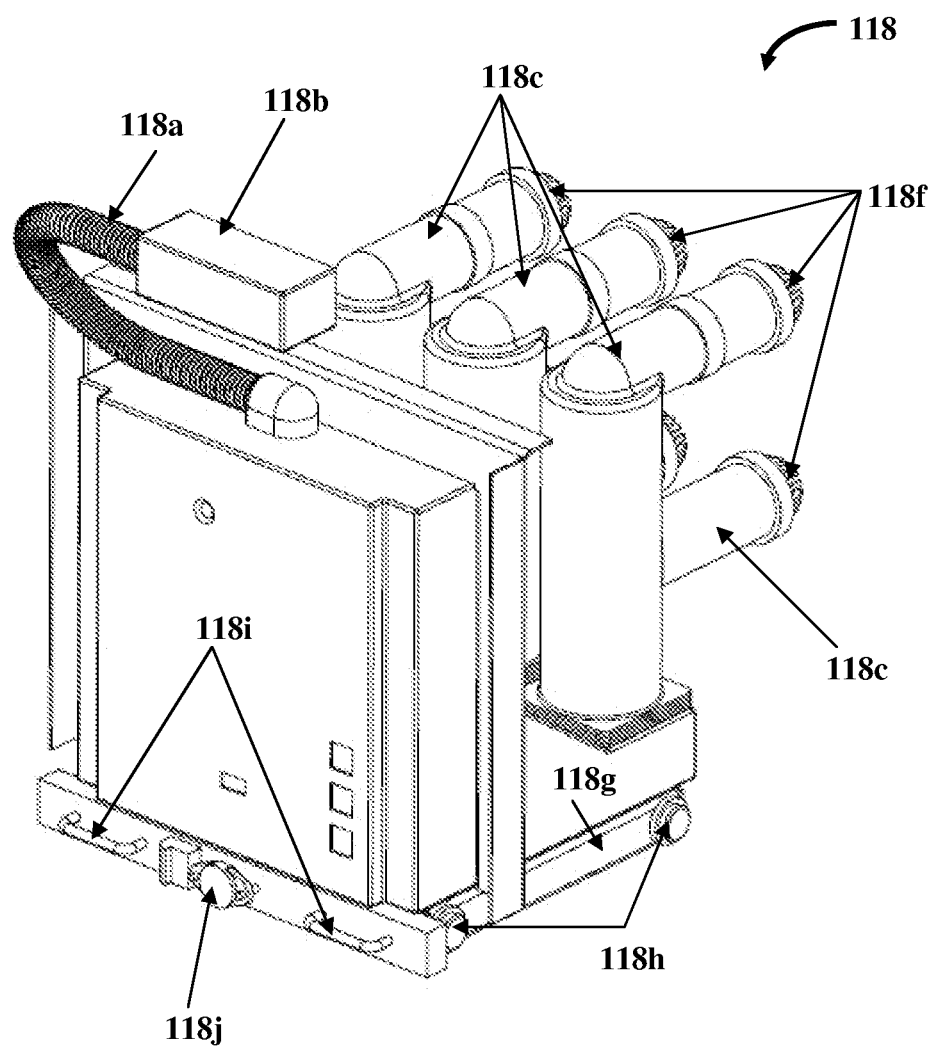

FIGS. 17A-17B exemplarily illustrate perspective views of a circuit breaker 118, showing tulip contacts 118f of the circuit breaker 118. The circuit breaker 118 is electrically connected in, for example, the middle compartment 102b defined in the first section 101a of the electrical enclosure 101 as exemplarily illustrated in FIG. 1B, FIG. 4, FIG. 10, and FIG. 14. The circuit breaker 118 is an automatically operated electrical switch designed to protect the front accessible switchgear assembly 100 from damage caused by overload or a short circuit. The circuit breaker 118 detects a fault condition in the front accessible switchgear assembly 100 and immediately discontinues electrical flow by interrupting continuity. In an embodiment, one or more current transformers 113 are electrically connected on an input side of the circuit breaker 118 and an output side of the circuit breaker 118.

A cord 118a, for example, an umbilical cord, is electrically connected to the circuit breaker 118 for low voltage connection within the electrical enclosure 101. The cord 118a makes the low voltage connection via a connector 118b, for example, a male connector 118b as exemplarily illustrated in FIGS. 17A-17B. The connector 118b is disposed in, for example, the middle compartment 102b just above the circuit breaker 118. There is a positive connection when the circuit breaker 118 is in a connected or racked-in position, or in a withdrawn or racked-out position. The use of the connector 118b eliminates the need for an additional test position to check the low voltage connection. The circuit breaker 118 is mounted on a truck 118g with rollers 118h that roll on a track (not shown) positioned in the middle compartment 102b, for racking the circuit breaker 118 in and out of the middle compartment 102b. A racking tool (not shown) may be inserted into a circular opening 118j provided on the truck 118g of the circuit breaker 118 for racking the circuit breaker 118 in and out of the middle compartment 102b. The handles 118i on the truck 118g of the circuit breaker 118 are used to remove the circuit breaker 118 from the track (not shown) in the middle compartment 102b. The circuit breaker 118 comprises the tulip contacts 118f provided on the arms 118c extending outwardly from the circuit breaker 118. Each of the tulip contacts 118f of the circuit breaker 118 makes contact with the cylindrical bus 104c that runs inside each mounting leg 104a of the mounting block assembly 104 in the middle compartment 102b defined in the first section 101a of the electrical enclosure 101.

Figure 17C:
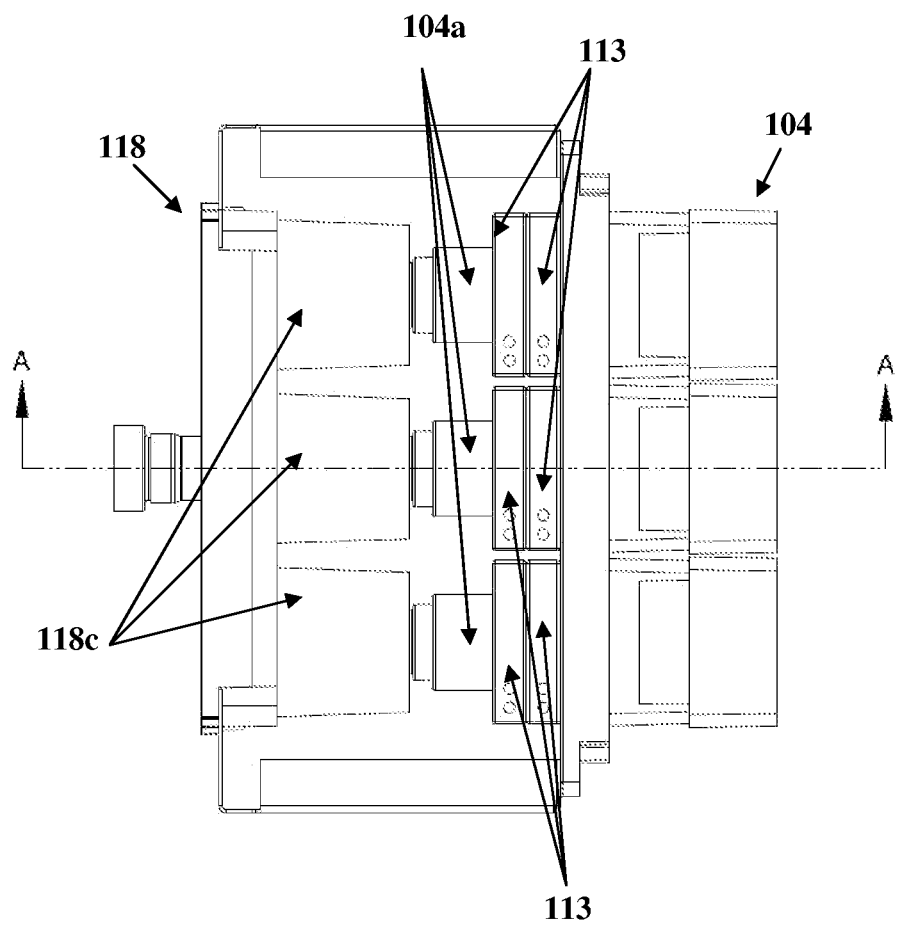
FIG. 17C exemplarily illustrates a plan view showing connection of the circuit breaker to the mounting block assembly.

FIG. 17C exemplarily illustrates a plan view showing connection of the circuit breaker 118 to the mounting block assembly 104. As exemplarily illustrated in FIG. 17C, ring type current transformers are mounted on the mounting legs 104a of the mounting block assembly 104. When the circuit breaker 118 is installed and racked into the middle compartment 102b, each of the tulip contacts 118f on the arms 118c of the circuit breaker 118 makes an electrical contact with the cylindrical bus 104c that runs inside each mounting leg 104a of the mounting block assembly 104.

Figure 17D:
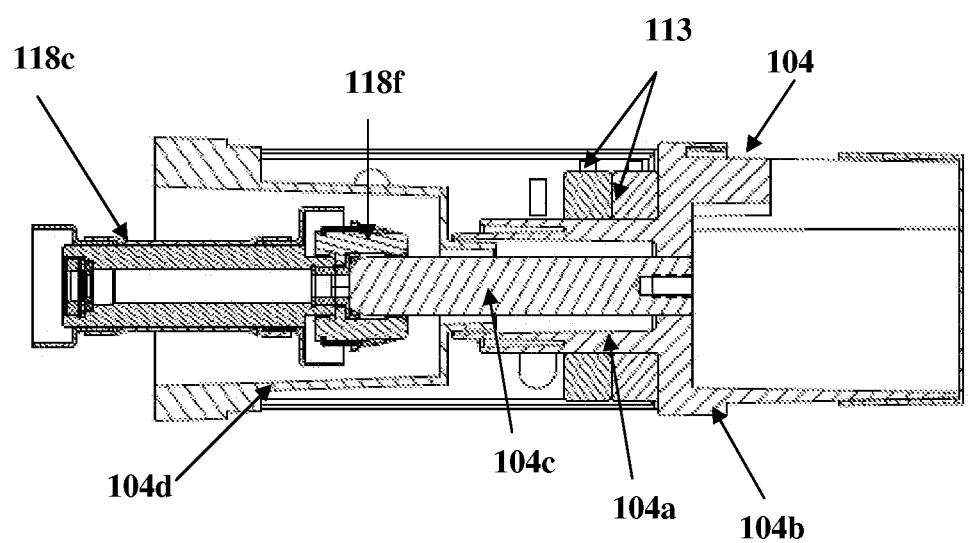
FIG. 17D exemplarily illustrates a sectional view taken at section A-A of FIG. 17C showing connection of the tulip contacts of the circuit breaker to a cylindrical bus that runs inside the mounting block assembly.

FIG. 17D exemplarily illustrates a sectional view taken at section A-A of FIG. 17C, showing connection of the tulip contacts 118f of the circuit breaker 118 to the cylindrical bus 104c that runs inside the mounting block assembly 104. As exemplarily illustrated in FIG. 17C, when the circuit breaker 118 is installed and racked into the middle compartment 102b, each of the tulip contacts 118f housed on each arm 118c of the circuit breaker 118 enters the mounting block cover 104d and makes solid electrical contact with the cylindrical bus 104c that runs inside each of the mounting legs 104a of the mounting block assembly 104. Low voltage current transformers 113 are also installed on the mounting legs 104a of the mounting block assembly 104 and are in electrical communication with the cylindrical bus 104c that runs inside each of the mounting legs 104a of the mounting block assembly 104. The low voltage current transformers 113 measure current through the cylindrical bus 104c.

For each circuit breaker 118, there are two mounting block assemblies 104, one for incoming breaker connections 118e and one for outgoing breaker connections 118d as exemplarily illustrated in FIG. 10 and FIG. 14. The low voltage current transformers 113 can be installed on both the incoming breaker connections 118e and the outgoing breaker connections 118d by mounting the low voltage current transformers 113 on the mounting block assemblies 104. In an embodiment, multiple current transformers 113 can be accommodated on each of the mounting block assemblies 104.

Figure 18A:
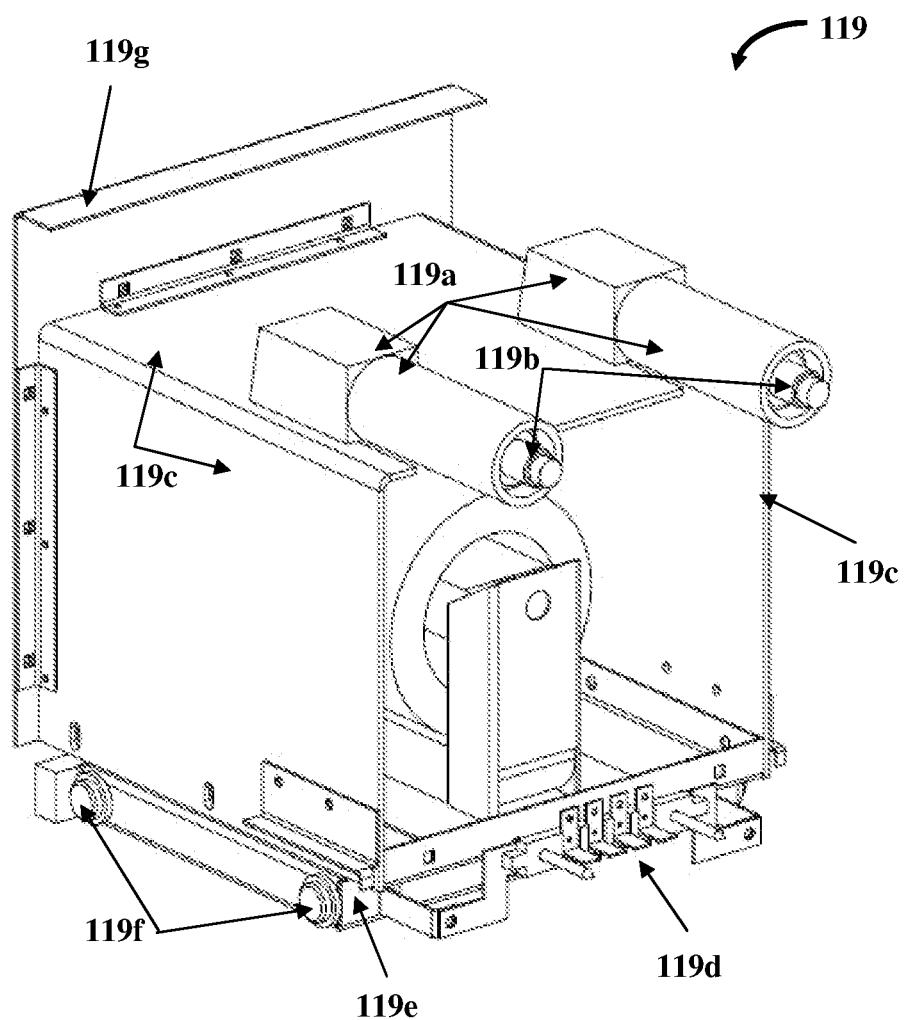
FIGS. 18A-18B exemplarily illustrate perspective views of a control power transformer comprising fuse sleeve assemblies.
Figure 18B:
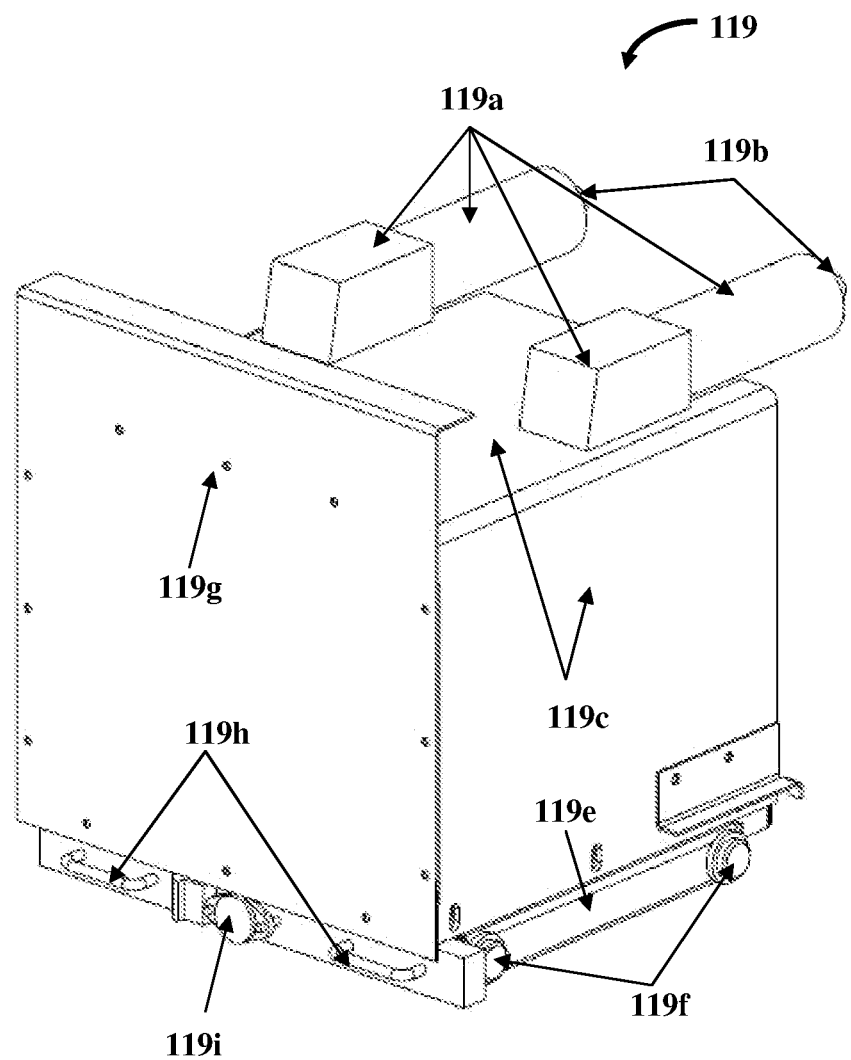

FIGS. 18A-18B exemplarily illustrate perspective views of a control power transformer 119 comprising fuse sleeve assemblies 119a. The control power transformer 119 is electrically connected in, for example, the middle compartment 102b defined in the second section 101b of the electrical enclosure 101 as exemplarily illustrated in FIG. 2, FIG. 5, FIG. 11, and FIG. 13B. The control power transformer 119 is used in the front accessible switchgear assembly 100 to provide low voltage control power to the front accessible switchgear assembly 100 and building emergency or auxiliary power.

The fuse sleeve assemblies 119a successfully pass 95000V lightning impulse tests for a 15000V front accessible switchgear assembly 100 and other voltage switchgear assemblies. The front accessible switchgear assembly 100 disclosed herein further comprises epoxy coated bus bars 103 with a small phase-to-phase distance, for example, 3 inch spacing, between the phases to pass the lightning impulse test. The fuse sleeve assemblies 119a are mounted on an enclosure 119c of the control power transformer 119. The enclosure 119c of the control power transformer 119 is made of a polycarbonate resin thermoplastic material, for example, Lexan® of Saudi Basic Industries Corp. The enclosure 119c of the control power transformer 119 is attached to a metal barrier 119g. Each control power transformer 119 has two fuse sleeve assemblies 119a. The fuse sleeve assemblies 119a are operably connected to the control power transformer 119 and allow high voltage primary connections of the control power transformer 119 in the electrical enclosure 101 via the mounting block assembly 104. Each of the fuse sleeve assemblies 119a contacts the cylindrical bus 104c that runs inside each of the mounting legs 104a of the mounting block assembly 104. Each of the fuse sleeve assemblies 119a is attached to the Lexan enclosure 119c of the control power transformer 119.

Each of the fuse sleeve assemblies 119a of the control power transformer 119 comprises an internal fuse clip 119b and a fuse 119j. The fuse sleeve assemblies 119a attached to the control power transformer 119 are connected through the rear of the middle compartment 102b and mounted in the mounting block assembly 104 as exemplarily illustrated in FIG. 11. Fuse connections are made from the fuse sleeve assemblies 119a of the control power transformer 119 to the cylindrical bus 104c that runs inside each of the mounting legs 104a of the mounting block assembly 104. The mounting block assembly 104 for mounting the control power transformer 119 does not have a mounting block cover 104d and the current transformer 113 mounting capability as exemplarily illustrated in FIGS. 18D-18E.

The front accessible switchgear assembly 100 disclosed herein is configured to insulate fuses 119j that connect to the control power transformer 119. The insulated fuses 119j are enclosed in the epoxy fuse sleeve assemblies 119a that are mounted on the Lexan enclosure 119c of the control power transformer 119. Each of the fuse sleeve assemblies 119a is glued to the epoxy at the ends of the Lexan enclosure 119c. Each of the fuse clips 119b of the fuse sleeve assemblies 119a makes contact with the cylindrical bus 104c inside the mounting block assembly 104. In this embodiment, the mounting block assembly 104 is a single mounting block assembly 104 since there are no current transformers 113 to be mounted. The other end of each of the fuses 119j of the fuse sleeve assemblies 119a has a mating built-in fuse clip and a short cable, which goes through a hole in the Lexan enclosure 119c to make a connection to the high voltage terminal of the control power transformer 119 at either end. The cylindrical bus 104c is machined such that the cylindrical bus 104c has a concave curvature so that each of the fuse sleeve assemblies 119a of the control power transformer 119 makes good contact when the control power transformer 119 is racked in during normal operation. The control power transformer 119 is mounted on a truck 119e with rollers 119f that roll on a track (not shown) positioned in the middle compartment 102b defined in the second section 101b of the electrical enclosure 101, for racking the control power transformer 119 in and out of the middle compartment 102b. A racking tool (not shown) may be inserted into a circular opening 119i provided on the truck 119e of the control power transformer 119 for racking the control power transformer 119 in and out of the middle compartment 102b. The handles 119h on the truck 119e of the control power transformer 119 are used to remove the control power transformer 119 from the track (not shown) in the middle compartment 102b.

The control power transformer 119 requires only two phases namely Phase A and Phase C to power the control power transformer 119. The two phases namely the phase A and phase C connect to external high voltage bus bars 103 via the fuse clips 119b. The Lexan enclosure 119c provides an insulating barrier between the high voltage control power transformer terminals and the chassis of the front accessible switchgear assembly 100 that is at ground potential. Each of the fuse sleeve assemblies 119a provides an insulating barrier between the high voltage fuse connections and the chassis of the front accessible switchgear assembly 100. Each of the fuse sleeve assemblies 119a also encloses the fuse clip 119b so that energized high voltage components are not exposed. In addition, the mounting block assembly 104 provides isolation between the phases of the control power transformer 119. Furthermore, the curvature of the cylindrical bus 104c inside the mounting block assembly 104 keeps each fuse clip 119b inside each of the fuse sleeve assemblies 119a to prevent exposure of active or energized components at any time.

The control power transformer 119 comprises low voltage contacts 119d in the front of the control power transformer 119. The low voltage contacts 119d are configured to disengage from low voltage connections within the electrical enclosure 101 for preventing an event of arcing. The entire control power transformer 119 is designed such that the low voltage contacts 119d disengage before disengagement of the high voltage contacts for safety. Moreover, the secondary connections can have either a low voltage breaker mounted on the front or a fuse pull out in the low voltage compartment 107 to safely disconnect the low voltage connections before racking the control power transformer 119 out of the middle compartment 102b. If the low voltage connection, for example, the control power transformer load, is not disconnected, there is a possibility of creating an arcing event when the control power transformer 119 is racked out since primary connections are at 15000V. Hence, the front accessible switchgear assembly 100 disclosed herein provides additional safety features.

Figure 18C:
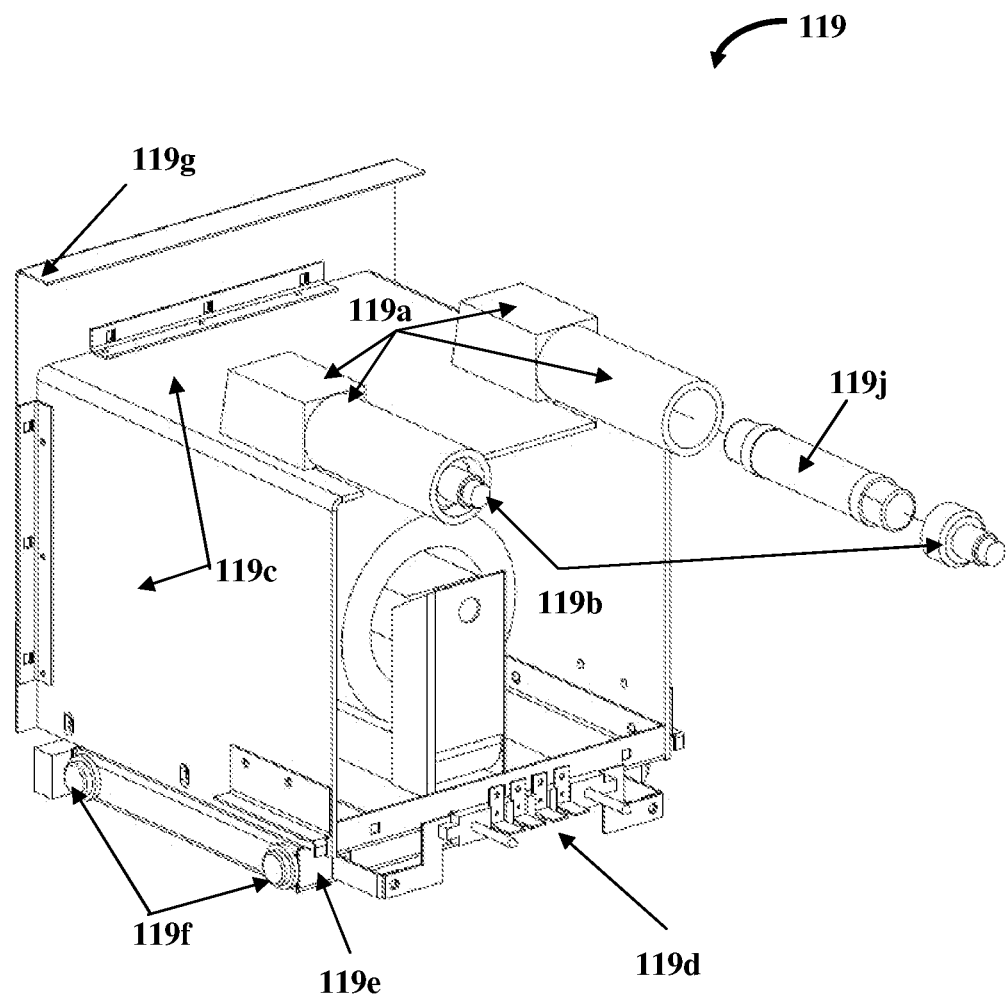
FIG. 18C exemplarily illustrates a perspective view of the control power transformer, showing an exploded view of one of the fuse sleeve assemblies operably connected to the control power transformer.

FIG. 18C exemplarily illustrates a perspective view of the control power transformer 119, showing an exploded view of one of the fuse sleeve assemblies 119a operably connected to the control power transformer 119. Each of the fuse sleeve assemblies 119a comprises the fuse 119j and the fuse clip 119b. The fuse clip 119b holds the fuse 119j within the fuse sleeve assemblies 119a and is in electrical communication with the cylindrical bus 104c inside the mounting block assembly 104, when the control power transformer 119 is racked in the middle compartment 102b during normal operation.

Figure 18D:
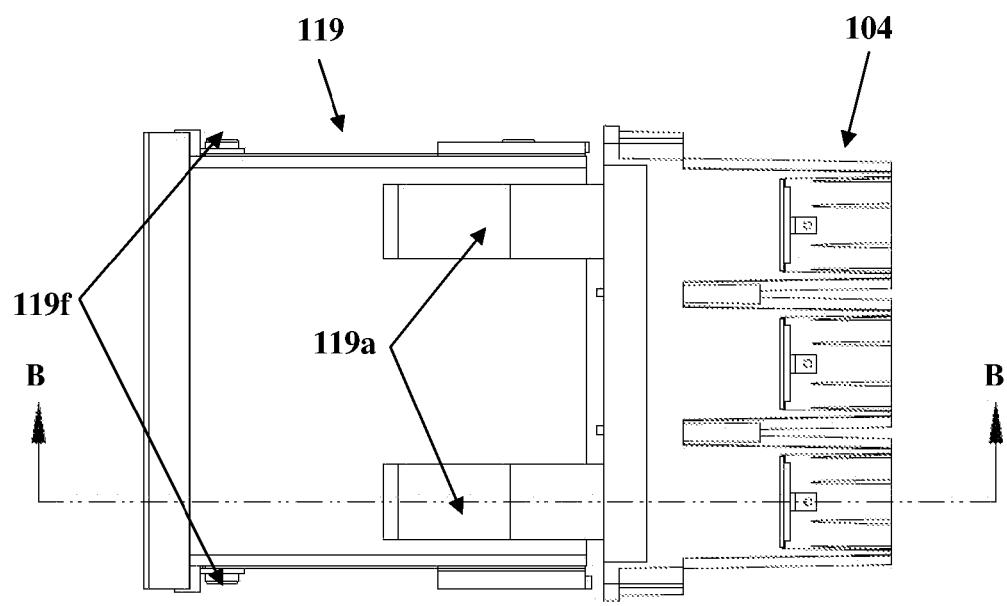
FIG. 18D exemplarily illustrates a plan view showing connection of the control power transformer to the mounting block assembly.

FIG. 18D exemplarily illustrates a plan view showing connection of the control power transformer 119 to the mounting block assembly 104. Each of the fuse sleeve assemblies 119a comprising the fuse 119j and the fuse clip 119b electrically contacts the cylindrical bus 104c of the mounting block assembly 104, when the control power transformer 119 is racked into the middle compartment 102b defined in the electrical enclosure 101. The mounting block assembly 104 is configured to accommodate each of the fuse sleeve assemblies 119a and isolate phases of the control power transformer 119.

Figure 18E:
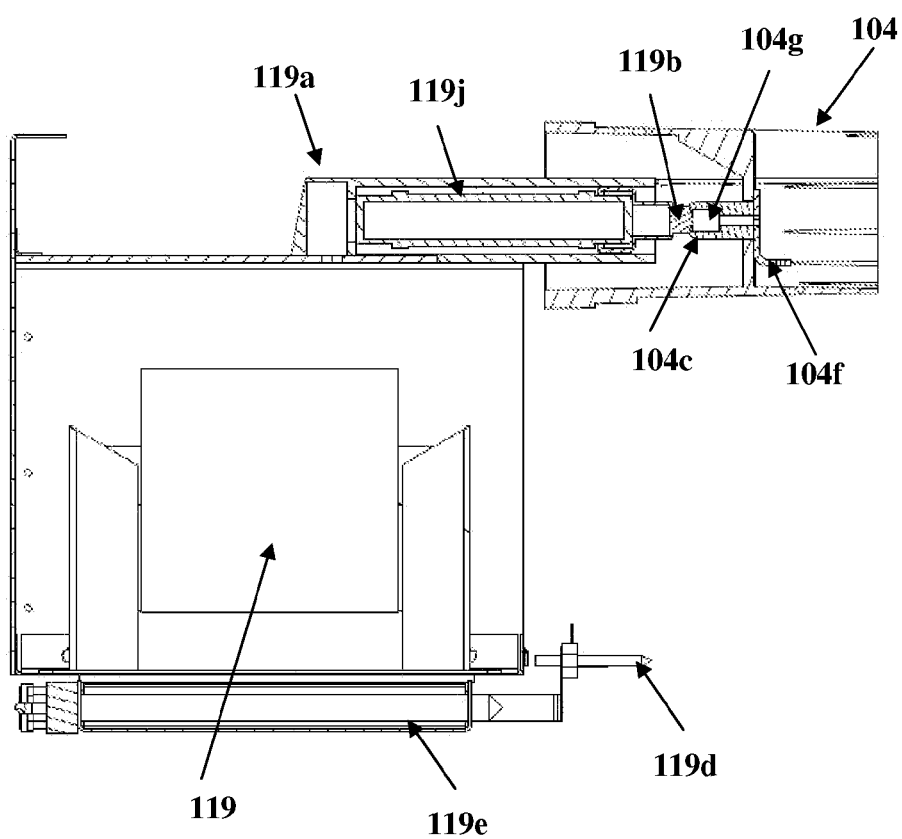
FIG. 18E exemplarily illustrates a sectional view taken at section B-B of FIG. 18D, showing connection of the control power transformer to a cylindrical bus that runs inside the mounting block assembly.

FIG. 18E exemplarily illustrates a sectional view taken at section B-B of FIG. 18D, showing connection of the control power transformer 119 to a cylindrical bus 104c that runs inside the mounting block assembly 104. Each of the fuse sleeve assemblies 119a of the control power transformer 119 encloses the fuse 119j and the fuse clip 119b. The control power transformer 119 is mounted on a truck 119e with rollers 119f that roll on a track (not shown) positioned in the middle compartment 102b, for racking the control power transformer 119 in and out of the middle compartment 102b. In an embodiment, when the control power transformer 119 is racked in, the fuse clip 119b of each of the fuse sleeve assemblies 119a comes in contact with the cylindrical bus 104c of the mounting block assembly 104. The cylindrical bus 104c is attached to a copper bracket 104f in the mounting block assembly 104 via a fastener 104g such as a bolt. The copper bracket 104f electrically communicates with the bus bars 103, for example, the upper horizontal bus bars 103a via high voltage electrical cables (not shown). The fuse clip 119b therefore contacts the concave cylindrical bus 104c of the mounting block assembly 104. The contact between the fuse clip 119b and the cylindrical bus 104c provides electrical communication between the control power transformer 119 and the mounting block assembly 104.

Figure 19A:
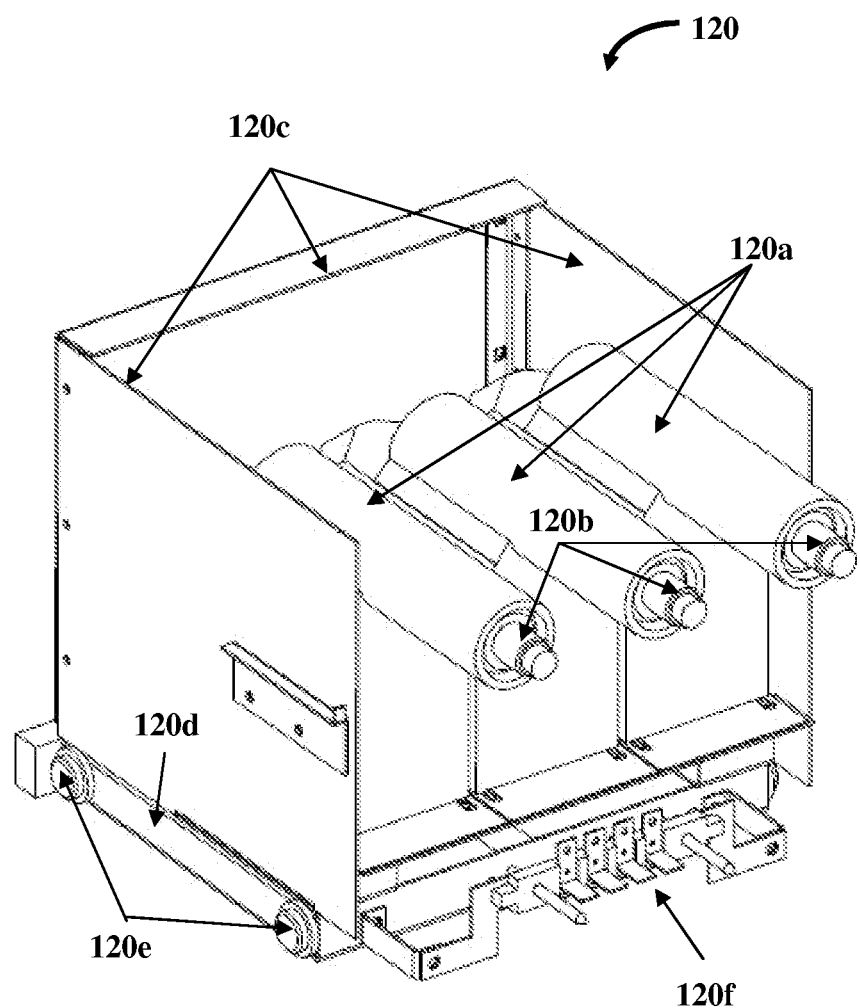
FIGS. 19A-19B exemplarily illustrate perspective views of an epoxy encapsulated potential transformer.
Figure 19B:
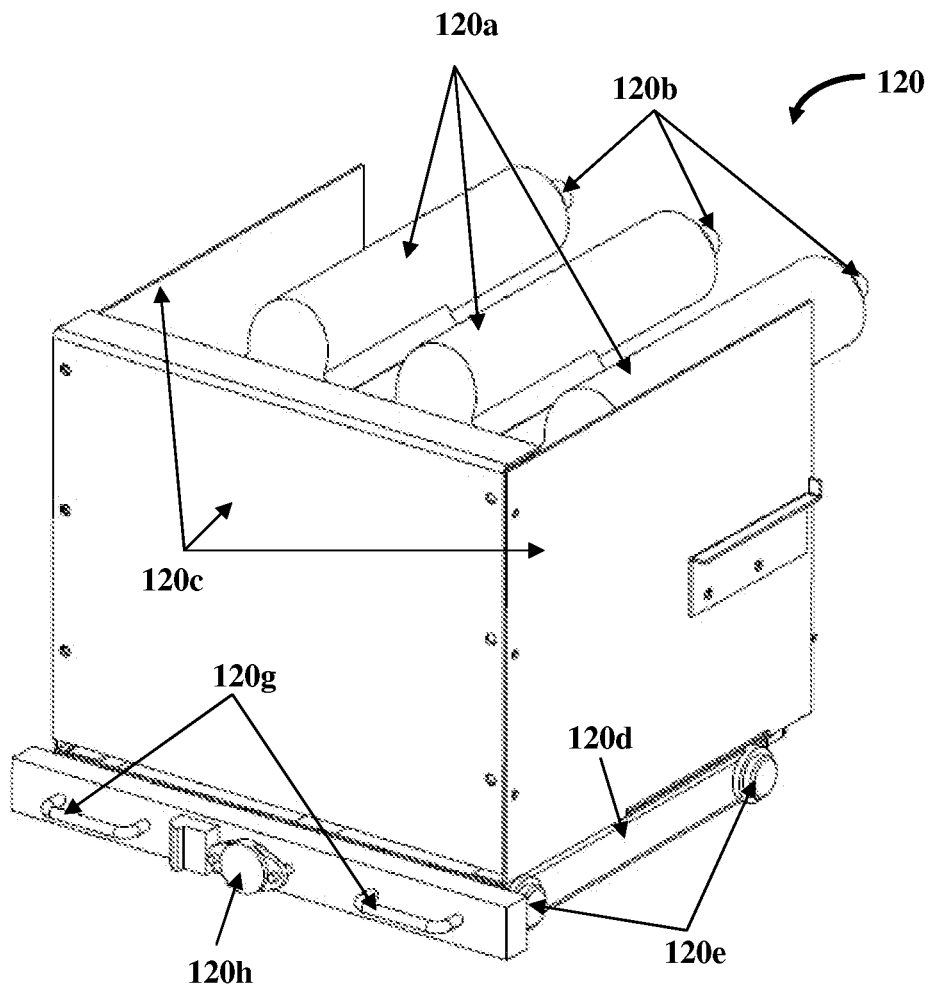

FIGS. 19A-19B exemplarily illustrate perspective views of an epoxy encapsulated potential transformer 120. The potential transformer 120 is an instrument transformer used for metering and protection in high-voltage circuits. The potential transformer 120 is designed to present negligible load to a power supply being measured and to have a precise voltage ratio to accurately step down high voltages so that metering and protective relay equipment can be operated at a lower potential. The potential transformer 120 is a designed and encapsulated in, for example, epoxy. The potential transformer 120 is accommodated and electrically connected in, for example, the middle compartment 102b or the lower compartment 102c defined in the second section 101b of the electrical enclosure 101. The potential transformer 120 may be mounted in the lower compartment 102c or the middle compartment 102b to provide a low footprint. As exemplarily illustrated in FIG. 2, FIG. 5, FIG. 11, and FIG. 13B, the epoxy encapsulated potential transformer 120 is electrically connected in the lower compartment 102c defined in the second section 101b of the electrical enclosure 101. In an embodiment, one or more fuse sleeve assemblies 120a are electrically connected to the potential transformer 120.

The potential transformer 120 is epoxy encapsulated and enclosed in an enclosure 120c made of sheet metal since the epoxy provides adequate insulation for a lightning impulse of 95000 volts. The compact potential transformer 120 makes connection to the bus bars 103 in a single mounting block assembly 104 like the control power transformer 119. The mounting block assembly 104 for mounting the potential transformer 120 does not have a mounting block cover 104d as exemplarily illustrated in FIGS. 19D-19E. The mounting block assembly 104 for each of the control power transformer 119 and the potential transformer 120 is configured to completely accommodate each of the fuse sleeve assemblies 119a and 120a of each of the control power transformer 119 and the potential transformer 120 respectively. The mounting block assembly 104 for each of the control power transformer 119 and the potential transformer 120 is geometrically the same to ensure that the fuse sleeve assemblies 119a and 120a of each of the control power transformer 119 and the potential transformer 120 respectively are captured inside the mounting block assembly 104. The control power transformer 119 has two fuse sleeve assemblies 119a, for example, phase A and phase C, while the potential transformer 120 has three fuse sleeve assemblies 120a, for example, phase A, phase B, and phase C. No connection is made in the middle phase B of the control power transformer 119.

Each of the fuse sleeve assemblies 120a of the potential transformer 120 comprises an internal fuse clip 120b and a fuse 120i. The fuse sleeve assemblies 120a attached to the potential transformer 120 are connected through the rear of the lower compartment 102c as exemplarily illustrated in FIG. 11. Fuse connections are made from the fuse sleeve assemblies 120a of the potential transformer 120 to the cylindrical bus 104c mounted in the mounting block assembly 104.

The front accessible switchgear assembly 100 disclosed herein is configured to insulate fuses 120i that connect to the potential transformer 120. The insulated fuses 120i are enclosed in the epoxy fuse sleeve assemblies 120a that are mounted on the epoxy encapsulated potential transformer 120, which is mounted on the truck 120d and enclosed by the sheet metal enclosure 120c. Each of the fuse clips 120b of the fuse sleeve assemblies 120a makes contact with the cylindrical bus 104c that runs inside each of the mounting legs 104a of the mounting block assembly 104. In this embodiment, the mounting block assembly 104 is a single mounting block assembly 104 since there are no current transformers 113 to be mounted. The potential transformer 120 is enclosed in, for example, a sheet metal enclosure 120c, and the fuse sleeve assemblies 120a are a part of the epoxy encapsulated potential transformer 120. The other end of each of the fuses 120i of the fuse sleeve assemblies 120a has a mating built-in fuse clip 120b inside the fuse sleeve assembly 120a and a short cable internally connected to a high voltage winding of the potential transformer 120 within the epoxy enclosure. The potential transformer 120 is encapsulated in epoxy and the supporting structure of the potential transformer 120 can be made of, for example, a sheet metal.

The above arrangement is for a wye or star connected potential transformer 120 that has three phases and requires three fuse sleeve assemblies 120a for a wye or star connected supply system with a neutral connection. In an embodiment, two potential transformers 120 may also be employed with three fuse sleeve assemblies 120a in an open delta configuration for ungrounded delta connected supply systems (not shown) to prevent damage of the potential transformers 120 in the event of a ground fault by the flow of zero sequence currents. In the open delta configuration, two epoxy encapsulated potential transformers 120 are used and a plexi-glass shield is mounted on top of the two epoxy encapsulated potential transformers 120 to mount the three fuse sleeve assemblies 120a. The fuse sleeve assemblies 120a are glued to a plexi-glass sheet on top of the two epoxy encapsulated potential transformers 120 on either side, connected to phases A and B and phases B and C of the potential transformers 120. The high voltage common point is connected to the middle B fuse while the other two fuses 120i are connected to phases A and C.

The cylindrical bus 104c that runs inside the mounting block assembly 104 is machined such that the cylindrical bus 104c has a concave curvature so that each of the fuse sleeve assemblies 120a makes good contact when the potential transformer 120 is racked in during normal operation. The potential transformer 120 is mounted on a truck 120d that has rollers 120e which roll on a track (not shown) positioned in the middle compartment 102b or the lower compartment 102c defined in the second section 101b of the electrical enclosure 101, for racking the potential transformer 120 in and out of the middle compartment 102b or the lower compartment 102c. A racking tool (not shown) may be inserted into a circular opening 120h provided on the truck 120d of the potential transformer 120 for racking the potential transformer 120 in and out of the middle compartment 102b or the lower compartment 102c. The handles 120g on the truck 120d of the potential transformer 120 are used to remove the potential transformer 120 from the track (not shown) in the middle compartment 102b or the lower compartment 102c.

The potential transformer 120 has three connections namely phase A, phase B, and phase C as opposed to the two phases, namely the phase A and the phase C of the control power transformer 119. The potential transformer 120 is designed and tested to withstand a 95000V lightning impulse and has been independently tested to meet Institution of Electrical and Electronics Engineers (IEEE) standards and American National Standards Institute (ANSI) standards for instrument transformers which is much more stringent than IEC standards. The height of the potential transformer 120 is small making it possible to install the potential transformer 120 in the lower compartment 102c. When the potential transformer 120 is installed in the lower compartment 102c, the lower compartment 102c is separated from the rear compartment 102e with a barrier 101e, which makes the lower compartment 102c small as exemplarily illustrated in FIG. 11. The lower compartment 102c that accommodates the potential transformer 120 poses challenges to efficiently vent gases in the event of an arcing. The design and venting of the gases of the front accessible switchgear assembly 100 is efficient and has been fully tested to IEEE/ANSI standards. The low voltage contacts 120f of the potential transformer 120 are designed similar to the low voltage contacts 119d of the control power transformer 119 and have the same advantages and functionalities.

The epoxy encapsulated potential transformer 120 comprises low voltage contacts 120f in the front of the potential transformer 120. The low voltage contacts 120f are configured to disengage from low voltage connections within the electrical enclosure 101 for preventing an event of arcing. The entire potential transformer 120 is designed such that the low voltage contacts 120f disengage before disengagement of the high voltage contacts for safety. Moreover, the secondary connections can have either a low voltage breaker on the sheet metal enclosure 120c or a fuse pull out in the low voltage compartment 107 to safely disconnect the low voltage connections before racking the potential transformer 120 out of, for example, the lower compartment 102c. If the low voltage connection, for example, the potential transformer load, is not disconnected, there is a possibility of creating an arcing event when the potential transformer 120 is racked out since primary connections are at 15000V. Hence, the front accessible switchgear assembly 100 disclosed herein provides additional safety features.

The potential transformer load is small and does not typically require a breaker or a fuse pull out to safely disconnect the secondary low voltage loads before the potential transformer 120 is racked out. However, in an embodiment, a secondary breaker or a fuse pull out similar to that of a control power transformer 119 is incorporated in the front accessible switchgear assembly 100.

Figure 19C:
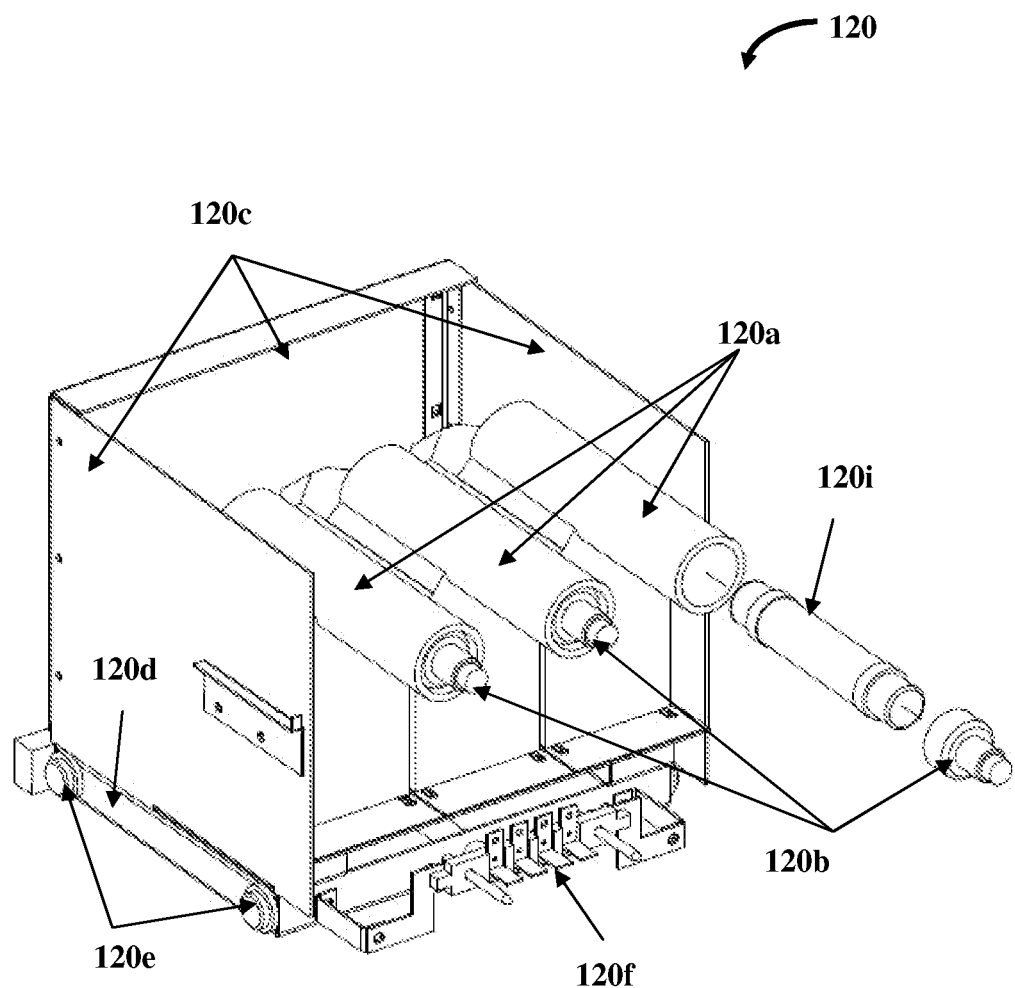
FIG. 19C exemplarily illustrates a perspective view of the epoxy encapsulated potential transformer, showing an exploded view of one of the fuse sleeve assemblies operably connected to the epoxy encapsulated potential transformer.

FIG. 19C exemplarily illustrates a perspective view of the epoxy encapsulated potential transformer 120, showing an exploded view of one of the fuse sleeve assemblies 120a operably connected to the epoxy encapsulated potential transformer 120. Each of the fuse sleeve assemblies 120a of the epoxy encapsulated potential transformer 120 comprises the fuse 120i and the fuse clip 120b. The fuse clip 120b holds the fuse 120i within each of the fuse sleeve assemblies 120a and is in electrical communication with the cylindrical bus 104c inside the mounting block assembly 104, when the potential transformer 120 is racked in the lower compartment 102c.

Each of the fuse sleeve assemblies 120a of the epoxy encapsulated potential transformer 120 allows high voltage primary connections of the epoxy encapsulated potential transformer 120 in the electrical enclosure 101 via the mounting block assembly 104. Each of the fuse sleeve assemblies 120a contacts the cylindrical bus 104c that runs inside each of the mounting legs 104a of the mounting block assembly 104.

Figure 19D:
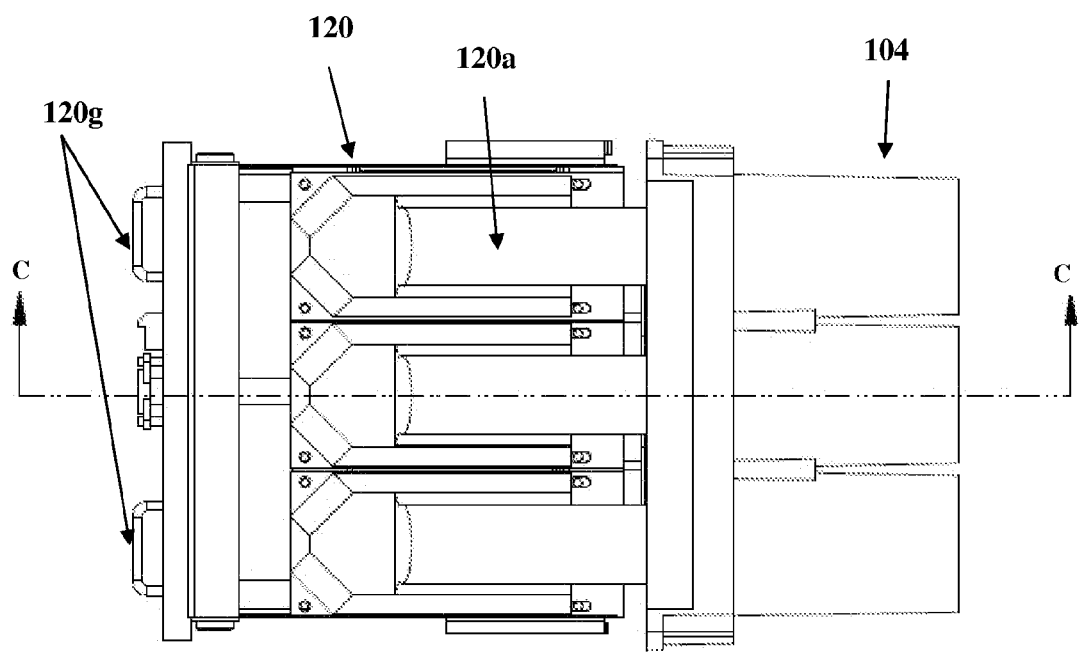
FIG. 19D exemplarily illustrates a plan view showing connection of the epoxy encapsulated potential transformer to the mounting block assembly.

FIG. 19D exemplarily illustrates a plan view showing connection of the epoxy encapsulated potential transformer 120 to the mounting block assembly 104. Each of the fuse sleeve assemblies 120a comprising the fuse 120i and the fuse clip 120b electrically contacts the cylindrical bus 104c of the mounting block assembly 104, when the potential transformer 120 is racked into the lower compartment 102c, defined in the electrical enclosure 101. The mounting block assembly 104 is configured to accommodate each of the fuse sleeve assemblies 120a and isolate phases of the epoxy encapsulated potential transformer 120.

Figure 19E:
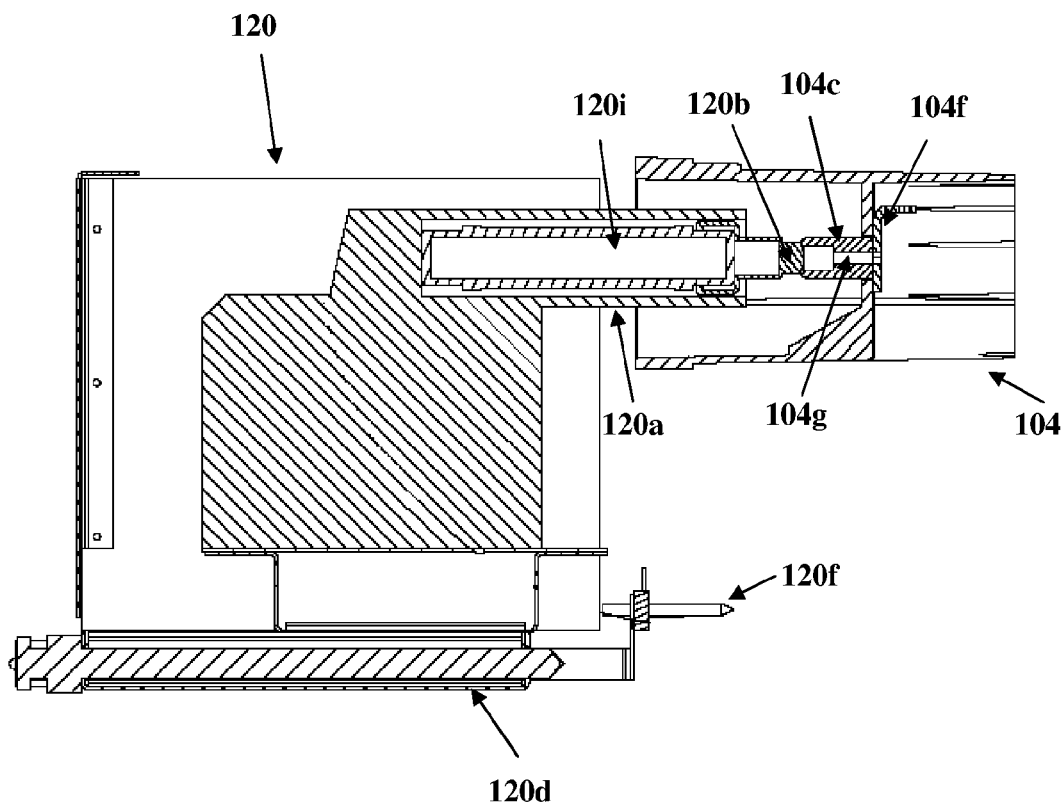
FIG. 19E exemplarily illustrates a sectional view taken at section C-C of FIG. 19D showing connection of the epoxy encapsulated potential transformer to a cylindrical bus that runs inside the mounting block assembly.

FIG. 19E exemplarily illustrates a sectional view taken at section C-C of FIG. 19D showing connection of the epoxy encapsulated potential transformer 120 to a cylindrical bus 104c that runs inside the mounting block assembly 104. Each of the fuse sleeve assemblies 120a of the epoxy encapsulated potential transformer 120 encloses the fuse 120i and the fuse clip 120b. The epoxy encapsulated potential transformer 120 is mounted on a truck 120d with rollers 120e, which facilitates the mounting of the potential transformer 120 on a track (not shown) in the middle compartment 102b or the lower compartment 102c. The potential transformer 120 can be racked in and out of the middle compartment 102b or the lower compartment 102c. In an embodiment, when the epoxy encapsulated potential transformer 120 is racked in, the fuse clip 120b of each of the fuse sleeve assemblies 120a comes in electrical contact with the cylindrical bus 104c of the mounting block assembly 104. The cylindrical bus 104c is attached to a copper bracket 104f in the mounting block assembly 104 via a fastener 104g such as a bolt. The copper bracket 104f electrically communicates with the bus bars 103, for example, the upper horizontal bus bars 103a via high voltage electrical cables (not shown). The fuse clip 120b therefore contacts the concave cylindrical bus 104c of the mounting block assembly 104. The contact between the fuse clip 120b and the cylindrical bus 104c provides electrical communication between the epoxy encapsulated potential transformer 120 and the mounting block assembly 104.

Figure 20:
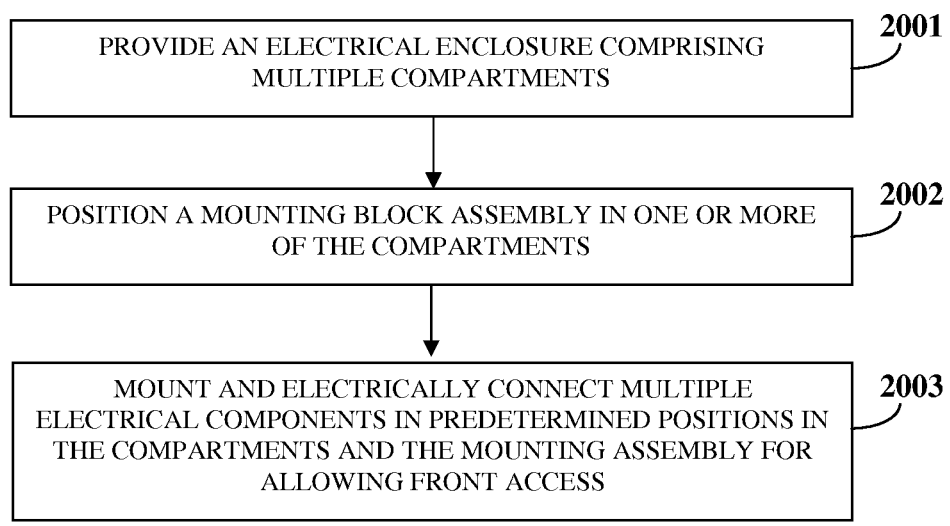
FIG. 20 illustrates a method for constructing a front accessible switchgear assembly.

FIG. 20 illustrates a method for constructing a front accessible switchgear assembly 100. An electrical enclosure 101 comprising multiple compartments 102, for example, upper compartments 102a, middle compartments 102b, lower compartments 102c, rear compartments 102e, etc., defined in sections, for example, a first section 101a and a second section 101b, is provided 2001 as exemplarily illustrated in FIGS. 1A-1B and FIGS. 2-9. The compartments 102 are configured to interchangeably accommodate one or more electrical components, for example, the control equipment, the circuit breaker 118, the control power transformer 119, the potential transformer 120, the electrical cables 111, etc., and the bus bars 103, for example, the upper horizontal bus bars 103a, the lower horizontal bus bars 103d, the cable connection bus bars 103c, and the transitional bus bars 103b, as exemplarily illustrated in FIGS. 1A-1B and FIGS. 2-5. A mounting block assembly 104 as exemplarily illustrated in FIG. 16C is positioned 2002 in one or more of the compartments 102, for example, the middle compartment 102b, for providing front access to one or more of the electrical components 113, 118, etc., mounted in the mounting block assembly 104.

One or more the electrical components 111, 113, 118, 119, 120, etc., are mounted and electrically connected 2003 in predetermined positions in the compartments 102 and/or the mounting block assembly 104 for allowing front access to the electrical components 111, 113, 118, 119, 120, etc., and the bus bars 103 within the electrical enclosure 101. For example, the circuit breaker 118, as exemplarily illustrated in FIGS. 17A-17B, is electrically connected in the middle compartment 102b defined in the first section 101a of the electrical enclosure 101 as exemplarily illustrated in FIG. 1B, FIG. 4, FIG. 10, and FIG. 14. The electrical cables 111 are accommodated and electrically connected in the lower compartment 102c defined in the first section 101a of the electrical enclosure 101 as exemplarily illustrated in FIGS. 1A-1B, FIG. 3, FIG. 4, FIG. 9, FIG. 10, and FIG. 12. In an embodiment, the electrical cables 111 are configured for entry into the electrical enclosure 101 via the upper compartment 102a as exemplarily illustrated in FIGS. 15A-15D.

The control power transformer 119, as exemplarily illustrated in FIGS. 18A-18C, is electrically connected in the middle compartment 102b defined in the second section 101b of the electrical enclosure 101 as exemplarily illustrated in FIG. 2, FIG. 5, FIG. 11, and FIG. 13B. The epoxy encapsulated potential transformer 120, as exemplarily illustrated in FIGS. 19A-19C, is electrically connected in the middle compartment 102b defined in the second section 101b of the electrical enclosure 101 as exemplarily illustrated in FIG. 2, FIG. 5, FIG. 11, and FIG. 13B. The plenum chamber 105 is rearwardly positioned in the first section 101a of the electrical enclosure 101 and is in adjacent communication with the exhaust chamber 112 as exemplarily illustrated in FIGS. 1A-1B, FIGS. 3-7 and FIGS. 10-12. One or more of the electrical components 111, 113, 118, 119, 120, etc., are in electrical communication with the bus bars 103 in the compartments 102. One or more infrared windows 108 and inspection windows 109 are positioned at predetermined locations on the front side 100a of the front accessible switchgear assembly 100 for front scanning the electrical components 111, 113, 118, etc., and the bus bars 103 in the compartments 102 and for providing a front visual indication of the electrical components 111, 118, 119, 120, etc., and the bus bars 103 respectively for inspection and maintenance as exemplarily illustrated in FIG. 8.

The front accessible switchgear assembly 100 disclosed herein can be adapted to flexible configurations to form a family of small footprint front accessible switchgear assemblies 100 at medium voltage. The flexible configurations provide a smaller footprint for front accessible switchgear assemblies 100 that require arc resistance with front access. The front accessible switchgear assembly 100 disclosed herein has full front accessibility making the front accessible switchgear assembly 100 convenient for applications such as data centers, facilities, industrial applications with limited space for medium voltage electrical equipment. The front accessible switchgear assembly 100 disclosed herein is configured, for example, for a voltage rating of 15 kV, 95 kV basic impulse level (BIL), a current rating of 600 A, 1000 A, and 1200 A, a short circuit and short time rating of 31.5 kiloampere (kA), and an arc rating of 25 kA. A control power transformer 119 having up to 15 kVA power is available with the front accessible switchgear assembly 100 disclosed herein.

The front accessible switchgear assembly 100 successfully completed BIL tests at 95 kV, short circuit tests at 31.5 kA, and temperature tests at 1200 A. In addition, all required arc tests were completed at 28 kA at 15.6 kV successfully. The circuit breaker 118 disclosed herein is a magnetically actuated, vacuum circuit breaker that conforms to ANSI/IEEE standards. The mounting block assembly 104 design, epoxy coated bus bars 103, etc., make the front accessible switchgear assembly 100 ultra compact and arc resistant.

Although the front accessible switchgear assembly 100 disclosed herein refers to a medium voltage switchgear assembly 100, the front accessible switchgear assembly 100 disclosed herein may be extended to a higher voltage switchgear assembly 100 and a lower voltage switchgear assembly 100 with appropriate modifications. The front accessible switchgear assembly 100 disclosed herein is adapted for 15 kV class equipment, 95 kV lightning impulse voltage, and 1200 A rating and can be extended to higher ratings and used for a low voltage switchgear rated 600V and below. In the front accessible switchgear assembly 100 disclosed herein, low voltage 600V current transformers 113 can be used for medium voltage applications at 15000V. This results in substantial savings in cost and space requirements.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A front accessible switchgear assembly, comprising:
a plurality of compartments defined within an electrical enclosure, wherein said compartments are configured to interchangeably accommodate one or more electrical components and bus bars;
a mounting block assembly positioned in one or more of said compartments for mounting one or more of said one or more electrical components and providing front access to said mounted one or more electrical components for inspection and maintenance, wherein said mounting block assembly comprises:
a plurality of mounting legs extending frontwardly from a base mounting block for mounting said one or more electrical components and allowing said front access to said mounted one or more electrical components; and
a mounting block cover removably attached to said base mounting block for enclosing said mounted one or more electrical components on said mounting legs, wherein said mounting block cover is configured to provide said front access to said mounted one or more electrical components for said inspection and said maintenance;
said one or more electrical components electrically connected in predetermined positions in said compartments for allowing said front access to said one or more electrical components and said bus bars within said electrical enclosure, wherein one or more of said one or more electrical components are in electrical communication with said bus bars in said compartments.

2. The front accessible switchgear assembly of claim 1, wherein said mounting block assembly is configured to reduce temperature rise in said compartments.

3. The front accessible switchgear assembly of claim 1, further comprising a plenum chamber rearwardly positioned in said electrical enclosure, wherein said plenum chamber is in communication with one or more of said compartments and provides an exit path for releasing pressure and gases generated by said one or more electrical components accommodated in said compartments during an event of arcing within said electrical enclosure.

4. The front accessible switchgear assembly of claim 3, further comprising flaps between said compartments and said plenum chamber for preventing said gases and external particulate matter from entering said compartments via said plenum chamber.

5. The front accessible switchgear assembly of claim 3, wherein said plenum chamber communicates with one or more of said compartments via an exhaust chamber in adjacent communication with said plenum chamber.

6. The front accessible switchgear assembly of claim 3, wherein one or more of said compartments is configured as a low voltage compartment for accommodating control equipment, wherein said low voltage compartment is isolated from said plenum chamber and other of said compartments.

7. A front accessible switchgear assembly, comprising:
a plurality of compartments defined within an electrical enclosure, wherein said compartments are configured to interchangeably accommodate one or more electrical components and bus bars;
a mounting block assembly positioned in one or more of said compartments for mounting one or more of said one or more electrical components and providing front access to said mounted one or more electrical components for inspection and maintenance; and
said one or more electrical components electrically connected in predetermined positions in said compartments for allowing said front access to said one or more electrical components and said bus bars within said electrical enclosure, wherein one or more of said one or more electrical components are in electrical communication with said bus bars in said compartments, and, wherein one of said one or more electrical components is a control power transformer electrically connected in a middle one of said compartments, wherein one or more fuse sleeve assemblies are operably connected to said control power transformer, wherein said one or more fuse sleeve assemblies allow high voltage primary connections of said control power transformer in said electrical enclosure, and wherein said one or more fuse sleeve assemblies operably connected to said control power transformer contact one or more of said bus bars in a rear one of said compartments within said electrical enclosure via said mounting block assembly.

8. The front accessible switchgear assembly of claim 7, wherein said mounting block assembly is configured to accommodate each of said one or more fuse sleeve assemblies and isolate phases of said control power transformer.

9. The front accessible switchgear assembly of claim 7, wherein said control power transformer comprises low voltage contacts configured to disengage from low voltage connections within said electrical enclosure for preventing an event of arcing.

10. The front accessible switchgear assembly of claim 1, wherein one of said one or more electrical components is a current transformer mounted on said mounting block assembly in one of said compartments.

11. The front accessible switchgear assembly of claim 1, wherein one of said one or more electrical components is a circuit breaker electrically connected in a middle one of said compartments.

12. The front accessible switchgear assembly of claim 11, further comprising a cord electrically connected to said circuit breaker for low voltage connection within said electrical enclosure.

13. The front accessible switchgear assembly of claim 11, wherein another of said one or more electrical components are current transformers mounted on an input of said circuit breaker and an output of said circuit breaker via said mounting block assembly.

14. A front accessible switchgear assembly, comprising:
a plurality of compartments defined within an electrical enclosure, wherein said compartments are configured to interchangeably accommodate one or more electrical components and bus bars;
a mounting block assembly positioned in one or more of said compartments for mounting one or more of said one or more electrical components and providing front access to said mounted one or more electrical components for inspection and maintenance; and
said one or more electrical components electrically connected in predetermined positions in said compartments for allowing said front access to said one or more electrical components and said bus bars within said electrical enclosure, wherein one or more of said one or more electrical components are in electrical communication with said bus bars in said compartments, wherein one of said one or more electrical components is an epoxy encapsulated potential transformer accommodated and electrically connected in one of a middle one of said compartments and a lower one of said compartments, wherein one or more fuse sleeve assemblies are operably connected to said epoxy encapsulated potential transformer, wherein said one or more fuse sleeve assemblies allow high voltage primary connections of said epoxy encapsulated potential transformer in said electrical enclosure, wherein said one or more fuse sleeve assemblies operably connected to said epoxy encapsulated potential transformer contact one or more of said bus bars in a rear one of said compartments within said electrical enclosure via said mounting block assembly.

15. The front accessible switchgear assembly of claim 14, wherein said mounting block assembly is configured to accommodate each of said one or more fuse sleeve assemblies and isolate phases of said epoxy encapsulated potential transformer.

16. The front accessible switchgear assembly of claim 14, wherein said epoxy encapsulated potential transformer comprises low voltage contacts configured to disengage from low voltage connections within said electrical enclosure for preventing an event of arcing.

17. The front accessible switchgear assembly of claim 1, further comprising input electrical cables and output electrical cables configured for entry into and/or exit from said electrical enclosure via one of an upper one of said compartments and a lower one of said compartments.

18. The front accessible switchgear assembly of claim 1, further comprising one or more infrared windows positioned at predetermined locations on a front side of said front accessible switchgear assembly for front scanning said one or more electrical components and said bus bars in said compartments for said inspection and said maintenance.

19. The front accessible switchgear assembly of claim 18, further comprising support brackets connected to said one or more infrared windows for protecting said one or more infrared windows from rupture.

20. The front accessible switchgear assembly of claim 1, further comprising one or more inspection windows positioned at predetermined locations on a front side of said front accessible switchgear assembly for providing a front visual indication of said one or more electrical components and said bus bars in said compartments for said inspection and said maintenance.

21. The front accessible switchgear assembly of claim 1, wherein said bus bars are electrically connected in a rear one of said compartments within said electrical enclosure.

22. The front accessible switchgear assembly of claim 1 being a metal clad switchgear assembly, wherein adjacent sections defined in said electrical enclosure of said metal clad switchgear assembly are separated by vertical metal barriers for compartmentalizing active electrical components in said electrical enclosure.

23. The front accessible switchgear assembly of claim 1, wherein said bus bars comprise horizontal bus bars electrically connected in a rear one of said compartments within said electrical enclosure, wherein one or more of said horizontal bus bars allow connection to adjacent sections defined in said electrical enclosure, connection between said one or more electrical components in said adjacent sections defined in said electrical enclosure, and connection to one or more other switchgear assemblies.

24. The front accessible switchgear assembly of claim 1, further comprising surge arresters positioned in a rear one of said compartments for protecting said electrical components, said bus bars, inspection windows, infrared windows, input electrical cables and output electrical cables, said mounting block assembly, said compartments defined within said electrical enclosure in an event of a lightning surge, wherein said surge arresters are electrically connected to said bus bars in said electrical enclosure via high voltage electrical cables.

25. A front accessible switchgear assembly, comprising:
a plurality of compartments defined within an electrical enclosure, wherein said compartments are configured to interchangeably accommodate a circuit breaker, current transformers, a control power transformer, an epoxy encapsulated potential transformer, electrical cables, and bus bars;
a low voltage compartment configured in one of said compartments and isolated from other said compartments;
a mounting block assembly positioned in one or more of said compartments for mounting each of said current transformers, said circuit breaker, said control power transformer, and said epoxy encapsulated potential transformer, wherein said mounting block assembly provides front access to said mounted current transformers, said circuit breaker, said control power transformer, and said epoxy encapsulated potential transformer for inspection and maintenance;
a plenum chamber rearwardly positioned in said electrical enclosure and in adjacent communication with an exhaust chamber for providing an exit path for releasing pressure and gases generated by said circuit breaker, said current transformers, said control power transformer, and said epoxy encapsulated potential transformer accommodated in said compartments during an event of arcing within said electrical enclosure;
said circuit breaker mounted in a middle one of said compartments and electrically connected within said mounting block assembly, wherein said circuit breaker contacts one or more of said bus bars via said mounting block assembly;

said current transformers mounted on said mounting assembly and adapted for a plurality of voltage connections and for saving space in said electrical enclosure;

said control power transformer mounted and electrically connected in a middle one of said compartments;

said epoxy encapsulated potential transformer mounted and electrically connected in one of a middle one of said compartments and a lower one of said compartments; and said electrical cables configured for entry into and/or exit from said electrical enclosure via one of an upper one of said compartments and a lower one of said compartments.

26. The front accessible switchgear assembly of claim 25, further comprising fuse sleeve assemblies operably connected to each of said control power transformer and said epoxy encapsulated potential transformer for allowing high voltage primary connections in said electrical enclosure, wherein said fuse sleeve assemblies provide insulating barriers between said high voltage primary connections and said electrical enclosure.

27. A method for constructing a front accessible switchgear assembly, comprising:

providing an electrical enclosure comprising a plurality of compartments, wherein said compartments are configured to interchangeably accommodate one or more electrical components and bus bars;

positioning a mounting block assembly in one or more of said compartments for mounting one or more of said one or more electrical components and for providing front access to said mounted one or more electrical components for inspection and maintenance wherein, said mounting block assembly comprises:

a plurality of mounting legs extending frontwardly from a base mounting block for mounting said one or more electrical components and allowing said front access to said mounted one or more electrical components; and a mounting block cover removably attached to said base mounting block for enclosing said mounted one or more electrical components on said mounting legs, wherein said mounting block cover is configured to provide said front access to said mounted one or more electrical components for said inspection and said maintenance; and mounting and electrically connecting said one or more electrical components in predetermined positions in said compartments and said mounting block assembly for allowing said front access to said one or more electrical components and said bus bars within said electrical enclosure, wherein one or more of said one or more electrical components are in electrical communication with said bus bars in said compartments.

28. The method of claim 27, further comprising rearwardly positioning a plenum chamber in said electrical enclosure, wherein said plenum chamber is in communication with one or more of said compartments and in adjacent communication with an exhaust chamber for providing an exit path for releasing pressure and gases generated by said one or more electrical components accommodated in said compartments during an event of arcing within said electrical enclosure.

29. The method of claim 27, further comprising isolating one or more of said compartments and said plenum chamber by one or more flaps positioned between said one or more compartments and said plenum chamber for preventing said gases and external particulate matter from entering said compartments via said plenum chamber.

30. The method of claim 27, further comprising providing insulating barriers between high voltage connections and said electrical enclosure of said front accessible switchgear assembly for preventing exposure of active electrical components within said electrical enclosure.

\* \* \* \* \*